(12) United States Patent
Ahmadidaneshashtiani et al.

(10) Patent No.: US 11,715,465 B2
(45) Date of Patent: Aug. 1, 2023

(54) SYSTEM AND METHOD FOR CONVERSATIONAL MIDDLEWARE PLATFORM

(71) Applicant: ROYAL BANK OF CANADA, Toronto (CA)

(72) Inventors: MohammadHosein Ahmadidaneshashtiani, Toronto (CA); Ian Robert Middleton, Toronto (CA); Shawn Harold Munro, Toronto (CA); Darren Michael MacNamara, Toronto (CA); Bo Sang, Toronto (CA); Devina Jaiswal, Toronto (CA); Hanke Liu, Toronto (CA); Kylie To, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/170,682

(22) Filed: Feb. 8, 2021

(65) Prior Publication Data
US 2021/0249002 A1 Aug. 12, 2021

Related U.S. Application Data

(60) Provisional application No. 63/071,553, filed on Aug. 28, 2020, provisional application No. 62/971,617, filed on Feb. 7, 2020.

(51) Int. Cl.
*G10L 15/19* (2013.01)
*G06F 40/284* (2020.01)

(52) U.S. Cl.
CPC .......... *G10L 15/19* (2013.01); *G06F 40/284* (2020.01)

(58) Field of Classification Search
CPC . G10L 15/06; G10L 15/1815; G10L 15/1822; G10L 15/19; G10L 15/22; G06F 16/3329; G06F 16/90332; G06F 40/284; G06F 40/30; G06F 40/35; G06F 40/40; H04L 51/00; H04L 51/02; H04L 51/066; H04L 51/222
See application file for complete search history.

(56) References Cited

U.S. PATENT DOCUMENTS

| 10,803,859 B1 * | 10/2020 | Williams ................ G10L 17/06 |
| 11,379,489 B2 * | 7/2022 | Robichaud ........ G06F 16/24578 |
| 2002/0198714 A1 * | 12/2002 | Zhou ................... G10L 15/1822 |
| | | 704/252 |

(Continued)

OTHER PUBLICATIONS

Magee, John F., Decision Trees for Decision Making, Jul. 1964, Harvard Business Review Magazine (Year: 1964).*

(Continued)

*Primary Examiner* — Andrew C Flanders
*Assistant Examiner* — Alexander Joongie Kim
(74) *Attorney, Agent, or Firm* — Norton Rose Fulbright Canada LLP

(57) ABSTRACT

A de-coupled computing infrastructure is described that is adapted to provide domain specific contextual engines based on conversational flow. The computing infrastructure further includes, in some embodiments, a mechanism for directing conversational flow in respect of a backend natural language processing engine. The computing infrastructure is adapted to control or manage conversational flows using a plurality of natural language processing agents.

20 Claims, 39 Drawing Sheets

(56) References Cited

U.S. PATENT DOCUMENTS

| | | | |
|---|---|---|---|
| 2007/0033005 A1* | 2/2007 | Cristo | G10L 15/19 |
| | | | 704/9 |
| 2019/0114321 A1 | 4/2019 | Lam et al. | |
| 2019/0349321 A1 | 11/2019 | Cai et al. | |
| 2020/0105273 A1* | 4/2020 | O'Donovan | G10L 15/30 |
| 2020/0259891 A1* | 8/2020 | Abraham | H04L 67/1008 |
| 2020/0334381 A1* | 10/2020 | Yarowsky | G06F 40/166 |
| 2020/0364250 A1* | 11/2020 | Kube | G06F 16/3322 |
| 2021/0004432 A1* | 1/2021 | Li | G06F 40/295 |
| 2021/0144107 A1* | 5/2021 | Liang | G06N 5/04 |

OTHER PUBLICATIONS

DeGroote, John, Decision Tree Analysis In Litigation: The Basics, Jan. 4, 2009, Settlement Perspectives (Year: 2009).*
International Search Report and Written Opinion issued in International Application No. PCT/CA2021/050142 dated Mar. 29, 2021.

* cited by examiner

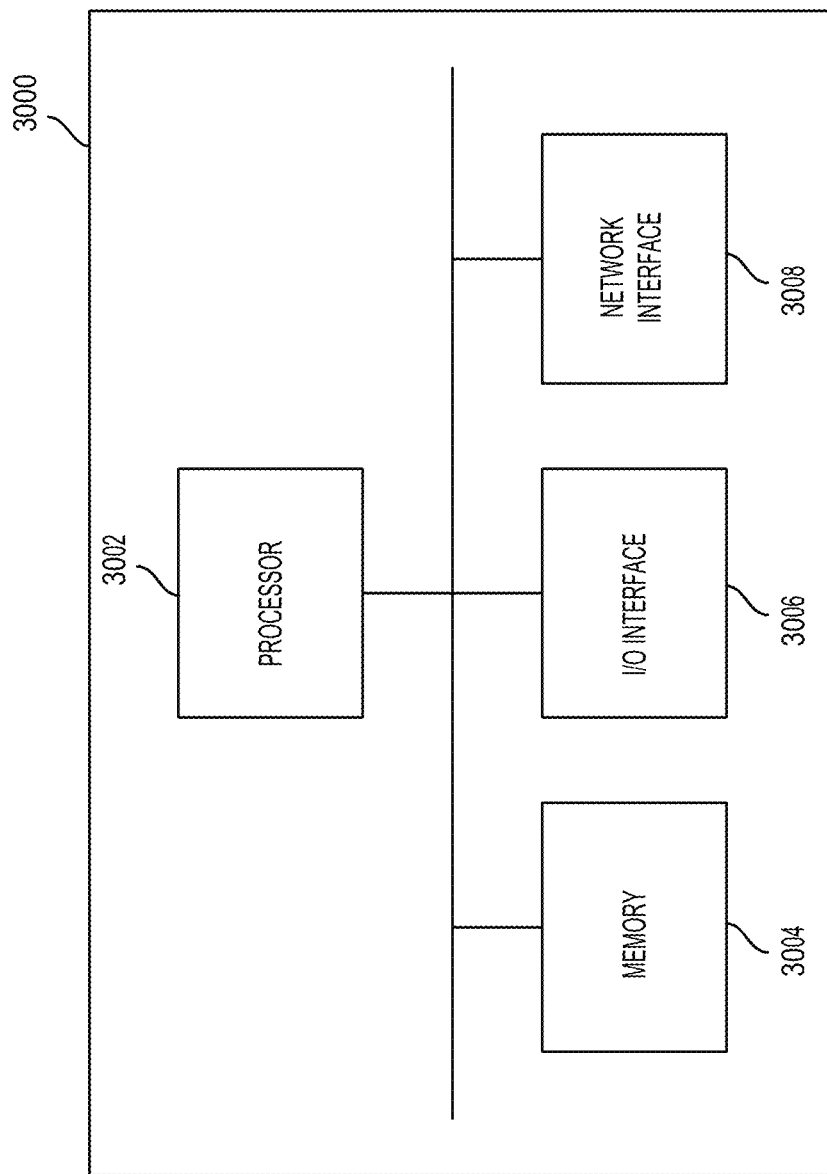

SYSTEM AND METHOD FOR CONVERSATIONAL MIDDLEWARE PLATFORM

CROSS-REFERENCE

This application is a non-provisional of U.S. Application No. 62/971,617, dated 2020 Feb. 7, entitled "SYSTEM AND METHOD FOR CONVERSATIONAL MIDDLE-WARE PLATFORM", and U.S. Application No. 63/071,553, dated 2020 Aug. 28, entitled "SYSTEM AND METHODS FOR SELECTING CHANNELS FOR VIRTUAL ASSISTANT COMMUNICATION".

Both of these applications are incorporated herein by reference in their entireties.

FIELD

Embodiments of the present disclosure generally relate to the field of automated conversational entities, and more specifically, embodiments relate to devices, systems and methods for virtual assistant architectures for automated conversational entities.

INTRODUCTION

There are various technical challenges that arise when implementing computer systems that conduct conversations with human beings, for example, through a user interface. Simulating a conversational partner is not easy as conversation includes nuances that may not easily be identifiable by a computer. These nuances can include contextual cues such as mood, intent, and motives (e.g., sarcasm).

Specific natural language processing agents may be useful for certain situations, but less useful for others. This issue raises in relation to training—natural language processing agents can be very domain-specific (e.g., specific dictionaries, trained for specific jargon).

This specialization can cause the agent to be very good at a limited set of tasks while poor at others.

A further complication for these computer systems is where there are paramount privacy concerns. An example of these privacy concerns include a person's private information.

These challenges have led to slow adoption of automated conversation technology, or limited implementations where the automated conversation technology can only assist with the most rudimentary of tasks. For example, some conversation bots are only able to dispense advice in relation to opening hours of banking branches or simply reiterating posted interest rates.

SUMMARY

As described in various embodiments herein, improved architectures for natural language processing in relation to automated conversational agents are provided. Corresponding computer systems, methods, and computer program products stored in the form of non-transitory computer readable media having machine interpretable instructions thereon are contemplated.

A proposed computing architecture is described for an automated conversation orchestration system that is configured to interconnect a plurality of natural language processing agents, each of the natural language processing agents having different domain specializations, or handling/natural language processing characteristics or capabilities. The proposed architecture is implemented in the form of an orchestration system that can be configured to control conversational flows associated with automated agents of an enterprise organization. For example, the orchestration system can be utilized to control an IT backend for automatically answering IT questions, resolving service tickets, initiating workflows or data processes, among others. Accordingly, specific agents can be tasked with handling responses or situations where they are strongly trained for, and an orchestration system can automatically re-route utterances to agents and designate different agents at different times as primary "driving agents".

As described in further embodiments, the orchestration system may also use additional contextual and behavioral agents alongside conversational agents that are adapted to modify the utterance strings themselves to correct for certain issues (e.g., incongruity between tracked literal intent and a contextual intent that may be indicative of sarcasm), or to modify a biasing of the weights utilized for assigning primary driving agents.

The proposed flexible implementation provides an improved ease of scalability and flexibility as the orchestrator is de-coupled from being reliant on specific natural language processing/natural language understanding implementations, and different or new natural language processing/natural language understanding engines can be engaged that are estimated to best fit a particular context or utterance, and the user experience remains consistent as the user is not aware of the routing changes in the backend during the front-end conversation flow.

The orchestration system provides improved flexibility in selecting a specific natural language processing agent (including natural language understanding agents, which are a subset of natural language processing agents) that is well suited for a particular task given contextual cues either in the input string itself, and/or in external data, such as information stored in a user profile related to a user, information stored in a user profile related to a group of users or a demographic of users similar to the user. As described further, the orchestration system can also be adapted in some embodiments to support multi-party, multi-channel automated conversations. The agents can be coupled to automatically initiate fulfillment processes through de-coupled fulfillment handlers (e.g., by invoking functions having parameters based on the utterance or based on a user profile, or both).

The orchestration system can coordinate activities across multiple types of agents, such as (i) conversational natural language processing agents configured for generating the ultimate output response data structure to include a response to be transmitted to the user, (ii) contextual natural language processing agents that are configured for triggering modifications of the new utterance string for re-processing through the automated conversation orchestration system, and (iii) user behavior tracking agents, such as artificial intelligence based agents, that shift probabilistic weights and bias selections of agents based on prior user behavior (e.g., user has been often locked out of an account in the past due to mistyped passwords).

The orchestration system allows for flexibility in the automatic selection of a natural language processing agent that is estimated to best suit a particular context or scenario, and is particularly useful where a number of specifically trained agents are utilized to handle specific conversational flows.

The automated conversation orchestration system receives utterance string inputs, which may be provided by a user, or be provided on an earlier iteration of the operation of the orchestration system (e.g., a transformed utterance, transformed to account for sarcasm or to remove sensitive information). The utterance string inputs, in some embodiments, can include string inputs that are provided by other systems and not necessarily a human, and may be received the form of text, audio, voice, among others.

The automated conversation orchestration system first receives the new utterance string, and tokenizes the new utterance string as individual words, word portions or character sets (e.g., bigrams, trigrams) for providing to one or more natural language processing agents of the plurality of natural language processing agents. In an online banking example, there may be natural language processing agents directed to different types of conversation such as personal banking, direct investment, business banking, and wealth management. The natural language processing agents may have different dictionaries (e.g., trained differently) and capabilities (e.g., ability to initiate workflows, ability to track and handle multiple intent representations simultaneously). The natural language processing agents may also have differing associated usage costs, privacy-related characteristics (e.g., on-premises vs. in the cloud, the use of language as training sets for future iterations), among others, that modify how the natural language processing agents are utilized by the orchestration system.

The tokenized new utterance string is routed to a set of the natural language processing agents, which each individually assess the utterance string and generate response confidence score values representative of a confidence level associated with potentially processing the tokenized new utterance string.

The orchestration agent then queries a profile data structure associated with the user associated with the utterance to establish, one or more probability values corresponding to each of the natural language processing agents. The probability values can be associated with specific capabilities or domain specializations of the corresponding natural language processing agent, and the profile data structure can, in some embodiments, be based on either the user's historical transactions (e.g., the user frequently checks the personal banking balance at around, so it is 65% likely that the user is submitting utterances to interact with the personal banking account), or their personal preferences and interests. For example, in an embodiment, the fit to the user is not predetermined by predefined attributes that the user can configure, but rather based on their historic behavior, which can include transactions, but in some embodiments, may extend further than behaviors, such as social media posts, opinions, vacation locations, the type of stocks they buy, and so on.

In another variant embodiment the probability values are biased or shifted in view of existing marketing or offerings, or partners offerings that fit this particular user, such that the user may be directed to use agent that has, for example, a more directed and more time sensitive offer for the user.

Other variations are possible, for example, wherein the profile data structure, rather than being for a particular user, is established across an amalgamation of users (or groups of similar users) such that the profile data structure represents a particular demographic. For example, a user may have a 65% probability of checking a personal banking balance, and this can be multiplied against a confidence score output of 84% in order to rank or position the response from the personal banking natural language processing agent against the other agents using a weighted confidence score.

A "driving" natural language processing agent can be established using the natural language processing agent with a highest score, for example. There can be a plurality of natural language processing agents (e.g., different engines), and the computer processor is further configured to select a domain-specific natural language processing agent of the natural language processing agents, the selection established by providing the input strings to the plurality of the natural language processing engines to receive a plurality of corresponding confidence value data object, and the selection includes selecting the natural language processing engine having a highest confidence value.

The "driving" natural language processing agent can then be utilized for the next flow of utterances from the user, so long as the confidence score for the responses and outputs generated by the "driving" natural language processing agent maintains above a threshold. If the "driving" natural language processing agent's confidence scores drop below the threshold, the orchestration system may re-initiate the process for selecting a "driving" natural language processing agent. This can occur, for example, where a topic changes, allowing for a seamless transition and improved experience for the user. The threshold is useful to avoid situations where the system wastes computing resources attempting to identify a new "driving" natural language processing agent with each utterance.

If multiple natural language processing agents are able to achieve high scores (e.g., within a range, for example 15 points), the orchestration agent can be configured to automatically conduct a verification step where the interface is controlled to ask the user which domain or agent specialization it is expecting to utilize. The verification step can present a bifurcated option between the natural language processing agents having the highest scores. For example, if a user is seeking to conduct a transaction related to retirement savings accounts and both the wealth management and personal banking specific agents obtain scores of 65, and 68, respectively, the orchestration system may be controlled to initiate a verification step where the user is prompted with a decision input request asking which of the topics of wealth management and personal banking is a better fit for supporting the conversation.

In some embodiments, the orchestration system interoperates with a data protection plug-in that is used to first sanitize the utterance strings by removing or replacing specific tokens in the utterance string before providing to the orchestration system. The processor identifies, from the input strings, sensitive query tokens that need to be redacted or sanitized (e.g., payee names, account numbers). The input strings are first transformed into an obfuscated query string by replacing the sensitive query tokens with placeholder query tokens, which is then provided to natural language processing engines for intent detection to receive a response intent data object having the placeholder query tokens.

In another embodiment, the orchestration system itself is configured to conduct data protection iterations by utilizing a data protection/sensitive data tracking agent alongside the natural language processing agents. In some embodiments, in an initial pass for a new utterance string having an unknown level of data sensitivity, the orchestration system can be limited to only selecting between agents having minimal risk profiles (e.g., on-premises or local agents (as opposed to cloud-based agents)). For example, a series of risk factors can be utilized to pre-define risk classifications for certain agents relating to sensitive information, and the risk classifications of agents can be also be tuned based on regulatory or other external factors. For example, certain businesses may not have data sent to data centers outside of the country, etc.

The data protection/sensitive data tracking agent can be adapted to, for example, estimate whether a particular token of the utterance string is a sensitive word (e.g., an existing client name, a prospective client name, identifiable information for a client), and if so, become the "driving agent" insofar that the utterance string is modified to remove the sensitive information and then the modified utterance string can be re-entered into the orchestration system. The utterance string can use placeholders instead of sensitive information, and in some embodiments, the placeholders are established (e.g., unique tokens or non-unique tokens) so that they can be mapped back to the original information when generating responses for the user on an internal conversational flow.

In this variation, for example, the modified utterance string can then be utilized by the orchestration system for routing against a full set of natural language processing agents, including public natural language processing agents as private information has automatically been removed. This is particularly important where the public natural language processing agents utilize the utterances for training internal machine learning models, as it is not desirable to forge associations between sensitive information being used in utterances.

In another variation, the orchestration system is configured to automatically generate utterances for providing into the orchestration system to initiate a conversation. This can be used, for example, in scenarios where an automated chatbot session is triggered by an event (e.g., the user has attempted to access a credential too many times and is automatically locked out).

Rather than having the user initiate a chat session and request help with being locked out, the system itself, upon detecting a change or reaching a locked out state, can generate an utterance on the user's behalf to be sent to the system to initiate a conversation. A benefit of this approach is that the orchestration system then automatically takes into consideration the user's profile and other information for generating a chat session message, as opposed to simply relying on a static message when the user is locked out. For example, the chat session message can start with contextual information as, for example, it recognizes that in prior transactions, the user was locked out because the user was using a token that had expired or had heavy clock drift issues.

The automatically generated utterances can also be utilized in situations where there are hand-offs between natural language processing agents, for example, in multi-party or multi-channel scenarios. In an example, when the user switches topics or desired activities, the orchestration system may be configured to automatically generate a new utterance string that is processed by the system to trigger a switch in agent. Similarly, in multi-party (e.g., conversations held simultaneously between a wealth advisor and the wealth advisor's client) scenarios, the agent can automatically generate messages for the processing by the other agent's conversational flow.

In some embodiments, the natural language processing agents are configured to assess a confidence score of whether a specific intent is present in the input utterance string. If the specific intent is present and there is a corresponding function that is invoked to implement the intent (e.g., "please map the network drive to my laptop having the MAC Address [MAC Address]"), a fulfillment string can be generated for invoking a function to conduct the fulfillment (e.g., a command line interpreter instruction message). Where the utterance string has been transformed for usage to remove sensitive query tokens, the original query tokens may be re-established by replacing the placeholder query tokens with the sensitive query tokens prior to downstream execution. In the network drive example, the specific MAC Address could have been replaced with a replacement token prior to processing on the natural language processing agents to identify the correct agent, but during the fulfillment of the request, the replacement token may be converted back to the sensitive information prior to processing.

In some embodiments, a loopback (e.g., "more information needed"—which account of 3 possible accounts to transfer from) or fallback utterance (e.g., please talk to human) is identified to be required by the orchestration server, and the computer processor is further configured to send machine-generated inputs to the natural language processing before responding to the client.

The orchestration system provides a de-coupled computing infrastructure that is adapted to provide domain specific contextual engines based on conversational flows. As described above, a one or two stage mechanism for sanitizing and de-sanitizing inputs to a backend natural language processing engine (e.g., replacing payor/payee names, account numbers, addresses) can be utilized.

The computing infrastructure for automated conversational handling is de-coupled from fulfillment handlers such that the fulfilment handlers can be applied regardless of the natural language processing implementation. The fulfilment handlers call and execute the backend services, and in some embodiments, the fulfilment handlers can re-verify authorization and credentials for a given user at the desired control point in the conversational flow. Authorization and validation can be conducted on a variable basis, for example, if the conversational flow is designated as suspicious or the transaction amount (e.g., moving $50,000) or the type of service being called has a priority level greater than a particular threshold (e.g., changing address for delivering cheques). This criteria can be aligned to enterprise risk appetite and can be controlled, monitored and updated in a centralized approach (managed centralized but executed in distributed systems).

The system can be modularized such that contextual cues or other information provided at different steps of a conversational workflow can be carried on at different times, or across different conversational mediums (e.g., an omni-channel experience where the natural language processing cues are shared across different mechanisms of carrying out the conversation).

In accordance with a first aspect, the system includes a computer processor operating in conjunction with computer memory. The computer processor is configured to receive, from a user interface (e.g., an audio or a visual interface rendered on a display of a mobile device or an automated teller machine (ATM)), input strings representing a conversational request from the user having query tokens. The input strings can include general or specific queries, such as "what is my account balance?", or "send money to my son". The conversational middleware platform provided by the system, in some embodiments is adapted for receiving the conversational flows from a plurality of individuals, or to receive conversational flows in a plurality of languages.

In another aspect, additional input strings include additional verification information.

In another aspect, the computer processor is configured to select a domain-specific natural language processing engine of the natural language processing engines for intent detection, the selection based on a type of inquiry extracted from the input strings supported by machine learning algorithms that leverage personalization services. Over time, the selection will become more and more personalized to the individual and their language, tone, and interests.

In another aspect, the response intent data object is selected from an enterprise intent repository data storage. The selection, for example, may be conducted at design-time as opposed to run-time due to potential issues with performance overhead.

In another aspect, the response intent data object is recorded into a conversational history data object.

In another aspect, the conversational data object is used to transition the automated conversation across changes in the user interface being used by the user (e.g., providing a relatively seamless omni-channel by handling hand-offs between interfaces).

In another aspect, the conversational data object is used to transition the automated conversation to a human agent, the conversational data object utilized to populate an agent interface for the human agent.

In another aspect, the conversational data object persists across multiple conversations, and the conversational data object is utilized by the natural language processing engines for intent detection along with the obfuscated query string. The processor identifies, from the input strings, sensitive query tokens that need to be redacted or sanitized (e.g., payee names, account numbers). The input strings are first transformed into an obfuscated query string by replacing the sensitive query tokens with placeholder query tokens, which is then provided to natural language processing engines for intent detection to receive a response intent data object having the placeholder query tokens.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 9 and 10 depict the re-use of a conversational broker for multiple roles while enforcing appropriate security controls e.g., in FIG. 8, the client uses the broker to ask for business account profile while in FIG. 9, a financial advisor (employee) asks for similar information about a particular client.

FIG. 21 shows an example system architecture for virtual assistant communications, according to some embodiments.

FIG. 22 shows an example graph structure, according to some embodiments.

FIG. 23 shows an example use flow for virtual assistant communications, according to some embodiments.

FIG. 24 shows an example graph structure, according to some embodiments.

FIG. 25 shows an example propagation process, according to some embodiments.

FIG. 26 shows an example graph structure, according to some embodiments.

FIG. 27 shows an example graph structure, according to some embodiments.

FIG. 28 shows an example graph structure, according to some embodiments.

FIG. 29 shows an example configuration file, according to some embodiments.

FIG. 30 is a block schematic diagram of a computing device adapted for providing the automated conversational mechanism, according to some embodiments.

DETAILED DESCRIPTION

The conversational broker application described in various embodiments herein is a middleware conversational platform adapted to create, evolve, secure, and govern dialog systems that leverage a variety of technology components and enable multi-party conversations.

The middleware conversational platform can be utilized to operate one or more chatbots conducting automated conversations with humans (or in certain situations, as between machines), and one or more central orchestration systems can be provided to support the chatbots of an organization. The chat session need not necessarily be through a textual chat interface. For example, a conversation may also take place through a speaker device or tablet.

In multi-party conversations, the conversations may be handled by a single instance of the broker application, where is a primary driving agent assigned per party, or in another variation, there may be there may be different instances of the platform in operation, each instance of the platform corresponding to a party and handling conversational flows and assigning the corresponding driving primary natural language processing agent.

The conversational broker application can be used by various types of users, for example, online banking customers or wealth managers, and the system is modularized such that contextual cues or other information provided at different steps of a conversational workflow can be carried on at different times, or across different conversational mediums (e.g., an omni-channel experience where the natural language processing cues are shared across different mechanisms of carrying out the conversation).

Automated conversation architectures described herein can be utilized to empower virtual assistants to improve the ability of virtual assistants so that, for example, the assistants are able to be automatically initiate backend tasks, carry conversations with a user (even across multiple channels).

In a further embodiment, an algorithmic recommendation engine and data management solution is described that is adapted for using a graph-based approach to establish which channel the virtual assistant should respond through and routes the response to the appropriate API endpoints and/or output channels.

In this variation, a channel response engine is provided whereby when a response is prompted from a virtual assistant, the system is configured to determine the best channel (from a set of pre-determined channels) through which to respond. Multiple channels, can include, for example, asking a smart speaker to perform a function on a phone Data is managed across multiple channels to ensure that the data around this conversation is accessible by all channels involved. A graph data structure is described in some embodiments that is used for controlling channel transitions.

Figure 1A:
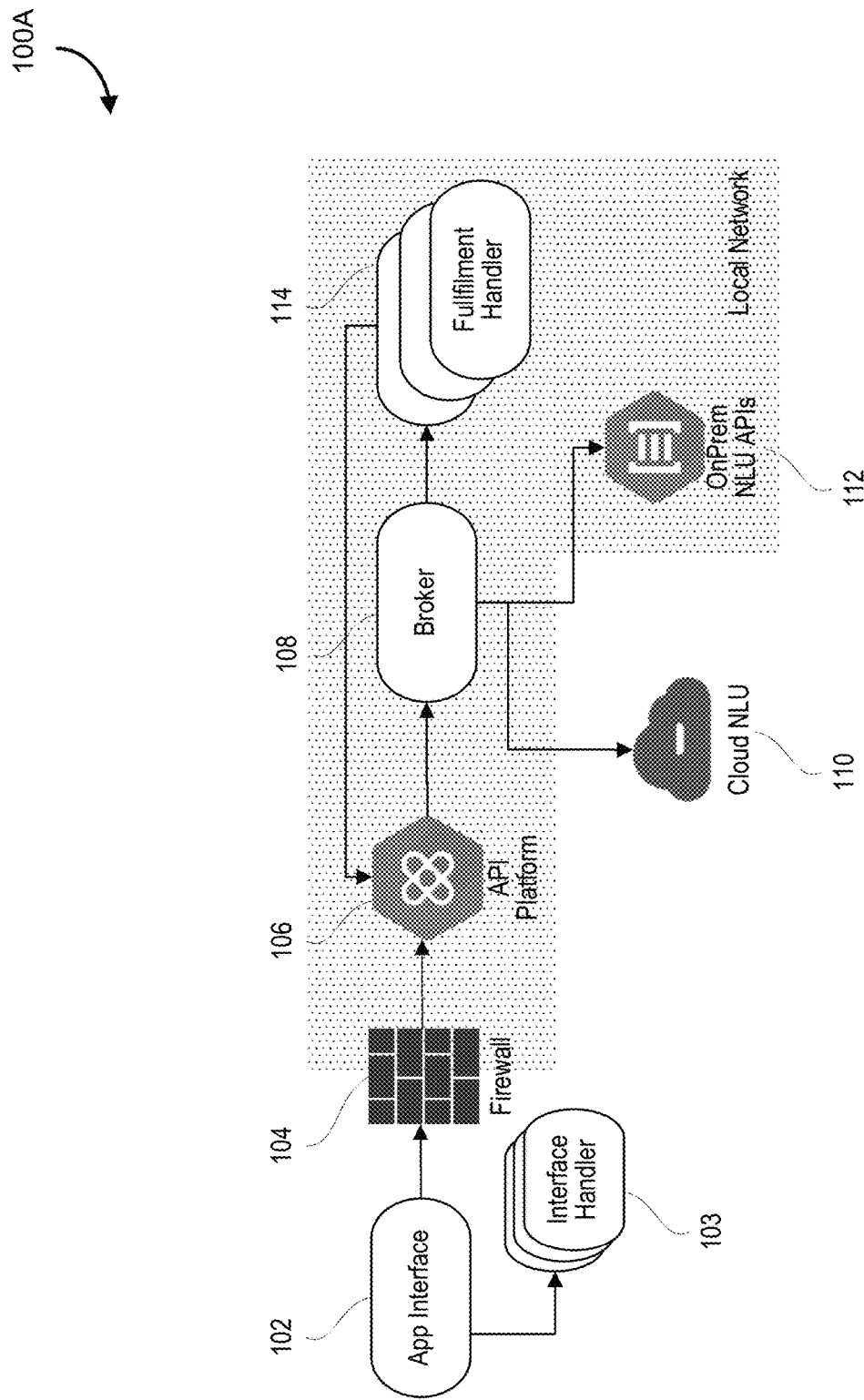
FIG. 1A is a block schematic diagram of an example system for conducting an automated conversation with a user, according to some embodiments.

FIG. 1A is a block schematic diagram of an example system for conducting an automated conversation with a user, according to some embodiments.

The system 100 includes a computer processor operating in conjunction with computer memory. The computer processor is configured to receive, from a user interface 102 (e.g., an audio or a visual interface rendered on a display of a mobile device or an automated teller machine (ATM)), input strings representing a conversational request from the user having query tokens. The input strings can include general or specific queries, such as "what is my account balance?", or "send money to my son".

Figure 7:
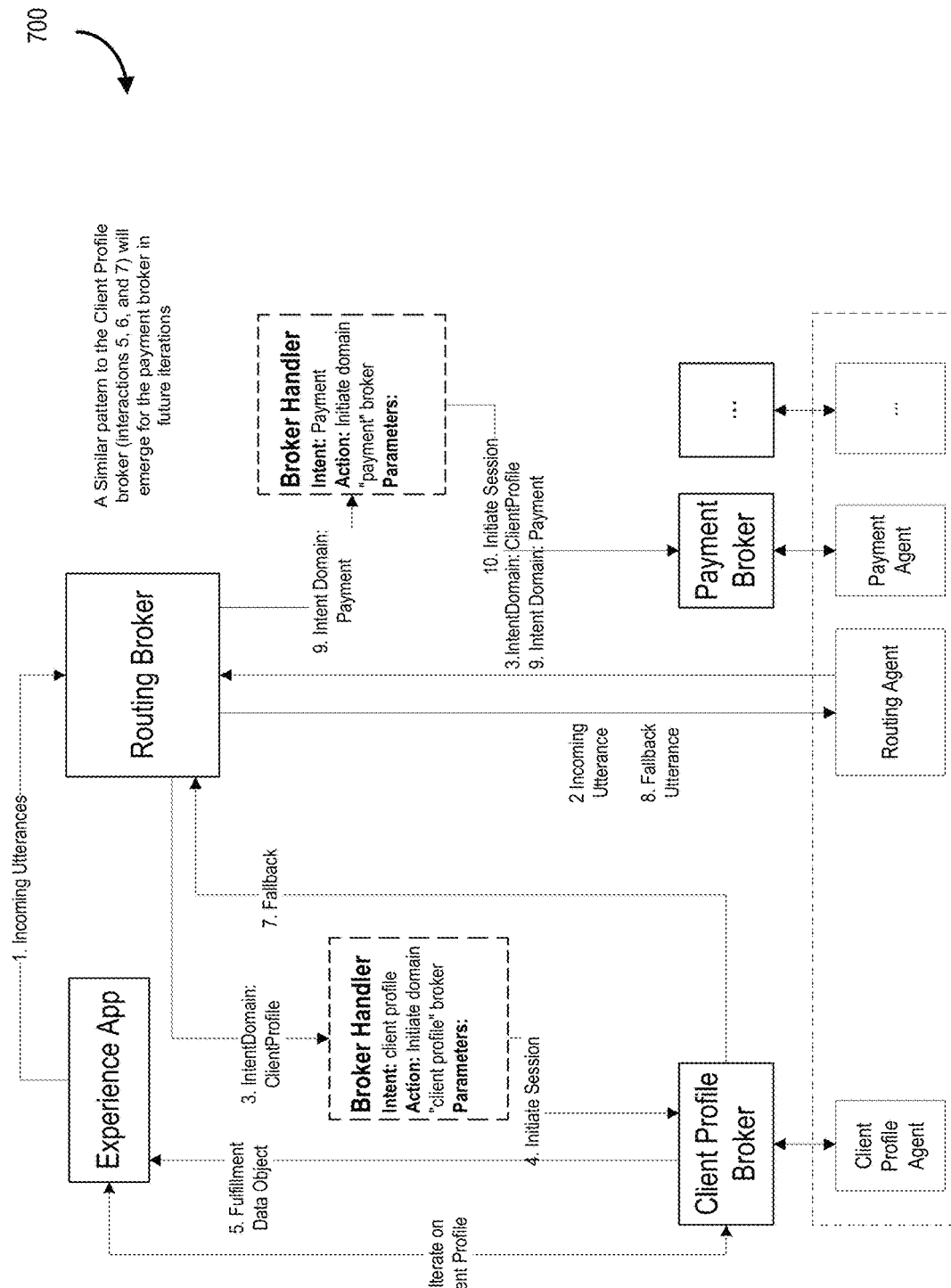
FIG. 7 is a dataflow diagram provided to show example flows that can be provided to different domain-specific broker engines, according to some embodiments.

The user interface 102 may be provided behind an optional firewall 104. The broker processor 108 identifies, from the input strings, sensitive query tokens that need to be redacted or sanitized (e.g., payee names, account numbers). The input strings are first transformed into an obfuscated query string by replacing the sensitive query tokens with placeholder query tokens. FIG. 7 shows an example flow that can be handled by broker processor 108, for example.

The obfuscated query string is provided to natural language processing agents (e.g., natural language processing engines) for natural language understanding (NLU), such as cloud NLU 110 or OnPrem NLU 112 for intent detection to receive a response intent data object having the placeholder query tokens. In some embodiments, specific domain-trained natural language processing agents are utilized, and a selection process may be utilized by the broker 108 to select a specific natural language processing agent according to a specified algorithm (e.g., the algorithm may choose among the highest confidence score in relation to generated intent data objects from multiple NLPs or may employ a generic natural language understanding model).

The response intent data objects are used to generate an enhanced intent data object by the broker processor 108 by replacing the placeholder query tokens with the sensitive query tokens, which is then provided to the fulfillment handler agents 114 to invoke downstream functionality, such as initiating a funds transfer, updating address information, among others.

A follow-up verification (e.g., more information needed—which account of 3 possible accounts to transfer from), an action confirmation, a loopback utterance, or a fallback utterance (e.g., please talk to human) can be identified to be required by the fulfillment handler agents 114, and in these situations, the broker processor 108 is further configured to take appropriate action and redirect the flow of conversation to the right entity (e.g., when receiving a fallback utterance, it will redirect to the appropriate NLP (110 or 112) in order to receive a new intent data object). Once a fulfilment data object is received by 102 it uses the appropriate interface handler 103 (downloaded from a library of handlers customized for channel and mode of conversation) to render information to consumers.

In a simplified, non-limiting example implementation, the broker processor 108 can be configured to select a domain-specific natural language processing agent of the natural language processing agents 110 or 112 for intent detection, the selection based on a type of inquiry extracted from the input strings. For example, there can be plurality of natural language processing agents 110 or 112, and the computer processor is further configured to select a domain-specific natural language processing agent of the natural language processing agents for intent detection, the selection established by providing the input strings to the plurality of the natural language processing agents 110 or 112 to receive a plurality of corresponding confidence value data object, and the selection includes selecting the natural language processing agent having a highest confidence value. In some embodiments, the broker processor 108 is adapted for providing an improved orchestrator agent that is adapted for increased personalization, and additional sources of information other than confidence values can be used for orchestration.

In another aspect, the response intent data object is selected from an enterprise intent repository data storage, and the response intent data object may also be recorded into a conversational history data object. The conversational data object can be used to transition the automated conversation across changes in the user interface being used by the user (e.g., providing a relatively seamless omni-channel by handling hand-offs between interfaces). The conversational data object can also be used to transition the automated conversation to a human agent, the conversational data object utilized to populate an agent interface for the human agent. The conversational data object can be configured to persist across multiple conversations.

In an example, the history can be used in the following approaches among others:

Training an on-prem NLU that can be automated and semi-automated

Enhance design of the flows

Human involvement required

Enhance training data of cloud NL/U

Semi-automated

Train an orchestrator broker

Figure 1B:
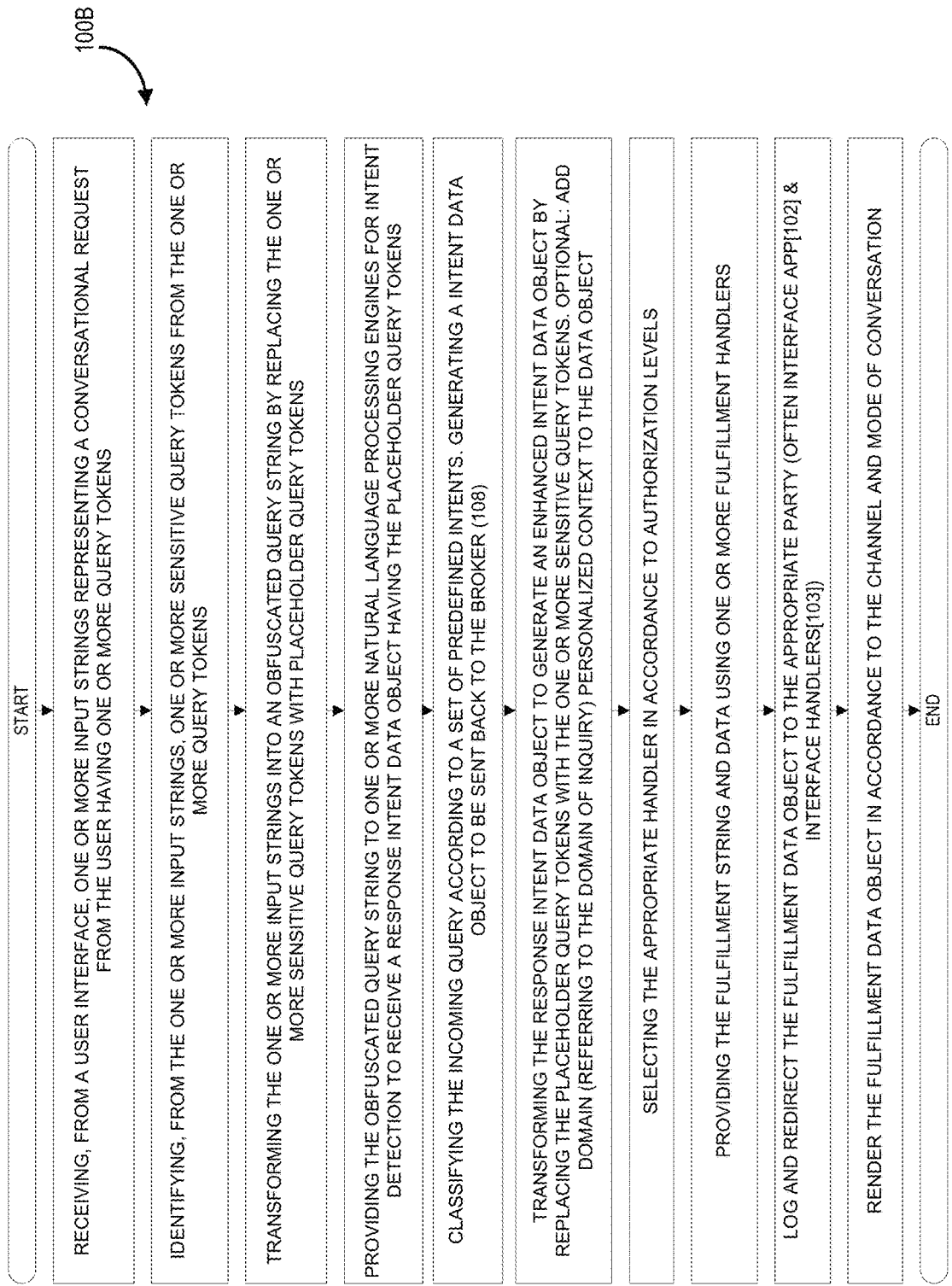
FIG. 1B is a process diagram showing a corresponding method, according to some embodiments.

Build a client specific conversation interest logs that can enable predictions on what the particular client's next inter-action/utterance is going to be FIG. 1B is a process diagram 100B showing a corresponding method, according to some embodiments. The steps are shown as examples to be conducted by the components of system 100 shown in FIG. 1A.

The conversational system 100 (e.g., implemented as a Broker API service) described herein allows utilization of natural conversations building on Natural Language Processing (NLP) agents.

The system 100 acts as a conversational agent (intermediary) that interoperates between an application interface, a NLP (either cloud based or any API enabled NLP), and downstream fulfilment APIs as illustrated in FIG. 1A. Downstream APIs are managed in re-usable scripts referred to as handlers 114 that can be deployed as stand-alone services or copied into the broker service.

A broker agent will often have multiple handlers 103 that take care of various intents in a conversation flow. An app interface 102 can manage multiple modes of conversation such as voice, chat, rich web chat, video and virtual reality.

The system 100 (e.g., broker service) and its various handlers 103 and 114 act as the vehicle to integrate conversational flows with sensitive enterprise information in a secure and scalable manner while leveraging cloud-based/API enabled NLPs 110 and 112. This sensitive information could include, but is not limited to, personally identifiable information (PII) and proprietary trade information.

Existence of the broker process enables re-use at four levels which enhances scalability and reduces cost of maintenance and development. The re-usability at the four different levels will not only bring down cost of development, maintenance and evolution of conversational experiences, it will also speed up development and time to market. In a recent development exercise, the development time for the first iteration of an employee facing conversational experience with approximately 10 intent functionality was cut in half from 4 sprints (8 weeks) to two sprints (4 weeks), This is a major advantage of using this middleware platform and enables enterprises to experiment faster and build evolvable conversational experiences in a scalable and re-usable manner.

APIs that are complemented by handlers to enable implementation of data-rich conversational flows—the handlers help decouple the natural language aspects of an experience from the logic of calling and executing a service. This enables re-use of current (and legacy) enterprise APIs within the conversational platform.

Re-use of intent modeling and intent handlers across multiple agents to share business logic and conversational experiences throughout enterprise platforms and applications.

Separation of conversational flows and agents from consuming applications enabling developers to uniquely shape application experiences Aggregation of many NLU agents into unified experiences through the concept of a routing broker and the capability to route between many agents during a conversation.

The above reusability (at the four levels) of the broker system 100 enables an enterprise to ensure consistency of tone and service for the user experience regardless of where the experience is deployed (i.e., different Line of business or geographies). The service consistency is ensured through the use of handlers and governing their application per intent. The tone and consistent messaging of the responses and look and feel is managed by reusing and tailoring interface handlers 103.

Enabling consistency of tone and service, not only helps protect the brand image, but it also lowers cost of coordination among entities within the enterprise and will lower cost of operations across channels. The central access point for defining and refining tone of communication with result in less man hours spent by, for instance, Marketing and Legal departments of the enterprise. An estimation is there are significant time savings compared to absence of such middleware platform.

The broker system 100 also enables more secure distribution of data and can preserve the privacy of clients according to risk appetite and client preferences.

This is achieved by decoupling fulfilment information from the NLU portion of the experience. Such decoupling protects proprietary and/or confidential enterprise data and can obfuscate parts of client experiences to ensure privacy is met while enabling personalization and customization. The decoupling plays a significant role as it provides a stable entry point for enforcing various security controls (defined as enforceable computer rules) that are aware of the context and user.

System 100 (Broker)—A Conversation Intermediary

The system 100 is an intermediary that is configured to broker the conversation among an application interface, an NLU agent, and a series of fulfilment APIs. The system 100 acts as a conversational agent to nurture and maintain characteristics of a natural language conversation.

While preserving the conversational nature of interactions, the broker processor 108 and fulfillment handlers 114 build and share meta-data around each interaction to better manage the context of the conversation, enrich understanding of the logs and flows of the conversation, and govern invoking handlers and authorization processes.

Structure of the Broker Endpoints

A broker processor 108 can have three endpoints:
- "INIT" Endpoint—The "init" endpoint is used to initialize a new conversation. This could range from simply generating a session ID to preloading personalized session entities for the imminent conversation.
- "QUERY" Endpoint—The "query" endpoint processes an incoming utterance and triggers NLP connectors. This is the main query endpoint which enables access to the associated NLU. The broker goes through the following steps once the end-point is accessed.
  1. If sanitization/obfuscation is enabled on the Broker service, the user's query will be analyzed and modified to remove/replace any sensitive information in a contextual manner.
  2. If the particular user has established session with the NLU before (i.e., there has been recent conversation in this domain) then it passes the request through with the same session information, if not it will establish a new session with the NLU agent and start the conversation with the incoming utterance.
  3. Upon receiving response from the NLU agent (the response is what is referred to as an Intent data object in this document), the broker does a look-up on its registered fulfillment handlers and investigates whether a handler is registered for the given intent. When there is no handler associated with the intent, the broker will echo back the response and tag it with the metadata associated to the NLU's response.
     When there is a handler associated with the intent, the broker will invoke the handler and pass the extracted entities as inputs for the handler. The handler will complete with data to return as well as meta-data related to the handler's function.

Figure 6:
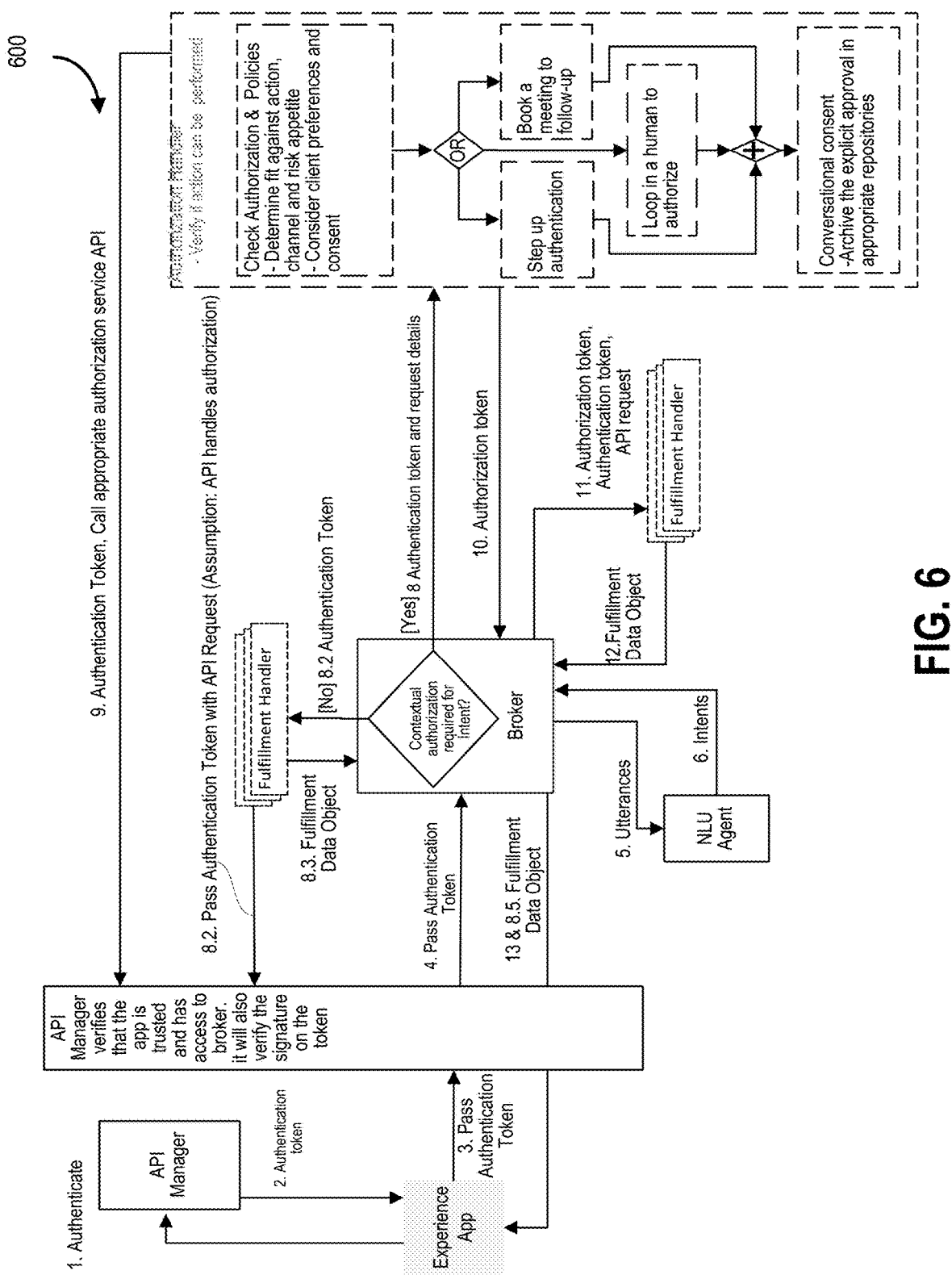
FIG. 6 is a dataflow diagram provided to Illustrate an authentication & authorization process, according to some embodiments.

When invoking a handler, the broker will check for authorization using authorization service handlers (FIG. 6)

4. Lastly, the information is echoed back to the user app for consumption.

"ACTION" Endpoint—The "action" endpoint surfaces up functionality that is related to the conversation on an ad-hoc basis. In specific cases, as mentioned above, there may be a need to request data outside of the conversational flow. The service handlers enable this access in order to benefit the experience development, but they should be used sparingly as they increase overall application complexity and can be detrimental to the conversational design.

Figure 1C:
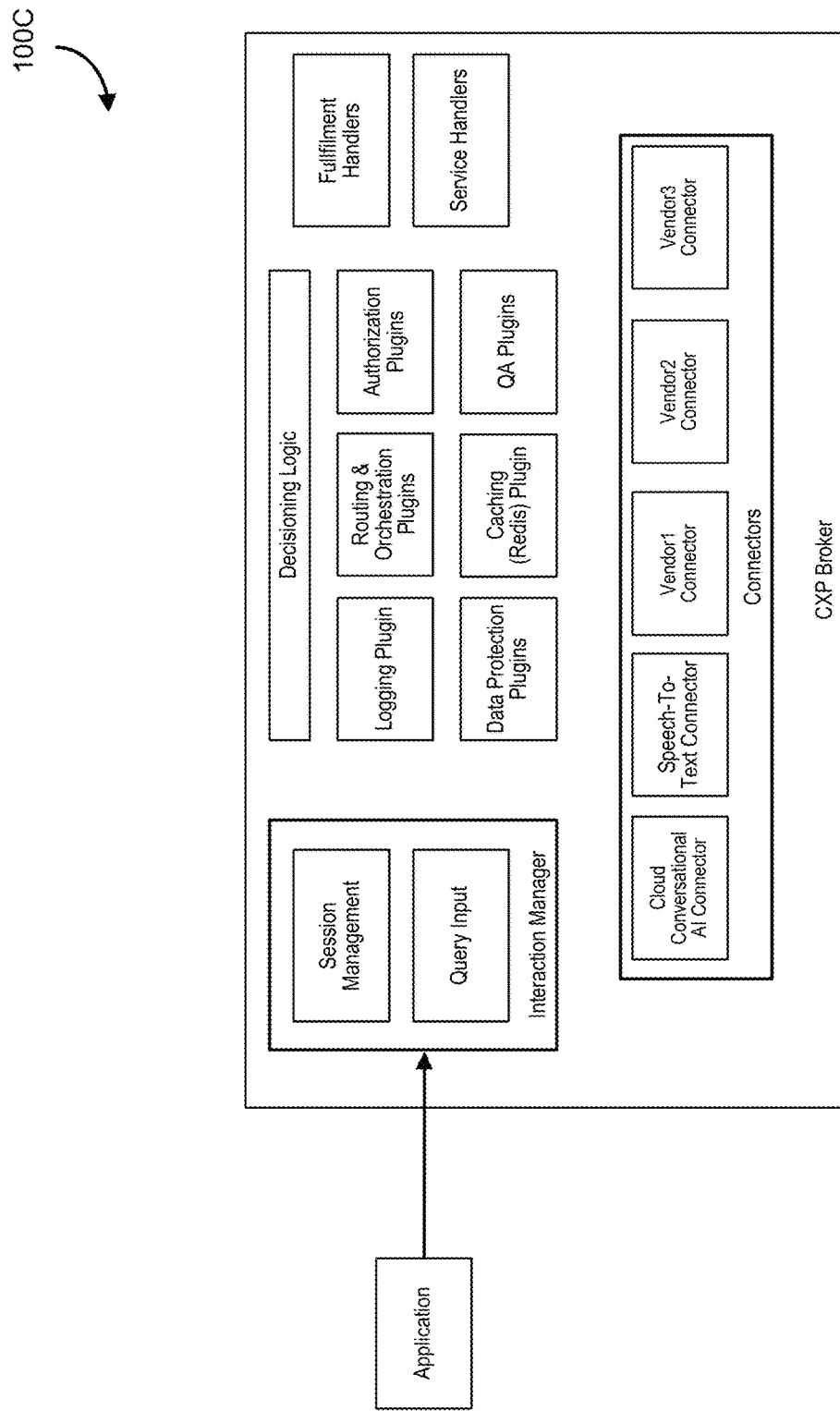
FIG. 1C is a block schematic diagram showing logical components of the example system for conducting an automated conversation with a user, according to some embodiments.

FIG. 1C is a block schematic diagram 100C showing logical components of the example system for conducting an automated conversation with a user, according to some embodiments. These aspects are shown in more detail in FIG. 1D, is a more in-depth block schematic diagram 100D showing logical components of the example system for conducting an automated conversation with a user, according to some embodiments.

Figure 1D:
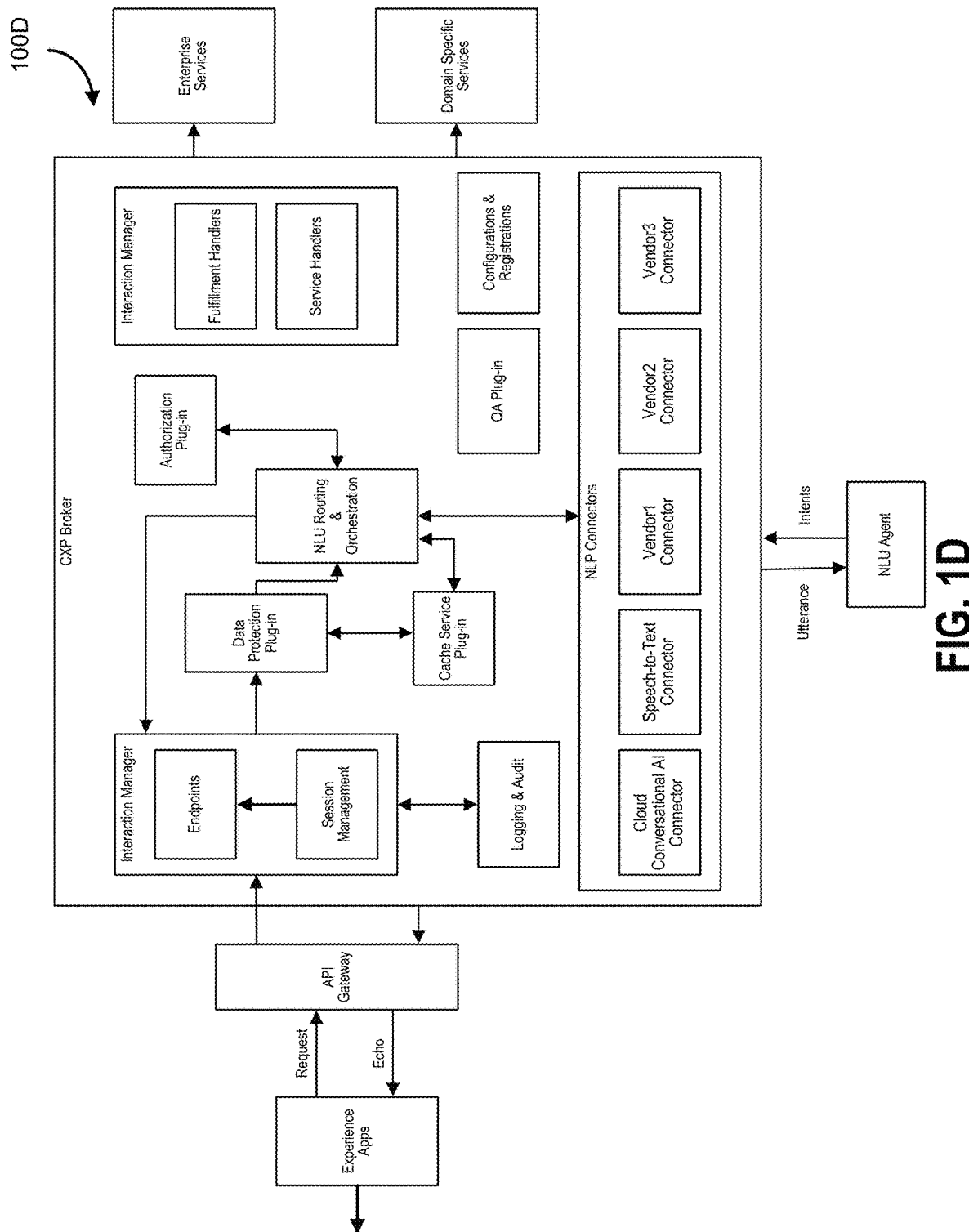
FIG. 1D is a more in-depth block schematic diagram showing logical components of the example system for conducting an automated conversation with a user, according to some embodiments. Different components and data structures are shown, and activities may take in various orders.

The system shown in FIG. 1D at diagram 100D illustrates an example computerized implementation of the broker computing system in respect of a computing ecosystem. As shown in FIG. 1D, the broker is adapted to control aspects of automated conversational flows that are established for one or more chatbots that operate within in an enterprise. The chatbots can interact with users through a computerized chat session (where each message is a new utterance string), or through voice (e.g., using a voice-to-text mechanism to convert the voice instructions into utterance strings).

The broker is adapted to flexibly utilize different natural language processing agents (though potentially different natural language processing connectors) to encourage various types of behaviors of the automated system, such as increasing an accuracy of responses (e.g., for a client-facing query answering chatbot), reducing costs associated with each interaction (e.g., for an internal IT chatbot), selecting the agent having the most fulfillment capabilities, among others.

An interaction manager may control a number of conversation sessions with various endpoints, and may also establish audit logs for tracking performance, or iteratively updating a user profile following or during a discussion. For each user or type of user, a user profile can be tracked, and as described in various embodiments below, can utilize specific types of data structures that are periodically updated to reflect new biases and weights that impact how the routing and orchestration system of the broker interfaces with the various natural language processing/natural language understanding agents.

The data protection plug-in is a data process that is used to first sanitize the utterance strings by removing or replacing specific tokens in the utterance string before providing to the orchestration system. This is important, for example, in situations where natural language processing agents utilize encountered utterances as training sets for generating future responses—where data is sensitive, it is important to sanitize the utterances before providing into a conversational agent (and then de-sanitize them when responding to the user). The data protection plug-in identifies, from the input strings, sensitive query tokens that need to be redacted or sanitized (e.g., payee names, account numbers). The input strings are first transformed into an obfuscated query string by replacing the sensitive query tokens with placeholder query tokens, which is then provided to natural language processing agents for intent detection to receive a response intent data object having the placeholder query tokens.

In another embodiment, the orchestration system itself is configured to conduct data protection iterations by utilizing a data protection/sensitive data tracking agent alongside the natural language processing agents (this can be conducted alongside the data protection plug-in to provide two layers of protection).

In some embodiments, in an initial pass for a new utterance string having an unknown level of data sensitivity, the orchestration system can be limited to only selecting between on-premises or local agents (as opposed to cloud-based agents).

The data protection/sensitive data tracking agent can be adapted to, for example, estimate whether a particular token of the utterance string is a sensitive word (e.g., an existing client name, a prospective client name, identifiable information for a client), and if so, become the "driving agent" insofar that the utterance string is modified to remove the sensitive information and then the modified utterance string can be re-entered into the orchestration system. The data protection/sensitive data tracking agent is a local, on-premises agent that can be configured for lightweight operation, returning high confidence scores based on a tiered lookup of sensitive terms obtained in a dictionary (e.g., clients, then potential clients, then potential associated company names). The data protection/sensitive data tracking agent can be trained for identifying sensitive information, and in some embodiments, may be adapted to also track typographical permutations (e.g., misspelled versions) of sensitive information.

The utterance string can use placeholders instead of sensitive information, and in some embodiments, the placeholders are unique so that they can be mapped back to the original information when generating responses for the user on an internal conversational flow. In this situation, the modifications are tracked, for example, by maintaining a lookup table of placeholders and sensitive information, which can be used to de-sanitize the outputs (e.g., swapping <TICKER> with the symbol of the stock of relevance in the conversation) prior to presentation through the chatbot interface.

Similarly, for coordinating conversations for use in an online banking environment, user names, account numbers, account nicknames may all need to be modified prior to provisioning to any public natural language processing agent. Accordingly, the modified utterance string can then be utilized by the orchestration system for routing against a full set of natural language processing agents, including public natural language processing agents as private information has automatically been removed.

This is particularly important where the public natural language processing agents utilize the utterances for training internal machine learning models, as it is not desirable to forge associations between sensitive information being used in utterances. A benefit of this approach is that cloud-based agents have much reduced operating costs relative to on-premises-based agents, and the use of a two-stage data protection mechanism may provide sufficient privacy protection to use cloud-based agents.

FIG. 1E, FIG. 1F, FIG. 1G, FIG. 1H, FIG. 1I, FIG. 1J area set of FIGS. 100E, 100F, 100G, 100H, 100I, 100J showing an example orchestration relating to natural language processing agent selection across a set of example utterances from a conversational flow, according to some embodiments.

These figures are meant to show an example conversational flow having multiple utterances, and in this conversational flow, a specific domain agent is selected to be active based on a weighted average of confidence scores, weighted by a user profile (that can be trained or updated based on prior or similar interactions).

Figure 1E:
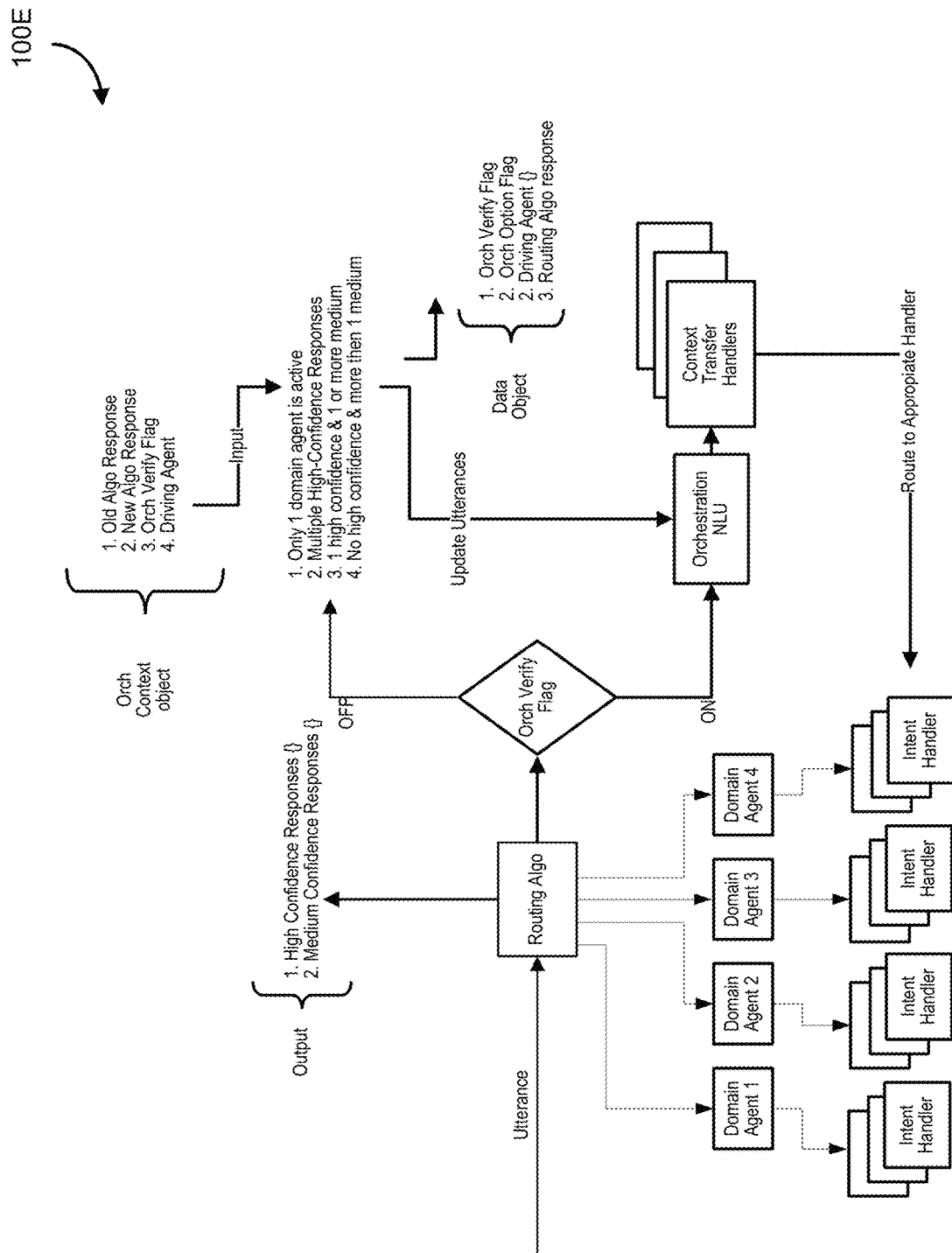
FIG. 1E, FIG. 1F, FIG. 1G, FIG. 1H, FIG. 1I, FIG. 1J are a set of figures showing an example orchestration relating to natural language processing agent selection across a set of example utterances from a conversational flow, according to some embodiments.

In this example, at FIG. 1E, the system is shown at diagram 100E. An orchestration verification flag may be utilized to track whether the orchestrator should be active in assigning a "driving" domain agent for a particular conversational flow (e.g., establishing a specific agent as the active agent). Each of the agents can be queried with the utterance to identify a confidence score associated with a potential output of the agent (e.g., a response). A higher confidence score indicates that the agent estimates that its response is likely the correct response to the utterance, and a low confidence score indicates the opposite. The confidence scores can be normalized to establish a baseline for comparison. In another embodiment, the confidence scores are established as individual categorization of tiered groupings, such as high, medium, and low, and each of high, medium, and low are assigned a different value.

The new utterance string is received, and can be routed, for example by sending an encapsulated message or data object to the specific natural language processing agent to either receive a confidence score (e.g., indicative of how confident the agent is in automatically generating a relevant correct response), or, if the agent is designed as a primary "driving agent", a string encapsulating the response from the agent, for example, generated using a machine learning model that establishes the next best word until a response is complete. The output response data structure encapsulates this response, and can be provided to the chatbot for downstream output.

After the primary "driving agent" is assigned, the generation of the response can further include an intent detection step, where a specific intent along with a confidence score is established for the new utterance, and certain intents (e.g., ResetMyPassword) can be coupled to fulfillment handlers, which are data processes that when, passed particular parameters and instructions, may automatically conduct certain tasks. In this example, the driving agent may confidently recognize that the user is asked for a password reset, and the response message may be "Your password has been reset, please check your email for an temporary credential that you may use alongside other account verification questions".

The driving agent may have invoked a fulfillment handler process daemon to reset the password. In another variation, the driving agent may be the correct agent for the task, but the instruction may not have confidently conveyed an intent (or there are multiple high probability intents). In this example, the driving agent may then automatically generate a verification question object to be posed to the user to distinguish between the multiple high probability intents or to increase a confidence score.

A number of verification questions adapted to distinguish between different intents can be generated ahead of time, or in another embodiment, may also be generated by the agent to maximize a differentiation between the different intents. In another embodiment, the choice between the different intents can be rendered as an interactive display or audible object that can be interacted with (e.g., click the correct intent, or an audio question asking the user to say one or two).

As shown in FIG. 1E, similarly, it is possible that there may be multiple high confidence responses from the various agents, and in that situation, the system may undertake a verification subroutine to obtain clarity from the user by asking a question used to disambiguate between the different agents.

For example, in an online banking example, asking to check an account balance may ambiguously mean account balances between many different accounts.

The confidence scores may be weighted based on various biasing factors, such as interactions tracked in a user profile (e.g., user has a tendency to lock an account because the user is forgetful about passwords, so there is a higher probability that the user is asking to have an account unlocked), among others. Other factors for modifying probabilities include a continuously tracked intent of the user (or multiple intents, depending on the capabilities of the agent), costs associated with the usage of particular agents, availability of agents, among others.

There may be multiple types of agents, including conversational agents (e.g., domain specific agents that are adapted to generate the output responses), contextual agents (e.g., agents trained to estimate the presence of certain types of information or types of conversation, such as sarcasm), and other agents adapted for specific purposes, such as tracking the presence of sensitive information. While the conversational agents can be utilized to generate responses to be put forward to the users, the contextual agents are utilized to assess aspects of the conversations and cause other types of functionality to occur, such as transforming the utterance and re-inputting the modified into the apparatus into the orchestration mechanism.

In a non-limiting example, a contextual agent may be configured to return a very high confidence score when sarcasm is noted (e.g., there is an incongruity between the user's statement if processed literally, and the user's intent as being tracked by the system). In this case, the contextual agent may be adapted to cause the routing of the utterance to be provided to it, and then process the utterance to modify the utterance to either remove the sarcasm (e.g., replacing the statement with the user's actual intent) or to flag the statement as sarcastic so that the conversational natural language processing agents have less difficulty in processing the statement. An example could be where a user is asked by the chatbot if they have a business banking account having an account balance of greater than $1 MM, and they respond "I wish" as the utterance string. The contextual agent can return a confidence value of 0.99 (as there is incongruity between the meaning of "I wish to do something" as opposed to not having something, replace the utterance string with "No.", and have the replacement utterance string re-routed into the system.

New utterances do not necessarily need to be received from users, in some embodiments, the system can automatically generate new utterances to be provided into the system for response generation (e.g., event triggered, or a hand-off between agents). The routing orchestrator is coupled to multiple different agents (in this example, domain agents, but they are not necessarily domain agents). The different agents may have different characteristics, and it is this divergence of characteristics that the routing orchestrator utilizes in generating improved responses for the user by selecting an appropriate "driving agent" for an automated conversation.

As described further herein, the system can be configured such that there may be multiple driving agents, each being associated to a corresponding user (e.g., in a multi-party example), or multiple instances of the orchestrator being run in parallel, each corresponding to a particular user and each assigning a primary agent for handling conversational flows for the corresponding user.

Figure 1F:
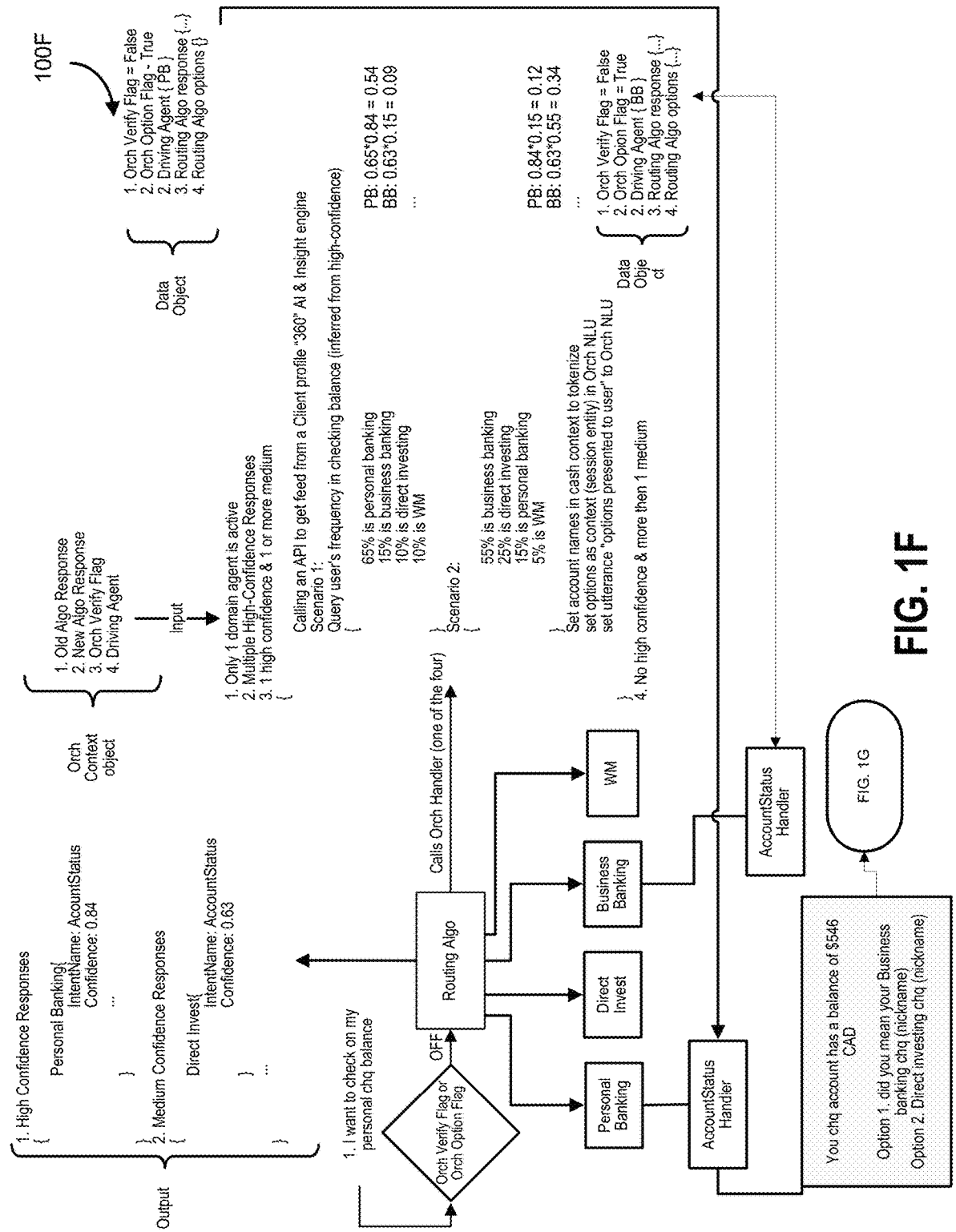

In FIG. 1F, at diagram 100F, a new utterance is received as a string "I want to check on my personal chequing balance". The routing system obtains confidence scores from each of the domain specific agents, and these scores are weighted against the user's frequency, for example, tracked in a user profile data structure.

The user profile data structure, in some embodiments, can be representative of a corpus of tracked interactions between the user and the system, or where a sufficiently large corpus of data is not available or not practical, a user profile data structure of a similar user or an amalgamated set of users to form a representative user may be utilized instead. In a non-limiting example, a machine learning model is continuously trained having nodes bifurcated based on different activities a user could take. For example, every time a user checks his/her balance or locks him or herself out of an account, a nodal interconnection weight is increased such that confidence scores from natural language processing agents can be weighted.

A profile data structure is a graph data structure having interconnected nodes can be maintained to have bifurcated interaction decision nodes having associated weight values. The nodes can be pre-defined based on possible interaction pathways and decision points, and may include more complicated interactions, such as loopbacks, etc. The interaction pathways can be adjusted in the model over a set of prior recorded interactions by the user or one or more similar users; and the graph data structure can be analyzed or traversed to obtain the one or more probability values. This graph data structure can be useful, for example, where a large number of interactions are possible and it becomes unwieldy to store them all for analysis. Rather, the model is updated with each interaction, and the record of the interaction can be discarded if a graph data structure is utilized.

The user profile data structure may further be utilized in the utterance strings by appending metadata to the utterance strings to improve a contextual processing of the utterance strings by the natural language processing agents. In a IT support chatbot context, for example, a user may call often to request help for remote desktop issues as opposed to CRM access issues, and the system can be weighted to bias towards remote desktop issue-based responses. As a user may change the focus of questions over time, in some embodiments, the weighting applied to specific paths may be capped at a threshold percentage (e.g., 60%) so that the system does not become overly rigid in routing.

The user profile data structure may also track attributes of data in a conversational flow with a user, and can be used by various contextual agents to modify the utterances to flag certain word tokens as sensitive, non-sensitive, or with labels (e.g., marking addresses, middle names), among others. The appended attributes, for example, could include a sensitivity flag, and where the user is using the chatbot in a public place (e.g., as denoted by an IP address), certain information may be withheld in the automated responses (e.g., the total amount of assets under management, how much money a user made or loss in the user's portfolio).

The orchestrator system is adapted to request the user's profile information or a representation thereof from a client profile AI and insight engine. In this simplified example, there are four domain-specific agents available, personal banking, direct investing, business banking, and wealth management, each having specific capabilities (e.g., connections to fulfillment handlers, specialized dictionaries, levels of sensitivity), and the routing mechanism first determines a driving natural language processing agent for response generation and to establish the conversational flow in an example chatbot.

The user's profile data structure is traversed and returns probabilities in the user's frequency in checking balance—65% personal banking, 15% business banking, 10% direct investing, 10% wealth management. These are weighted against the confidence scores of agents having high scores (e.g., 0.65*0.84, 0.63*0.15). In this example, personal banking is selected as the driving agent, which generates the response "your chequing account has a balance of $546 CAD). However, as other agents returned a high confidence score, the system can also generate the verifying question encapsulated as a message having the following options: "Option 1. did you mean your Business banking chq (nickname), Option 2. Direct investing chq (nickname)". These can be, in some embodiments, generated only for other agents having sufficiently high confidence scores.

In some embodiments, the domain-specific agents are (1) conversational agents that operate alongside other agents such as (2) contextual natural language processing agents and (3 user behavior tracking agents that are adapted to intervene and shift a bias of the system towards certain agents when conditions trigger it. Each of these agent types can be presented as viable options for the orchestrator system to select from (e.g., each return a weighted confidence score), but upon being selected as a primary driving agent, each of the agent types operate differently.

The conversational agents are configured to generate responses to the user's query (or the utterance), and can interoperate with fulfillment handlers to conduct various tasks. On the other hand, the contextual natural language processing agents can be configured to track problematic contexts present in the utterance strings, transform them (e.g., by removing or replacing tokens of the strings) for re-processing.

An example contextual natural language processing agent may be an agent trained specifically to track sarcastic or ironic statements, and return a high confidence score if such a statement or portion thereof is detected. In this example, the contextual natural language processing agents detect potential incongruities between an estimated intent and a literal meaning conveyed in the tokenized new utterance string, which the other agents may not be adept at recognizing (and thus the other agents return low confidence scores). Statements such as "I wish", for example, have significant contextual variations that can be difficult for conversational natural language processing agents to parse (e.g., is it "I wish to", or is it a sarcastic response to "Do you have an annual salary of greater than $1 MM").

The sarcasm/irony contextual natural language processing agents in this example can operate by tracking two intents, first, an estimated actual intent (e.g., through the rest of the conversational history) and a second, a literal intent based on a literal meaning of the words of the utterance, and track potential incongruities (e.g., estimated actual intent does not match the literal intent), and upon tracking such an incongruity, generate either a new utterance string by replacing any tokens not aligned with the estimated intent with tokens aligned with the estimated intent such that a literal meaning of the new utterance string matches the estimated intent or ask a verifying question to ascertain the literal meaning. In this example, "I wish" can be transformed to "No, I do not have an annual salary of greater than $1 MM".

A third type of agent includes user behavior tracking agents that are configured for tracking a set of pre-conditions, and upon determining that the pre-conditions are satisfied either in the new utterance string or in the profile data structure, insert biasing values to shift the one or more probability values. These agents are configured and trained to track, detect, and predict a set of user behaviors or activities, and upon determining that one or more trigger is active/satisfied modify the weightings to favor different driving agents or to add metadata flags to the utterance strings and have them re-processed. Additional metadata flags can include clarification metadata, information filled in from the user's profile (e.g., appending a name to "my son" if the system can unambiguously identify who that is), among others.

Figure 1G:
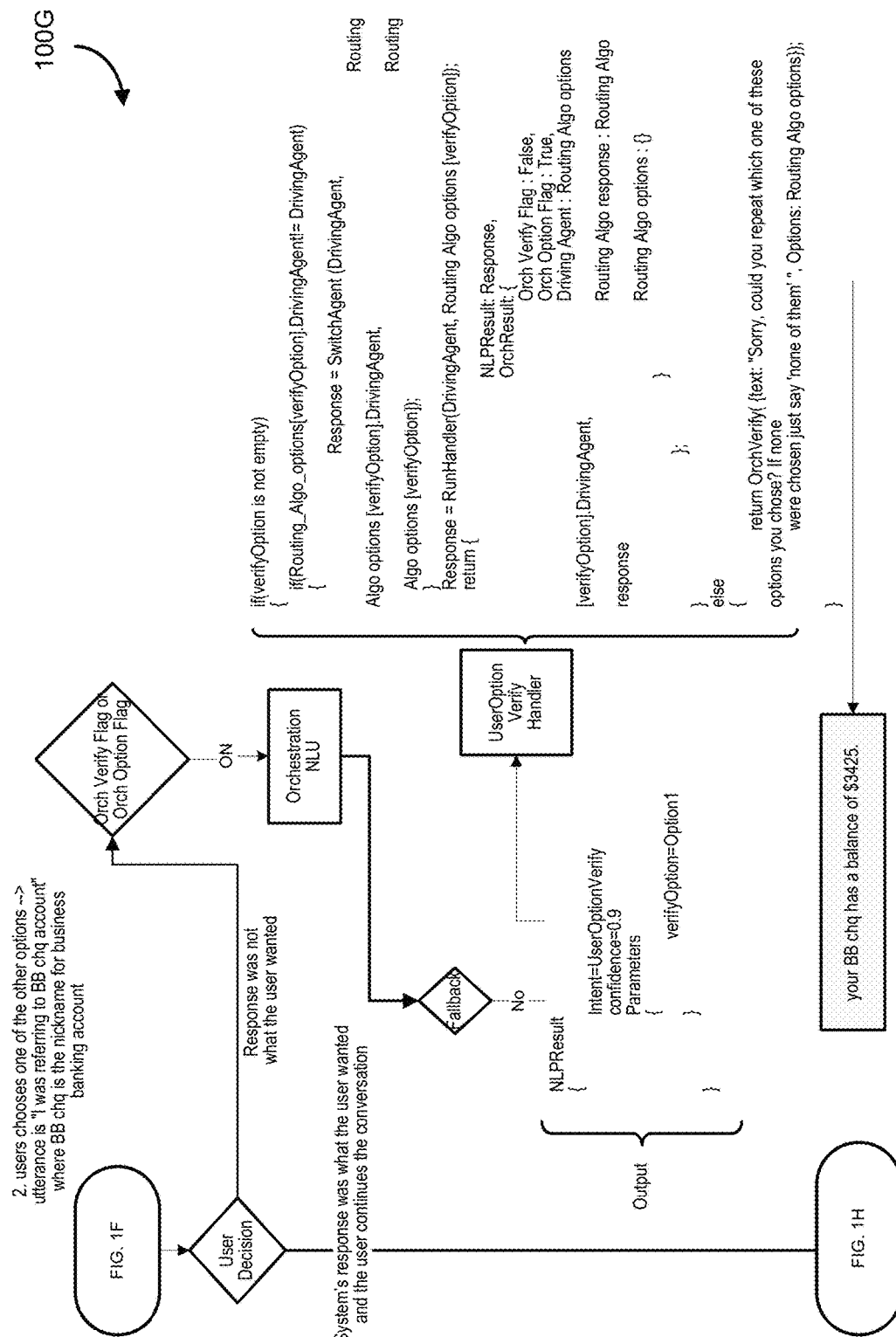

In FIG. 1G, the example continues at diagram 100G where the user selects the option "I was referring to my business banking chequing account", and the driving agent is changed to the business banking natural language processing agent. In this example, the business banking natural language processing agent then utilizes a fulfillment handler to obtain the balance, and returns a message "your BB chq has a balance of $3425".

Figure 1H:
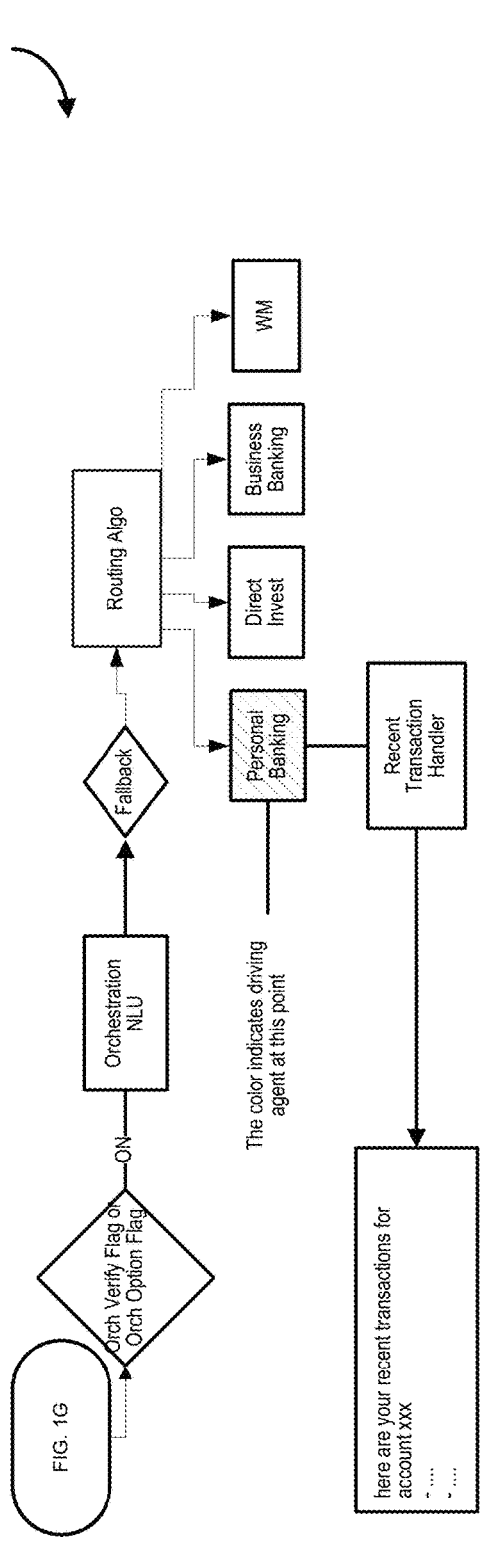
Figure 1H:
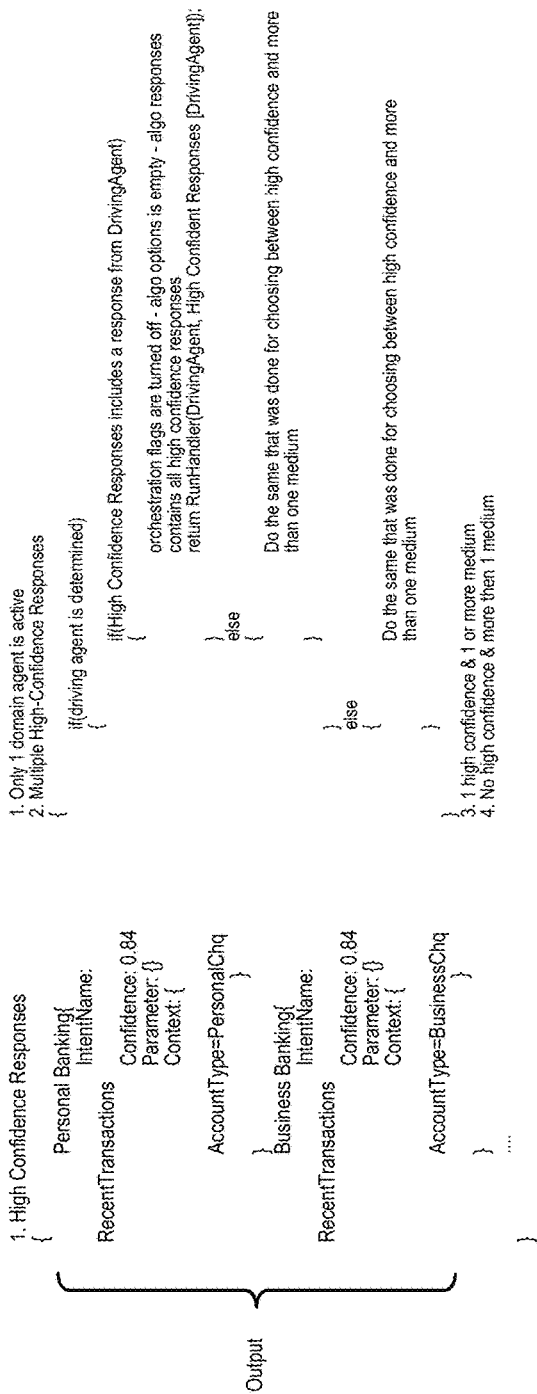

In FIG. 1H, the conversation continues at diagram 100H from FIG. 1G, where instead, the user did actually request the balance for the personal chequing account. The personal banking natural language processing agent, as the driving agent, receives a next utterance string from the user: "what was the recent transaction from that account?". The personal banking natural language processing agent processes the statement, and checks a confidence score, and as the confidence score is still sufficiently high indicating that the new response is likely to still be highly relevant, the personal banking natural language processing agent then invokes fulfillment handlers to obtain transactional information, and returns the transactional information in the form of a response message "here are your recent transactions for account xxx- . . . - . . . ".

Figure 1I:
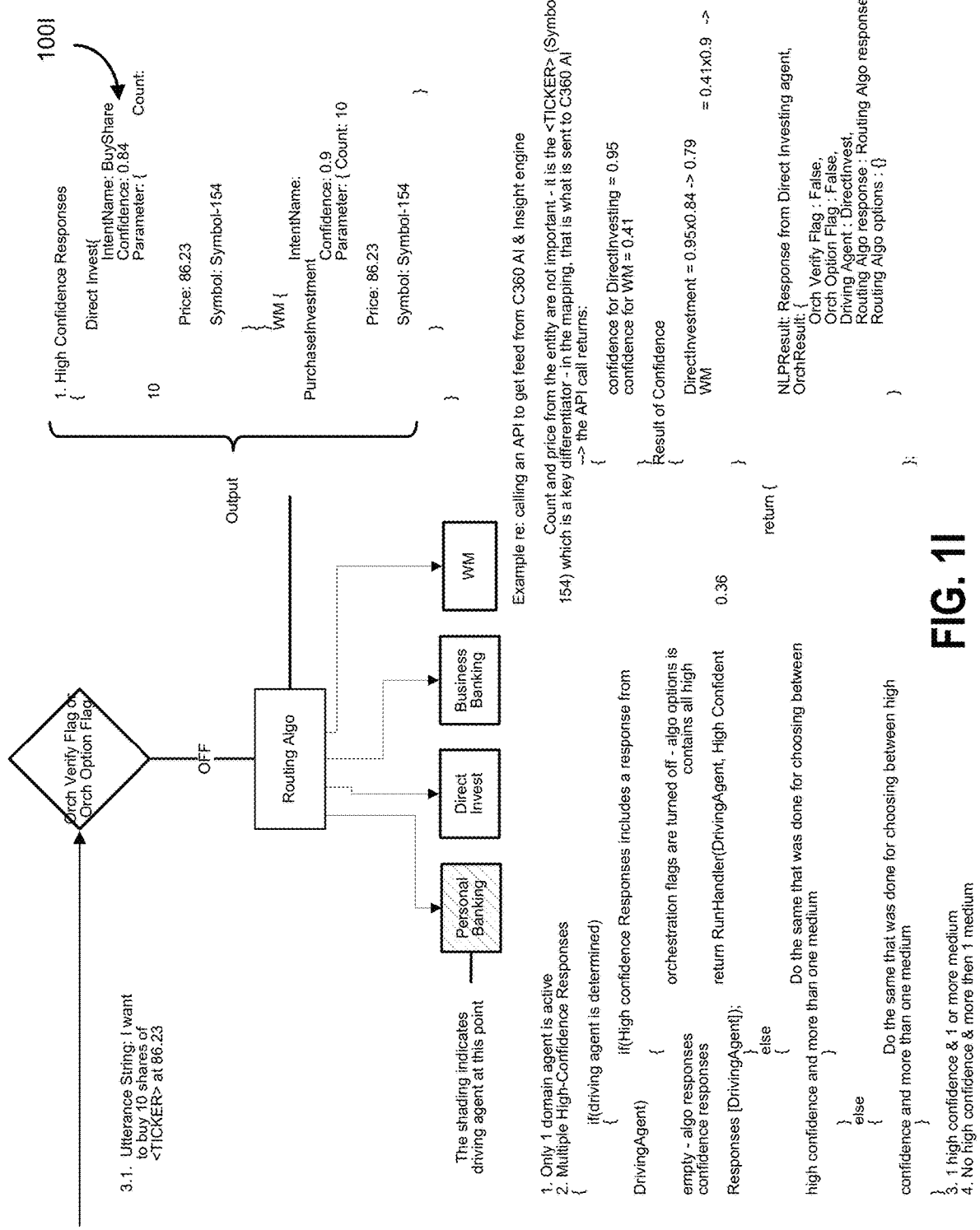

In FIG. 1I, in diagram 100I, a new utterance is received as "I want to buy 10 shares of RY at 86.23". The current driving agent is still personal banking, but the agent may change to the direct investing natural language processing agent or the wealth management natural language processing agent as high confidence scores are generated (0.84, 0.9, respectively) based on specific tracked intents (BuyShare, and PurchaseInvestment, respectively). In this example, the word token RY (which, in some embodiments, can be replaced by the placeholder <TICKER>. The user's profile data structure can be accessed through an API to return corresponding weighting values for each of these agents, and in this case, the direct investment natural language processing agent is established as the driving agent as its weighted score is greater than that of the wealth management natural language processing agent.

The system is configured for hand-offs between agents, where there is a generation of "a hand-off utterance string" for routing by a next iteration of routing by the automated conversation system. The hand-off utterance string can be shown or not shown to the user, and in some embodiments, may operate as a background process. The hand-off utterance can include parameters that provide all of the required information to ensure that the correct driving agent will be assigned and that the correct driving agent is able to handle the utterance request. Another type of agent-to-agent utterance can include sending information such as a scheduling of an appointment between one user to another user, such as when one agent instructs another instance of a date and a month of an appointment, what documents are required (e.g., proof of income), etc.

In the example above, the utterance can be generated between the personal banking domain specific agent and the wealth management domain specific agents noting, for example: "User would like to purchase 1000 shares of RY in a retirement savings plan, the user currently has $10,000 in a chequing account and can afford to purchase the shares without using a loan).

A benefit to using agent-to-agent utterances instead of agent-to-agent API messages is that the utterances can be parsed and understood by any agent technology as opposed to being locked-in to a specific API or agent configuration. The response generation mechanism of a conversational agent can be re-used to generate the agent-to-agent hand-off utterance.

For agent-to-agent utterances, a set of parameters may also be included in the utterances encapsulating mapped parameters that are being tracked by the current agent such that the downstream agent is able to pick up on a conversational flow without re-requesting information. For example, the parameters may include that the user is a high net worth individual, etc. In some embodiments, for a particular conversation, a number of parameters are being tracked from the utterances from a superset of parameters, and the most actively used or considered parameters may be transmitted as part of the agent-to-agent utterance. For example, there may be user parameters such as high/medium/low credit score, age group, education level, post code, etc., and for a particular conversation, not all are relevant.

Once a new agent is determined, the contextual parameters (contextual data object) that are applicable to the new natural language processing agent are transferred and set for consumption by the new corresponding natural language processing agent.

Similarly, in a multi-party conversation, the agents can be configured for generating a user-hand-off utterance string when having a conversation that switches users. For example, a chatbot may be handling a conversation where the user is an advisor and another user is the advisor's client. When the advisor's agent is instructed to request know-your-client information by the advisor, the advisor's agent may generate a user hand-off utterance that tells the user's agent to request information from the user. In some embodiments, there may be more than one user hand-off utterance, and the utterances may include further wording or metadata tags to help ensure smooth downstream processing of the agent-to-agent utterances. In the hand-off sequence, once a new agent is determined, the contextual parameters (contextual data object) that are applicable to the new natural language processing agent are transferred and set for consumption by the new corresponding natural language processing agent. This information can include, for example historical conversation details of the present conversational flow, among others.

Figure 1J:
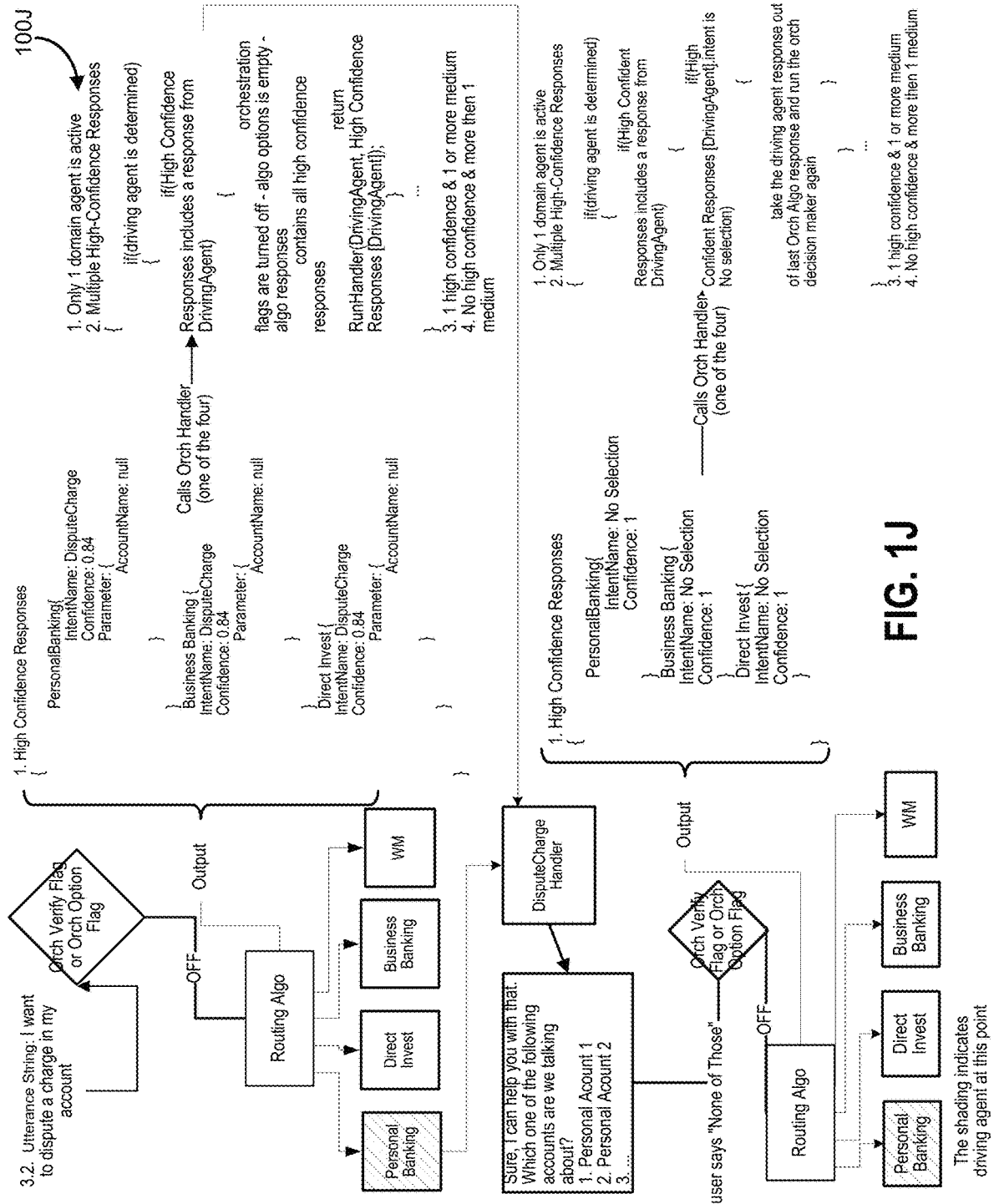

In FIG. 1J, in diagram 100J, a new utterance string is received where the user states that the user wishes to dispute a charge in an account. In this example, three different agents return a same confidence score as the statement is ambiguous. In this case, the orchestration system is configured to ask a verifying question to disambiguate which agent is being requested, or in some embodiments, the currently designated driving agent (e.g., personal banking) can be utilized by default to ask a set of questions to identify which account of the user's personal banking accounts is relevant to the disputed charge. If the user responses with "None of those", a further verifying question can be utilized to determine the correct agent for handling the question of the set of high confidence score related agents.

Figure 2:
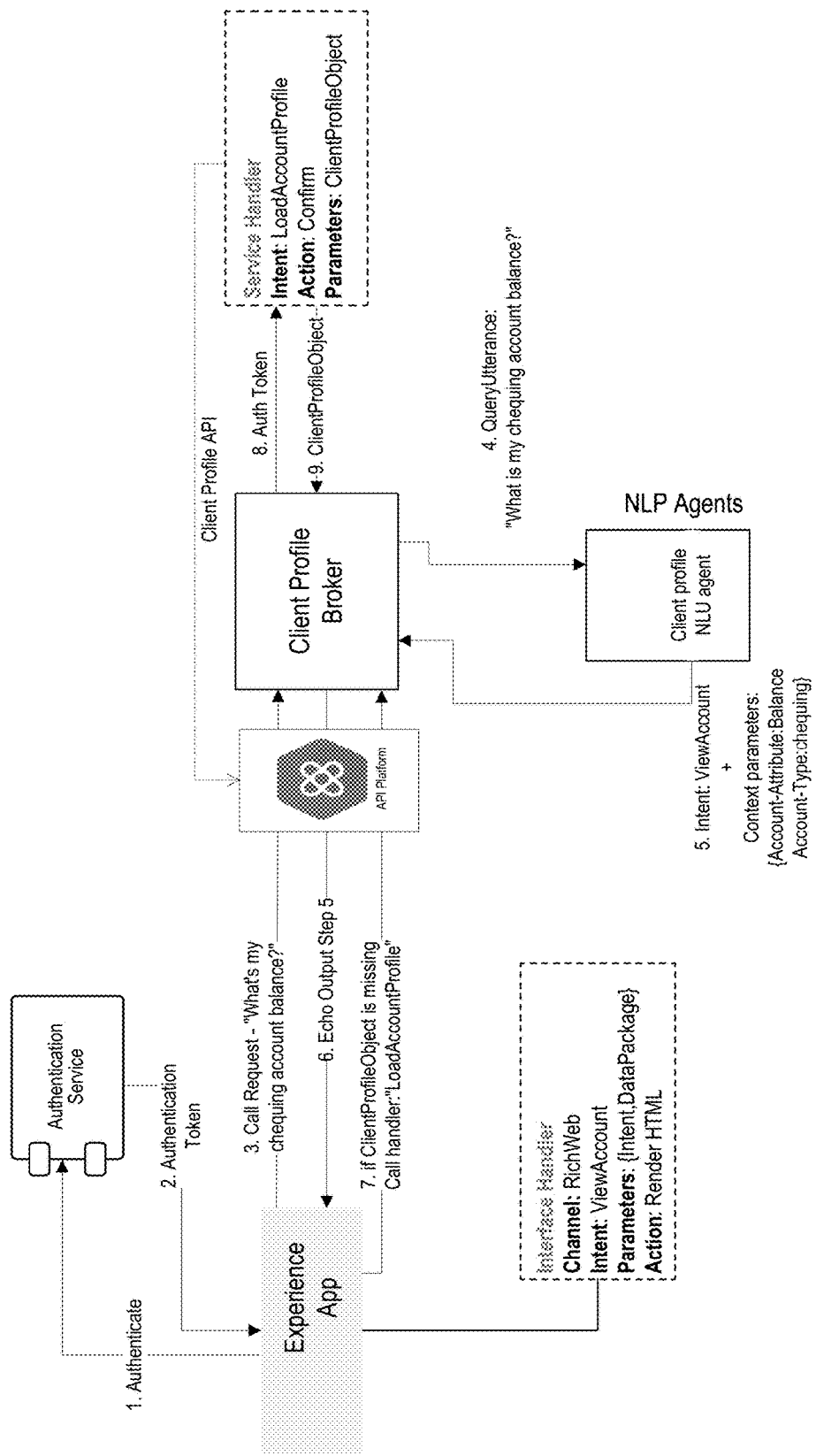
FIG. 2 is a diagram showing an overview of the steps of a conversation, according to some embodiments.

FIG. 2 is a diagram showing an overview of the steps of a conversation, according to some embodiments. FIG. 2 shows the system using the broker/handler process in respect of a client profile example.

In the example illustrated in FIG. 2, at diagram 200, a user query (utterance) is sent to the "query" endpoint but no fulfilment handler is necessary to view and navigate a client profile. Utterances can be provided in the form of text messages (e.g., over a phone), web/application interface messages (e.g., a chat session window), voice (e.g., using a voice-to-text conversion system).

However, if the client profile hasn't been loaded, a onetime retrieval of necessary information is required and achieved by running an ad-hoc action through the "action" endpoint. Depending on the experience design, one could also achieve this through an intent to "LoadAccountProfile" in which case there would be an intent fulfillment handler that would leverage the same logic (only use the "query" endpoint without the "action" endpoint).

NLP Connectors

Every broker setup will contain at least one NLP connector as part of its architecture. These connectors are, at their core, "drivers" that can connect and communicate with NLP engines such as Google DialogFlow™, Microsoft Luis™ IBM Watson™ or other API enabled NLPs. The connectors mediate the interactions between the internal services (broker/fulfillment handlers) and the NLP being used for conversational flow, allowing for the applications to communicate with external NLP services in a platform agnostic manner.

This is beneficial as it avoids a hard lock-in to a specific platform and enables fulfillment handlers to be used across the enterprise without any strings attached. Additionally, if the enterprise wishes to utilize an internally built NLU for certain services they could do so with little to no modifications. The internal NLU may handle part of a conversation flow or a complete conversation flow or an intent domain.

The NLP connectors provide the following functionality:
Intent Detection: Given a plain text query, detects the intent and returns the following information.
  1. Intent name
  2. Detection confidence
  3. Parameters extracted from the utterance
  4. Whether all required parameters have been found
  5. Whether the intent is a registered fallback
  6. Fulfillment text, if applicable
Session Entity Creation: Given a session id, overrides an entity definition with custom values for the given session.
Session Entity Deletion: Given a session id, remove an entity definition for the given session or all entity types that were set before.

Structure of the Broker Responses

Broker responses are a superset of the data returned from the intent detection done by an NLP engine. This is done to enable the addition of enterprise internal information as well as enable better context management for a conversation. By default, the broker response can contain the following:
  1. Intent name
  2. Detection confidence
  3. Parameters extracted from the utterance
  4. Fulfillment text, if applicable
  5. A data object which can be populated with additional information related to the recognized intent
  6. A metadata object which contains "meta" information about the detected intent and any fulfillment done for the intent. An example being that a fallback intent will be labeled as such.

Scalability Through Utterances

Figure 3:
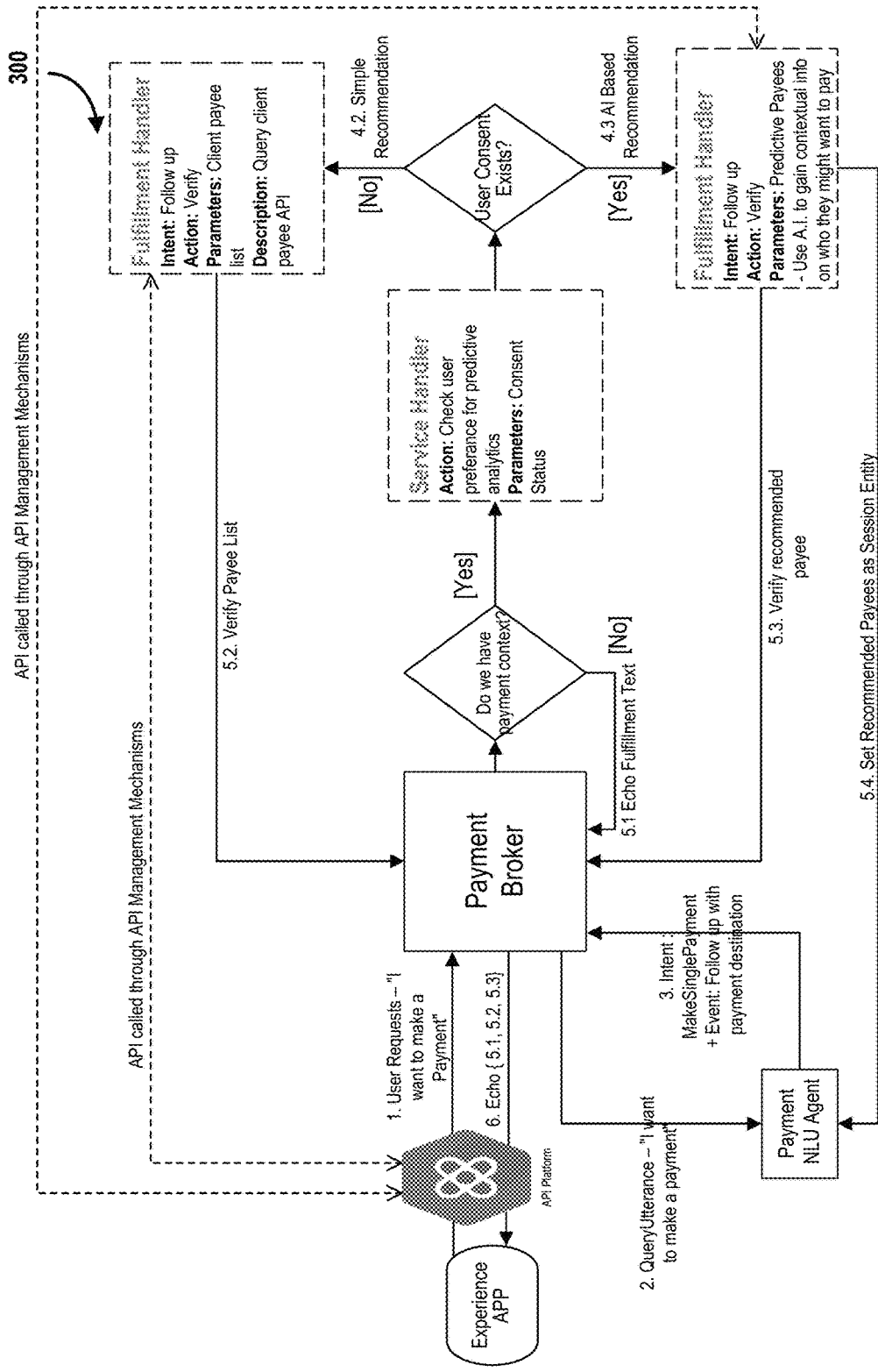
FIG. 3 is a method diagram that shows steps for this example setting payment context, according to some embodiments.

The scalability of these services is maintained by leveraging the built-in scalability of the NLP platforms and the session ID by which all conversations are tracked. Rather than holding context and state locally on the broker, session entities as well as loop-back utterances can be used to synchronize the NLU's current context with data provided during fulfillment. Two examples of this are listed below:

1. In this example, there is an agent which enables users to send payments to their registered payees. After receiving the intent to send a payment, the "send payment" fulfillment handler could populate a session entity on the NLU with nicknames for all registered payees. This entity would then be used to recognize who they would like to send the payment to in following intents. Because the entity is stored with the NLU, the broker does not need to retain any information on this transaction, and the client is free to resume the conversation with another broker if necessary. This flow changes slightly if the entity would contain sensitive information. FIG. 3 is a method diagram 300 that shows steps for this example setting payment context, according to some embodiments.

FIG. 3 also includes example of a service handler that is configured to personalize the experience according to the client's preferences, choices and terms of agreement.

The following benefits are provided in this example due to the decoupled nature of the platform, (1) personalizing the logic on recommendations (that are often driven by enterprise AI engines) does not require (significant) changes to the NLU or experience app.

Changes to this personalization logic is also managed and implemented independent of the NLU agent (and its expensive training data) and the experience app (that is often tied to the interaction channel).

This will increase speed to market in deploying recommendations and adding functionality (particularly for personalizing and customizing the experience) while it also reduces the cost of evolution and complexity of management. These enhancements in non-functional will result in better return of investment and higher customer loyalties. (2) Managing risk appetite, regulatory compliance, and enforcing enterprise policies in the servicing logic is separated from the rest of the experience, rendering lower costs of operation and risk management. This helps mitigate a significant barrier to entry and enables smooth operation both in short and long term. The benefit, although difficult to quantify, will translate into better return on investment.

In another example, a user wishes to access some data, but is denied access in the fulfillment handler. Normally this would lead to a de-synchronization of the conversational state, as the NLU would not have any indication that there was an authorization failure on fulfillment. However, the broker also includes the ability to create loop-back utterances to re-sync the NLU on failure. This is achieved by returning an utterance in the handler which the broker will redirect to the NLU agent and respond to the new intent data object accordingly. This conversation and its redirection is seamless to the end consumer and will be dealt with in appropriate conversational context as it will invoke a new intent with a pre-determined interface handler.

This feature will create superior experience for the consumer for handling exceptions created by applications. It enables seamless translation of such application errors to meaningful conversation intents that any party (whether application, an employee observing, or a client consuming) will understand.

Fulfillment Handlers

Fulfillment handlers are the foundation for the broker process's ability to securely handle and transmit sensitive data.

The most common question regarding the broker process and its associated fulfillment handlers is why does one need them when most major NLU's already have some kind of fulfillment built in?

The benefits are categorized in 4 groups:

Enhanced User Experience:

Decoupling the fulfilment from the NLP platform enables a single point of servicing to ensure consistent and desired tone and service. The single point for servicing will enhance the user experience, reduces the cost of evolution, and enables re-use of services (i.e., reduced the cost of development). The separation of concern also enables development of experiences by different team members reducing the cost for training every team member on organizational APIs and systems.

Enables personalization of the experience through flexible fulfillment logic without impacting the flow design and all components of the dialog system.

Protecting of Confidential & Flexibility to Enforce Security Controls:

The flow of conversational data into external systems (e.g., a cloud based NLP) is outside of the enterprise's control. As such the enterprise will lack the capability to enforce security controls at different stages of the conversation flow. For example, if a user were to enter sensitive or confidential information it is impossible to obfuscate or reject it, leading to possible data leaks to $3^{rd}$ party entities.

Fulfillment data could be forced to flow back through $3^{rd}$ party systems before being returned to the client application, meaning sensitive information could not be returned as part of a conversational turn or it will be exposed to other parties.

Easier Maintainability & Evolution:

Using built-in fulfillments would enforce an experience be tied to a specific platform. This harms the enterprise's flexibility in terms of future efforts and sharing of service components among teams.

Personalization and customization would require hard-coded API calls that will add complexity and may expose enterprise IP.

Using the broker process and its associated fulfillment handlers, the system 100 can avoid these pitfalls.

Fulfillment handler 114 structure and outputs:

A fulfillment handler 114 can be registered to one or more intents and is run directly after any of the intents are detected by the NLU. The functionality of the handler 114 is customizable, and can enforce authorization or data restriction needs according to the enterprise's risk appetite. Additionally, interaction with the NLU, such as session entity creation, can be done in the handler's body.

Restrictions come into play when constructing the outcome of a fulfillment, and must align to one of the below.

A successful fulfillment: The fulfillment handler 114 has run without issue and wishes to complete with a response to the user. The handler must specify the type of response (info, verification, confirmation, etc.) and can optionally include a data package which will be returned to the client through the broker.

A loop-back utterance: The fulfillment handler 114 needs to redirect the conversation and sends an utterance back into the NLU to reposition things accordingly.

A fallback utterance: The fulfillment handler 114 has encountered some kind of failure (authentication denied, service down, etc.) and needs to fallback the conversation accordingly.

Additional Benefits of Fulfillment Handlers

In addition to solving some of the downfalls of NLU-specific fulfillment, the broker's fulfillment handlers 114 also offer the following benefits.

Being internal to the enterprise, broker fulfillments can utilize a wealth of internal user information to add intelligence to a variety of interactions which would be deemed too risky to allow in a $3^{rd}$ party environment. Locational intelligence, transaction history, and more is all available for use in enhancing the personalization of a conversation.

Utilizing internal services allows for a higher fidelity of control regarding conversational metadata. This enables the services to interact on many channels, while constricting certain functionality only to official, secure channels.

For example, the system 100 may allow a publicly available conversational channel/interface (e.g., WhatsApp™) to be used for cursory conversation with a virtual mortgage agent, but only allow confidential discussion to happen on the official enterprise channels. This is enabled by the session management capabilities of the broker system 100 and can hand-off the conversation to a trusted channel (e.g., an enterprise mobile application). This broker setup 100 can add the relevant metadata to the conversation and key off the conversation to fulfillment handlers to generate a response that is communicated to the client in the safe channel. This would allow a seamless hand-off and continuation of conversational context.

The handlers increase maintainability and re-usability across the enterprise by decoupling dialog management from fulfillment. The decoupling enables adaptability to accommodate a range of enterprise policies and their update independent of the dialog system components (i.e., broker 100, NLU agent 110 & 112, and application interface 102 & 103).

Actions & Service Handlers

Fulfillment handlers 114 cover most use cases, as most data retrieval should be done lazily and only when required by the conversation. However, in an enterprise environment, there may be work with legacy systems that do not make such retrieval an option. Additionally, certain conversational flows may prefer that certain data be preloaded and then later parsed as the conversation progresses. The concept of service handlers is included to handle such requirements.

To begin, a description of why some embodiments prefer to use service handlers over other approaches is provided Shouldn't the client applications just fetch this data separately? Why have them make an additional hop through the broker service?

Currently, the main reason for the service handler approach is the ability to group data for a given experience under one service, in the hope that the experience development can be streamlined and kept consistent. Once the data is distributed among multiple services, there may be a risk of certain integrations breaking if those external services change and it becomes more difficult to track dependencies.

A hypothesis is that conversational design is already hard enough without the complexities of distributed data management.

Why not just add custom endpoints to the broker setup?
Why aggregate these data calls together behind a single endpoint?

Aggregation of data calls behind a single endpoint is both for consistency and for the ability to package functionality for use over multiple experiences. First, the current projection is that these brokers may be consumed by multiple client applications (similar to microservices). In light of this, a decision may be made to keep the surface area consistent to enhance ease of use when building these client apps. Additionally, by obfuscating these service handlers behind a single endpoint it is easier to package the functionality for use among multiple different agents across the enterprise (drop-in), preserving the same authorization patterns between all implementations.

Accessing Service Handlers

As mentioned earlier, service handlers are accessed through a POST endpoint that requires the following information.

The session ID of the conversation for which the handler is being run.
The name of the service handler to be invoked.
An optional data package related to the action being performed.

With these inputs, the service handler can fetch the data as well as interact with the NLU as applicable, such as to initialize session entities for future conversational turns. Contrary to fulfillment handlers, service handler responses can be constructed on a per-handler basis.

Log & History Management

Log and History management is important, especially those which interact with auditable information such as user preferences and actions. The broker process 100 takes advantage of being a basic API to enable already existing audit processes, while including accessible lifecycle hooks to take capabilities even further.

API Auditing

As mentioned above, the broker process is facilitated by a generic API layer. This is beneficial in that all interactions with a broker will flow through API gateways, allowing developers to use official processes on these services for logging off inputs and outputs.

Conversation Lifecycle Hooks

In addition to the official mechanisms, the broker process also provides a plugin system that enables a developer to act at various points in a conversational turn. This allows auditors to engage with information beyond just the pure inputs/outputs of the service and dig into exact internal actions. For example:

1. Query request comes into the API gateway and is logged.
2. Plain text query as well as the obfuscated query are added to the conversational history by a request lifecycle hook in the broker.
3. Intent is detected by NLU, this information is stored in the conversational history by a post NLU hook.
4. Then one of three things could occur:
 a. Fulfillment handler for the intent indicates that a loopback or fallback utterance is required, this is placed into the history by the hooks starting back at #2.
 b. Fulfillment handler for the intent indicates that a response is ready, this is placed into history by a turn completion lifecycle hook and the response is sent.
 c. No fulfillment handler is found for the intent and the more generic response is placed into history using the turn completion lifecycle hook. The response is then sent.
5. API gateway receives the response and logs the response.

This can be extended to other capabilities including output streams to entities such as a data lake or an internal conversation reviewer.

Human Review and Agent Improvement

These hooks are also useful for improving agent interactions over time. Rarely will an agent be flawless on first execution, and human review is essential to agent improvement.

Routing and Orchestration

The above feature set assumes that independent agents are relatively simple, but many assistant experiences depend on the ability to feature a larger knowledge-base. NLU models are known to degrade in proportion to their size, so how does one enable complex experiences in this environment? The broker process seeks to alleviate this problem through the concept of a routing broker.

Routing Broker Processor

The routing broker incorporates a group of small, domain-specific brokers to deliver a complex experience without the complex conversation models. Routing can be accomplished through two methods.

1. The routing broker initially forwards a query to all associated brokers and selects the broker which returns the highest confidence rating.
2. The routing broker contains its own "introductory" agent which assists it in selecting which domain is correct for the user. This solves the non-domain conversation spaces as the introductory agent can be equipped for small talk before delivering the user to a domain agent.

FIG. 7 illustrates an example flow for this implementation. The routing (introductory) agent may be configured use a wide range of capabilities including but not limited to 1) an NLU agent, 2) historic conversations, 3) personal preferences and choices, and 4) deep learning recommender agents. The combined use of these components and the broker's capability in orchestrating their usage in real-time will increase the confidence of the routing broker in order to understand the domain for the incoming utterance. The agent is adapted to continuously improve and learn from historic conversations. The routing broker will provide flexibility in leveraging each of these recommenders at different points in time and that is a unique foundational capability.

Domain Switching

Routing with either of the above methods is simple from an introductory standpoint, but there will be instances where a user wishes to switch during an ongoing conversation. The routing broker handles this by scanning the responses of a domain agent for fallbacks.

On fallback, the routing agent may be configured a few different ways.

It may allow the domain agent's fallback response to flow back to the user, asking them to retry.
It may attempt to understand the query using its own introductory agent and ascertain whether a domain switch make sense.
It may redirect the user to connect to a human for the remainder of the conversation.

A combination of the above approaches are used intelligently to create a seamless routing experience for consumers. The intelligence refers to use of artificial intelligence to personalize and predict based on the particular user the next path for the conversation.

Distributed Context Management Through Utterances

Using multiple domain agents adds new complexity in terms of how context should be managed when switching agents. In the single agent approach this was not an issue, and loop-back utterances were sufficient for resyncing agent context according to internal state.

The answer lies in the use of utterances, but instead of loop-back utterances, the system 100 can use cross-domain utterances to cross-pollinate context between agents.

In an example embodiment, on each agent, the system 100 stores some general information about the client. The client starts by being routed to Broker A, whose generic client context has a few values populated over the course of the conversation.

Broker A then begins to experience fallback, indicating that the client is speaking about something outside its domain.

The routing broker analyzes the failing query and understands that the client should be routed to Broker B, and uses an introductory utterance template for Broker B to initially populate its context from the values in Broker A.

The client then may speak to Broker B without repeating their information, creating a seamless handoff between the agents.

For this to perform seamlessly at scale, a standard understanding of contextual parameters across different brokers and their relationships to one another is required. This information is stored as part of the broker and intent definitions managed by the enterprise intent repository.

Session Management

Having the broker services decoupled from their NLUs puts the system in a position to handle sessions in a distributed manner, enabling a "pick up where the user left off" approach across enterprise systems.

Streamlining Data Handoff Between Systems

Let's take an example of a two broker system, a general information broker (Broker A) and a broker specific to recommending mortgages (Broker B).

A user begins their conversation with Broker A and inquiries about mortgages and how they are handled. Broker A gathers some information about the user to personalize the responses it provides and saves this information off into a session entity internal to the enterprise systems.

A week later, the same user begins a conversation with Broker B about requesting a mortgage. Broker B reads the session information saved off by Broker A and is able to fast-forward the conversation accordingly, removing the need for repeat data entry by the user.

Broker A and Broker B could be running with completely different NLU implementations, but due to their abstraction they can each interact with the session information in exactly the same way.

This example isn't limited to broker systems, but could also be used to pre-populate web forms or other data entry formats. The broker architecture allows custom code to be provided in the enterprise's ecosystem and completely removes the NLU tie-in which often reduces reusability. This will enable the organization to create superior experiences through a series of brokers with session management capability that is otherwise difficult to create and expensive to maintain and evolve. Aside from the expenses, storing such information with a 3rd party entity would have privacy and compliance concerns that will expose the organization to additional risk.

Enabling Omni Experiences

This could also apply in circumstances where a single conversation may need to bridge between multiple experiences. For instance, a conversation could begin on a built-in phone assistant which might provide general, non-sensitive information to the user. However, should the user request a sensitive output, it may be desired to have that information delivered in a secure channel (company mobile app, secure messaging service).

This could be accomplished in multiple ways. One approach would be that the same broker service serves both the phone-assistant and the secure channel, meaning the same session id could be used to bridge the conversations.

Another would be similar to the examples above where session information is registered on hand-off and then re-accessed when the new experience is begun. Overall, the system maintains a high amount of flexibility in approach to these situations and can create seamless transition experiences regardless of the client/NLU implementations.

Multi-Party Conversations

The proposed approach multi-party conversations using the broker concept is superior to alternate approaches as it significantly reduces the AI complexity of the NLP and solves it at a different level depending on the use-case.

Data flow occurring through the broker service allows multi-party conversations to be leveraged. This could make sense in a variety of different scenarios.

User A is chatting with Broker B but requires step-up authorization for an action. Once this is recognized, the broker transitions User A onto a call with Employee C to do proper verifications.

User A is chatting with Employee C on an online chat about recommendations for a product. Employee C works at a business leveraging a broker to augment their employee's knowledgebase in real-time. Each message sent to Employee C is also sent to a broker and analyzed, providing real-time information related to User A's queries to Employee C.

User A is chatting with Broker B about information regarding a mortgage. Midway through the conversation, User A announces they would like to speak to someone about finalizing a mortgage arrangement. Within the same chat experience Broker B begins a socket session which connects User A with Mortgage Agent C and begins rerouting their messages to the agent instead of the NLU.

Broker A can use sockets for communication with its clients. User B is chatting with Broker A and asks a question which requires a rather large data fetch. Broker B monitors all of its fulfillments, and knows that this fulfillment is rather lengthy. To compensate for the wait time, the Broker itself initially responds with the user asking them to be patient while it works on fetching their data, and later returns the data when it is able.

Multi-Party Conversation

As NLU technology improves, further use-cases are enabled by the broker system 100:

The broker services may utilize sockets to accommodate multi-intent or multi-turn utterances.

A routing broker could be used to coordinate conversation with multiple users at once. An example case would be two business partners desiring to jointly make actions that require both of their sign-off.

Figure 4:
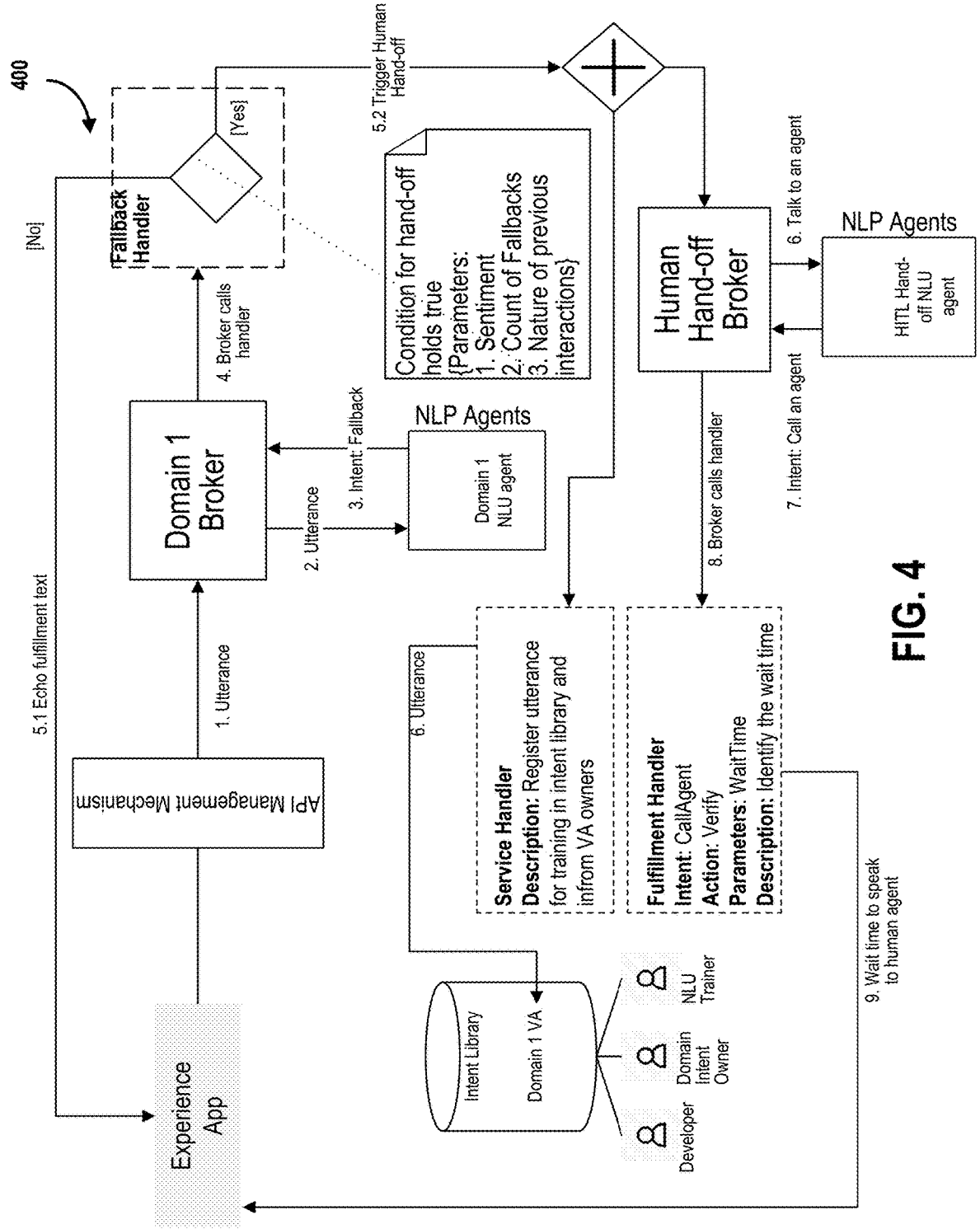
FIG. 4 is a diagram Illustrating an example flow for brokering conversations between human agent & consumer, where there is a multi-party conversation, according to some embodiments.

FIG. 4 is a diagram 400 Illustrating an example flow for brokering conversations between human agent & consumer, where there is a multi-party conversation, according to some embodiments.

Enabling Multi-Language Support

When dealing with multiple languages, a language specific NLU often outperforms a translation of the language to English and usage of a general NLU agent. To support using multiple languages, the broker will leverage two patterns:

1) the language is specified in the application by the user and is passed over as a parameter to the broker which will determine the particular NLU and fulfillment handlers that are associated to the language (there is a possibility that the flow of conversation will slightly defer for the same intent from one language to the other). Changing the language in the middle of the conversation in this mode may be detected by (through a fallback) and the user will be prompted to verify the change.

2) A routing broker exists that detects the language and orchestrates the conversation similar to the approaches taken for orchestrating between domain brokers.

If the broker detects a language with no corresponding NLU, it can attempt to use translation services to and detect the intent based of the translation of incoming query. Enabling or disabling this feature will be up to the experience designer or may be left to the user's preferences and choices.

The support of multi-language conversational experiences by the broker that enables both translation based NLU and language specific NLU while using the same business logic and code to fulfill the intent will result in a) faster time-to-market through re-use, b) superior experience through language specific NLU, and c) lower-cost of development and maintenance due to lower complexity (the complexity is handled at the orchestration layer by the broker).

Testing

One last advanced use case enabled by decoupling NLU's from the core experience is the ability to compare performance in a particular domain.

Currently, it is possible to test conversational agents through their APIs, but it is often difficult to run the same test suite against multiple NLU implementations due to the differences in their request/response schema. As the broker system interacts with an NLU through a generic abstraction, the system 100 can compare implementations against one another to discern which may have the edge in a given topic.

AB Testing Plug-Ins

This also allows A/B user testing in a production space. In a scaled environment, some brokers may run with one NLU and others with a competing implementation, giving the development team real-life data on which NLU has a better engagement score.

Evolution and User Testing

Designers will need to make changes to the flow of conversations. It is important to be able to test new designs with groups of users before it is released. The broker will enable testing part of a flow, a complete flow, or a complete agent with a selected group of users. Feedback from each flow being tested and type of users who were routed to that flow is available for retraining and re-designing the agent. The ability to customize the test groups and flexibility to define test groups is instrumental in building hyper-personalized experiences for consumers. This is used to evolve agents and understand which flows of the conversation works best for which groups of clients.

Some NLU agents or NLP platforms may outperform other NLU agents (or NLP platforms) in understanding the intents related to a given domain. The broker is superior to current implementations in that it trivializes the comparison of multiple agents for a given domain. Once the relevant domain flows have been translated for all agents, comparison of the agents is as simple as changing a configuration value on the broker.

Security

Protecting Sensitive Data

Sanitization/obfuscation of data at rest is a consideration, and the broker use case is adapted such that in some embodiments, data is sanitized in real-time and in a contextually aware manner. As this sanitized data is being analyzed by an NLU for intent, the approach cannot be satisfied with simple opaque tokenization, but rather, a "smart" tokenization to retain the intent behind a user's query may be utilized instead.

It should be noted that sanitization is optional, and as the field matures and more internal/on-site NLPs are generated the need for sanitization will most likely be reduced. Many implementations of NLPs are cloud-based, so sanitization is useful to enable full use of these services.

Sanitization of User Queries

The placement of the broker enables two kinds of user query sanitization: rejection and tokenization. Rejection is rather simple, if sensitive data is detected (credit card number, account number, etc.) the query can be sent back with the caveat that certain information should be removed. This however leads to an inconsistent experience where a client may have to repeat themselves, which is something it is good to avoid.

The other approach, tokenization, works but requires context-aware values to be used in place of the sensitive data. A broker's sanitizer cannot, for instance, replace an email address with a string of numbers (112435) because the NLU will no longer adequately be able to discern that the user gave an email address. Instead, the broker system must replace email addresses with something that also looks like an email address.

The broker leverages the second approach for sanitization by allowing for a sanitization "hook" to be added at the front of the conversation. This hook can be run before the NLU sees the query, obfuscating any sensitive data, and then again after the NLU returns, restoring said data before handing off to a fulfillment handler. This retains the sensitive data internally for use while withholding it from external services. The hook also provides a single placeholder for keeping logs of the conversation reducing the attack surface (against any cyber-attacks) and simplifying security controls (hence reducing cost). This may, for example, be superior to alternate approaches where Another superiority—data is stored across different components of the dialog system while in this example embodiment, only the broker memory and downstream API have access to the sensitive data.

Figure 5:
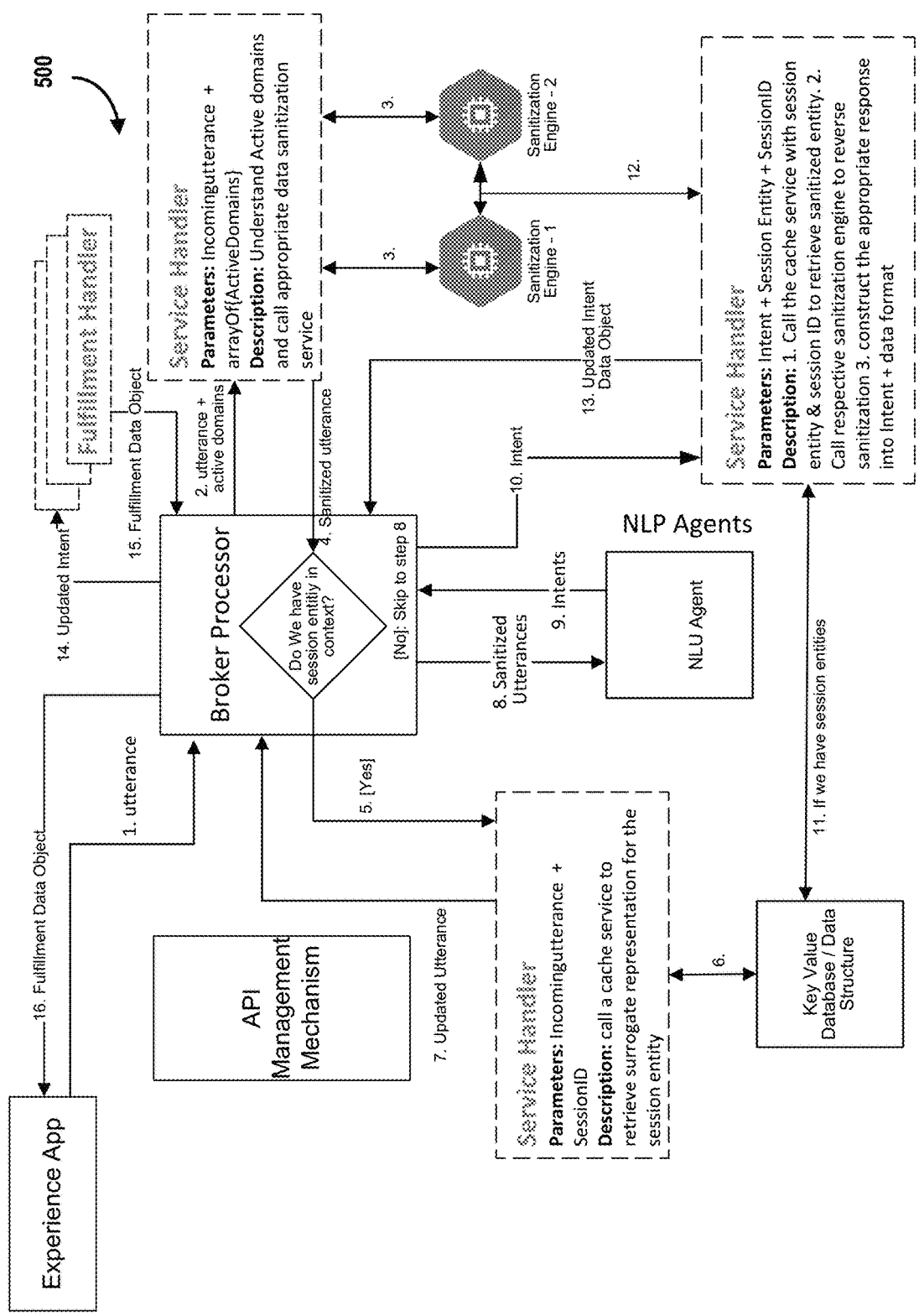
FIG. 5 is a data flow diagram illustrating an example sanitization process, according to some embodiments.

Outside of requiring contextually aware replacements, the broker can be agnostic in terms of what kind of service is used for sanitization. Teams are free to use whichever rules engine or AI algorithm best fits their domain to secure conversations. The following figure illustrates how session specific and non-session specific sanitization is performed on the data:

FIG. 5 is a data flow diagram 500 illustrating an example sanitization process, according to some embodiments.

Sanitization of Session Entities

The other type of sensitive information in NLU is session entities. These entities are session-specific words or phrases for extracting from a statement. As they often contain highly personal information, it is important that these values are obfuscated in some manner, and the system 100 can leverage the same contextual obfuscation used with user queries.

Because the system 100's fulfillments are local to the broker, the system 100 can run any entities through the input sanitizer and obfuscate as needed. These value obfuscations can then be stored alongside any obfuscations made for the current query and be restored along with them as well.

Maintaining Scalability when Sanitizing

It should be noted that when sanitization is required, some amount of the broker's statelessness will be lost in order to maintain scalability requirements. The recommended approach would be to utilize a secure caching mechanism to maintain these values in between conversational turns.

Authentication & Authorization

As the broker is an API, authentication/authorization flows stay somewhat standard for the broker service itself. However, the architecture provides flexibility and control in securing fulfillments.

Enabling Modular Authorization

Each fulfillment handler stands alone, and can describe its own set of authentication/authorization rules. This opens the broker to modularizing an experience based on incoming channel or any other contextual parameter.

For instance, maybe it is desired that a single chat experience be opened to a public chat service, like WhatsApp™ or Facebook Messenger™, but also have specific actions that are restricted to a more secure environment, like an official mobile app. The broker service can manage this behavior by using query meta data, for instance only allowing restricted actions if a valid App Secret is provided with the query and otherwise triggering a request for the user to move to an alternate, more secure channel (for example, a channel adapted specifically for trust in transactions).

Step-Up Authorization

The internal nature of the broker service and fulfillments also has the added benefit of enabling step-up authorization. Certain actions, especially in spaces handling personal data or sensitive transactions, may require additional side channel authorization before committing a change request. As the broker service is located internally alongside enterprise systems, it can securely communicate to these systems when such additional authorization is required. It can then access these systems to see when an action has been cleared or whether it was declined when seeking to do follow-up fulfillments.

The following diagram illustrated how authentication and authorization is handled in a flexible manner using the broker as a middleware platform.

FIG. 6 is a dataflow diagram 600 provided to Illustrate an authentication & authorization process, according to some embodiments.

Storage of Evidence

Hand-in-hand with authentication/authorization is the storage of evidence related to authorized actions in the system. As mentioned previously, the broker system 100 can be built with the expectation that logs of a conversation will be streamed to external services and persisted. This should cover the majority of audit cases, but for specific instances where logs are not sufficient, the broker service can also create custom audit trails for specific actions by again leveraging fulfillment handler custom logic. Similar to the authorization logic above, broker fulfillments are able to access conversation history as well as the metadata associated with each turn and then transform these into whatever audit trail may be required.

Interface Handlers

Interface handlers, or how client abstractions are created for fulfillments done by the broker system are considered in this section.

Client Interface Reusability

Figure 20:
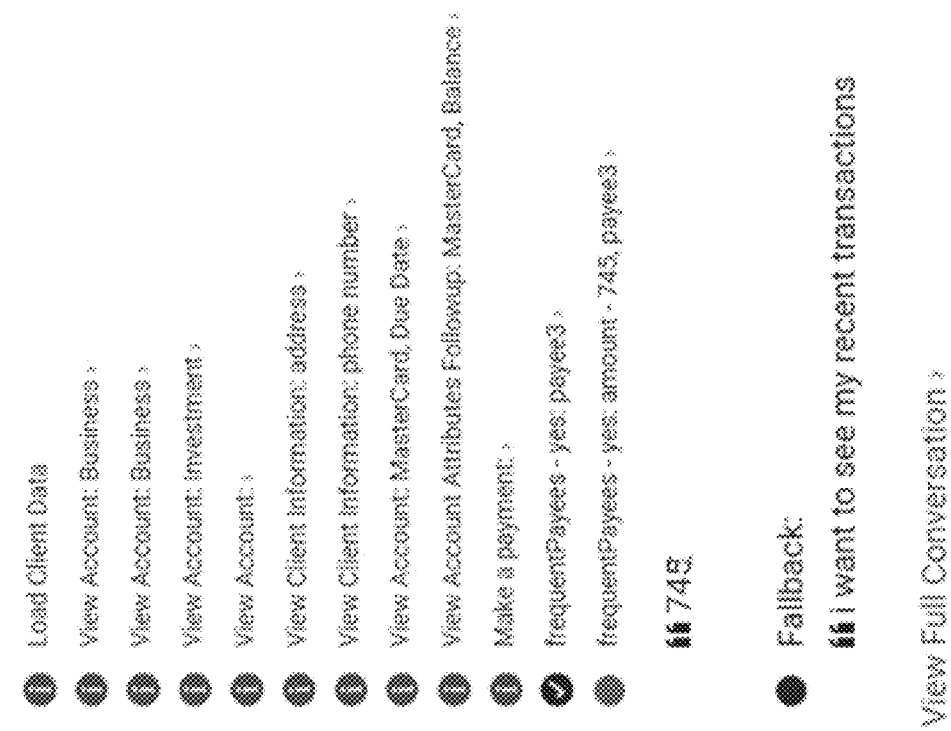

A benefit of packaging generic response objects regardless of the NLU utilized is the ability to create reusable UI pieces for various intent fulfillments. These could range from basic cards to interactive layouts, all reusable across experiences, whether it's a client chatting in an app or a developer reviewing a conversation. All with the added benefit of being transferrable to new experiences utilizing different NLU backings. FIG. 20 is a screenshot that depicts one of these interface handlers re-used in an advisor experience.

Interface handlers can have the ability to render the data appropriately to the mode of conversation (e.g., chat, rich web-chat, voice, and etc.) giving experience designers and users flexibility to choose and hop from one mode to other as they see fit.

The system can be adapted to create interfaces for interactions that do not yet exist within the organization, for example, video, augmented reality, virtual reality and other immersive experiences all without changing any of the other components of the system related to NLU integration, fulfillment handlers etc.

Component Libraries

As the number of conversational entry points grows, this also enables components to be built specifically for each experience and reused as necessary across groups.

FIG. 7 is a dataflow diagram 700 provided to show example flows that can be provided to different domain-specific broker engines, according to some embodiments. In FIG. 7 a number of different domain specific NLU agents are coordinated for routing through the routing broker processor.

FIGS. 8-17 are screenshots 800, 900, 1000, 1100, 1200, 1300, 1400, 1500, 1600, and 1700 extracted from an example conversation flow, according to some embodiments. These screenshots are generated based on a working prototype implementation prepared by Applicants.

Figure 8:
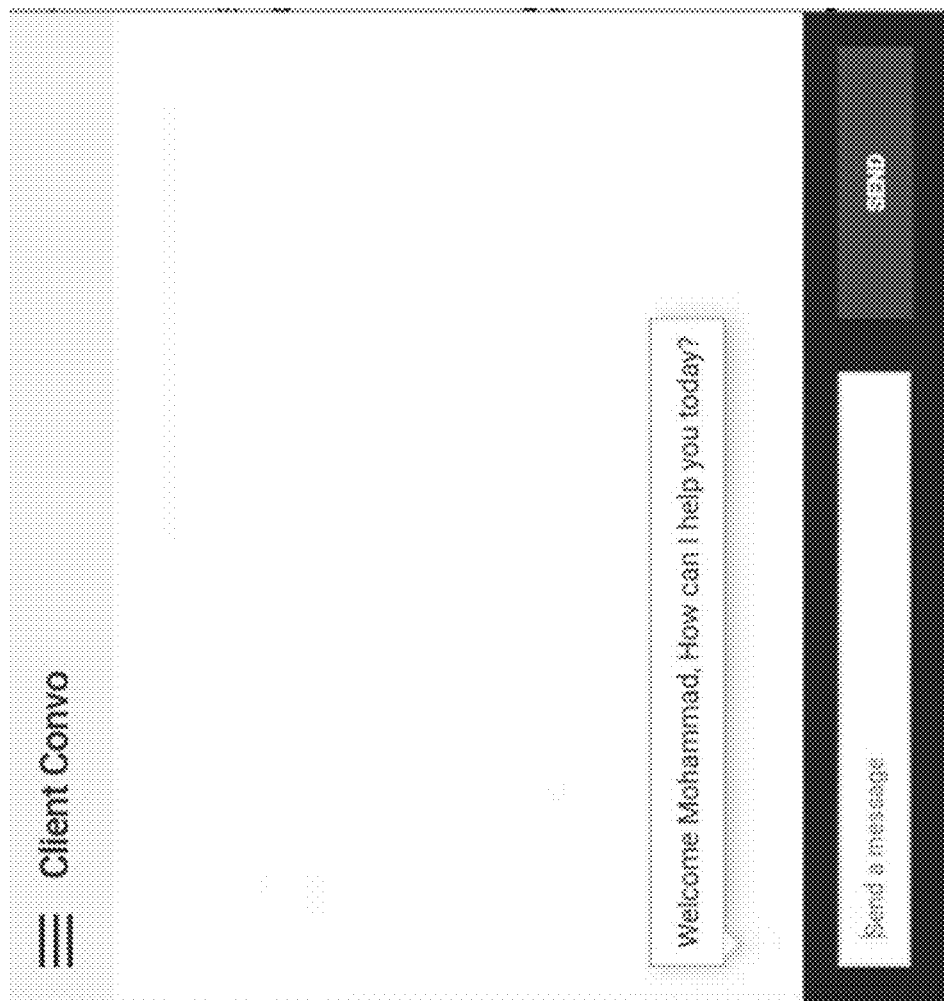
FIGS. 8-18 are screenshots extracted from an example conversation flow, according to some embodiments.

In FIG. 8, an initial message is sent to initiate the conversation. In this example, a user named Mohammad is having a conversation with the automated engine.

Figure 9:
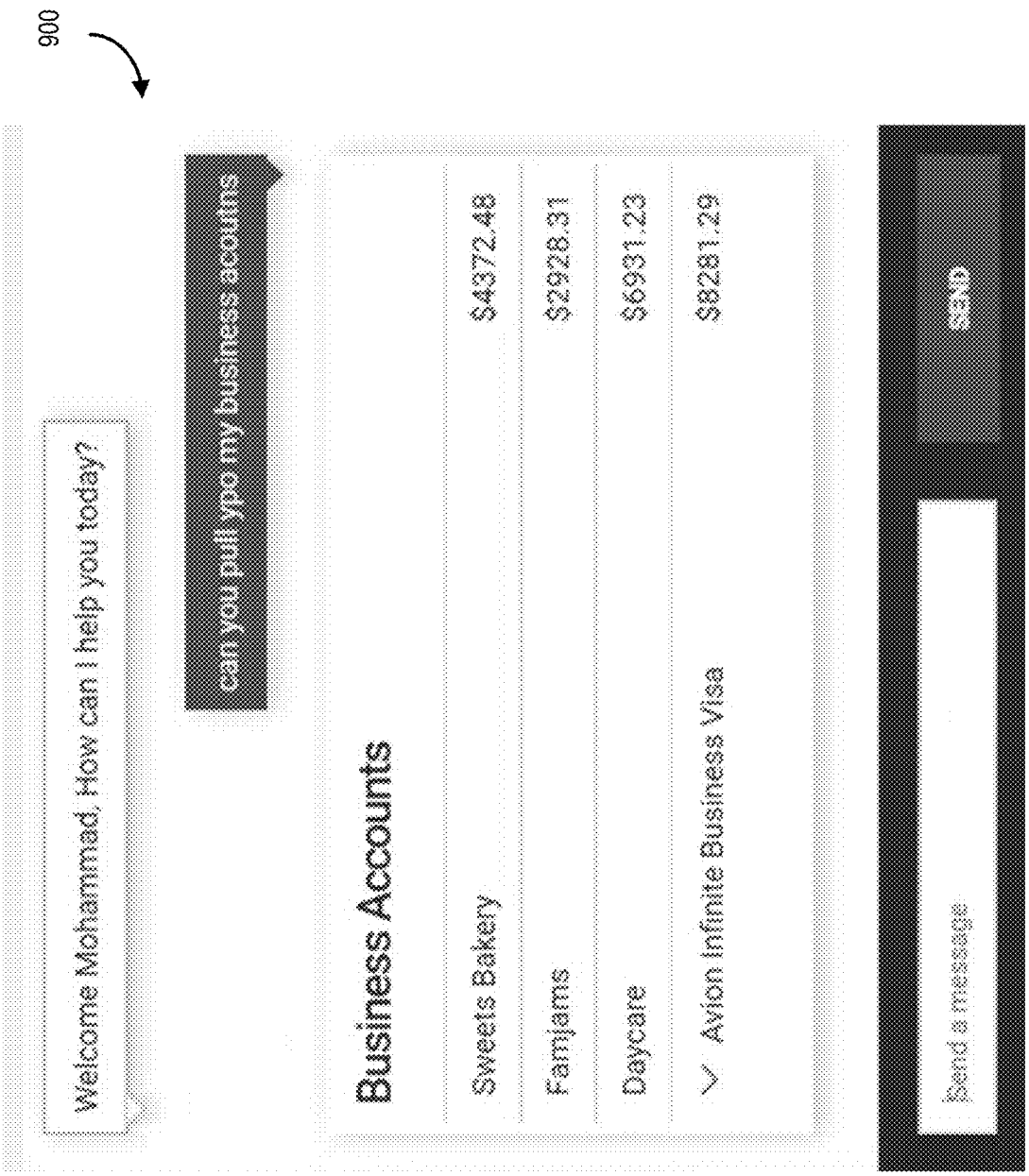
Figure 10:
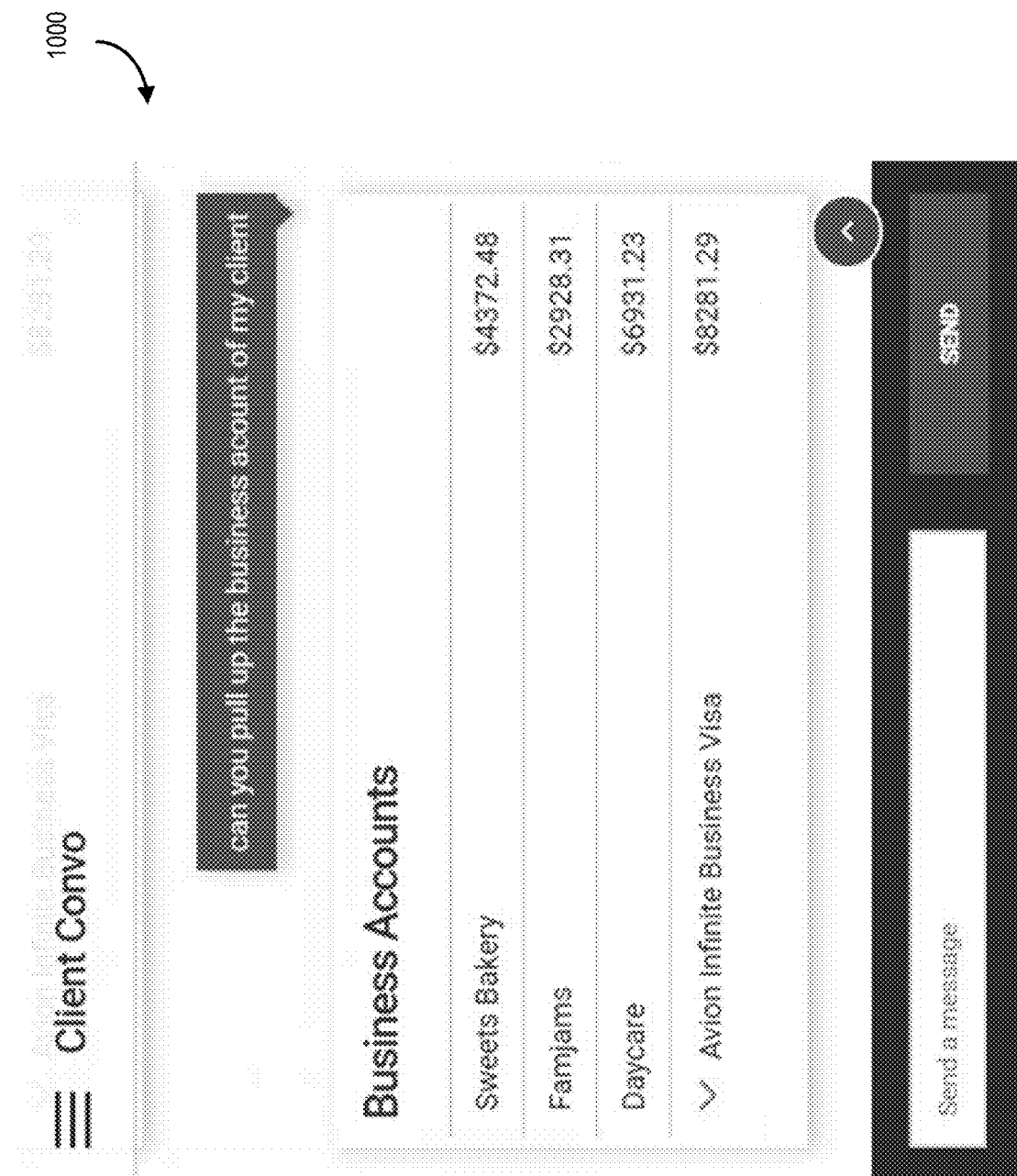

In FIG. 9, the user sends a malformed text string. As he is already authenticated, the system recognizes his intent and provides a listing of different business accounts associated with the user. In FIG. 10, the user sends an alternate version of the same request, and the same information is shown. The term "my client", in some embodiments, can refer to a pre-set client (which can be used by an employee e.g., a wealth advisors).

Figure 11:
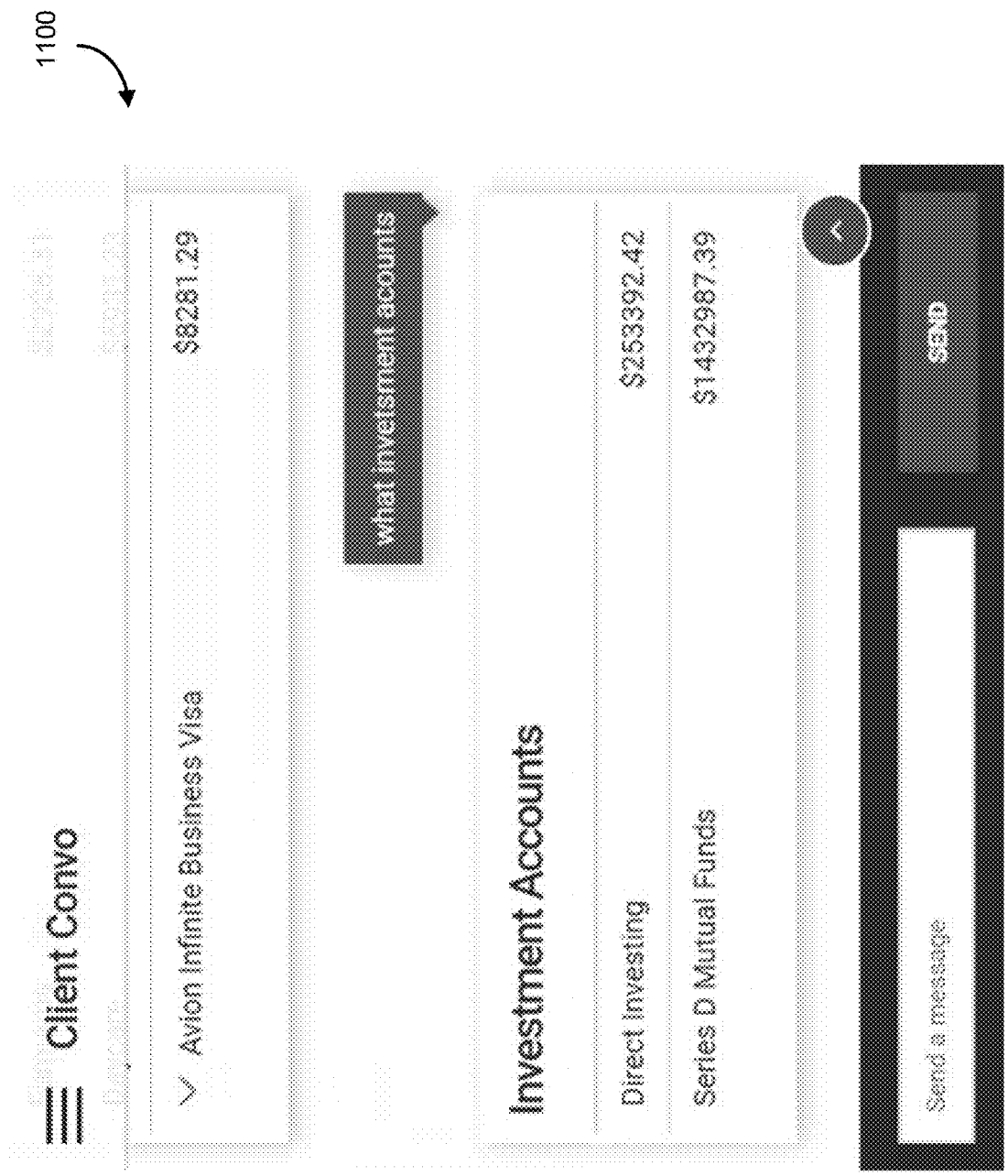
Figure 12:
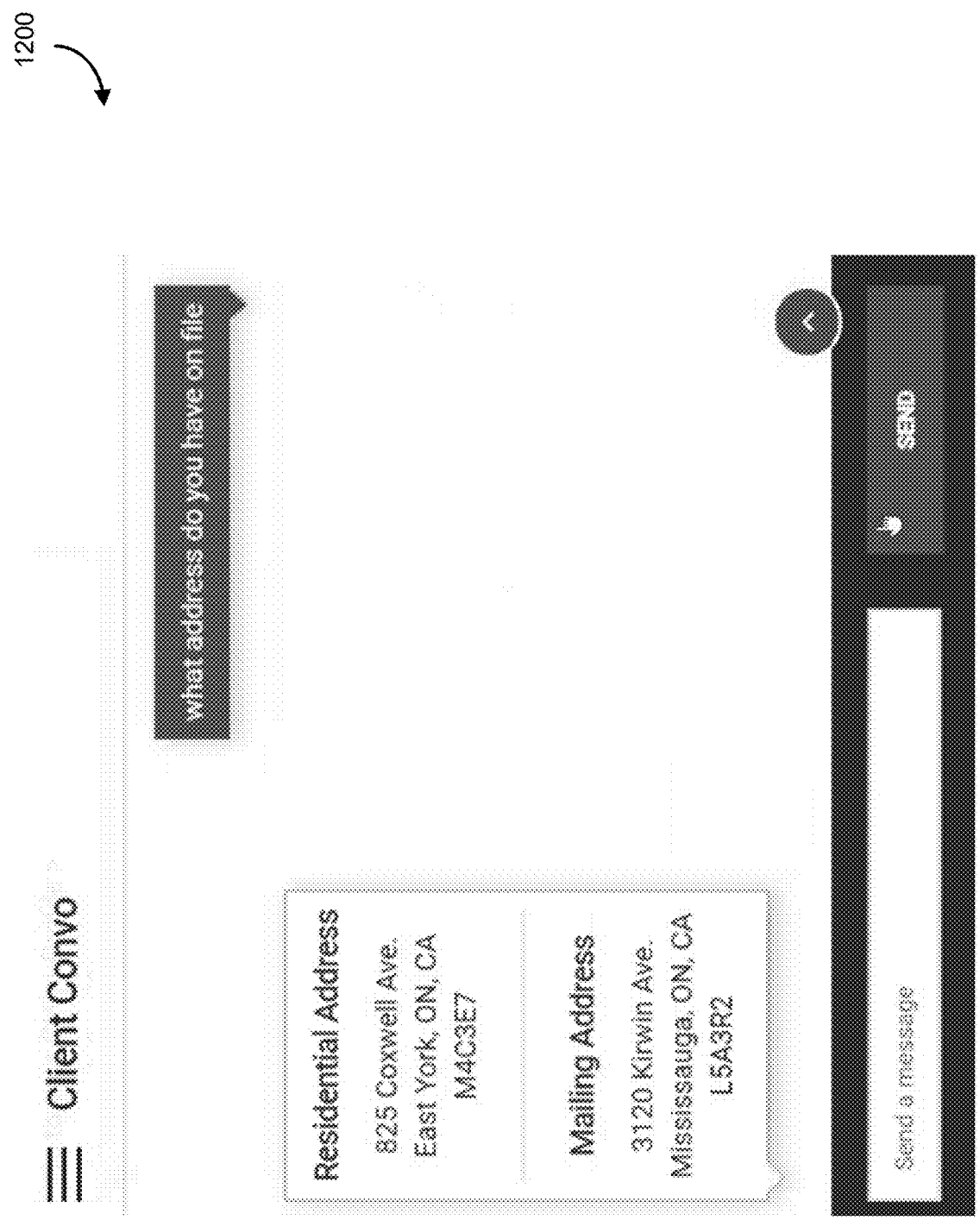
Figure 13:
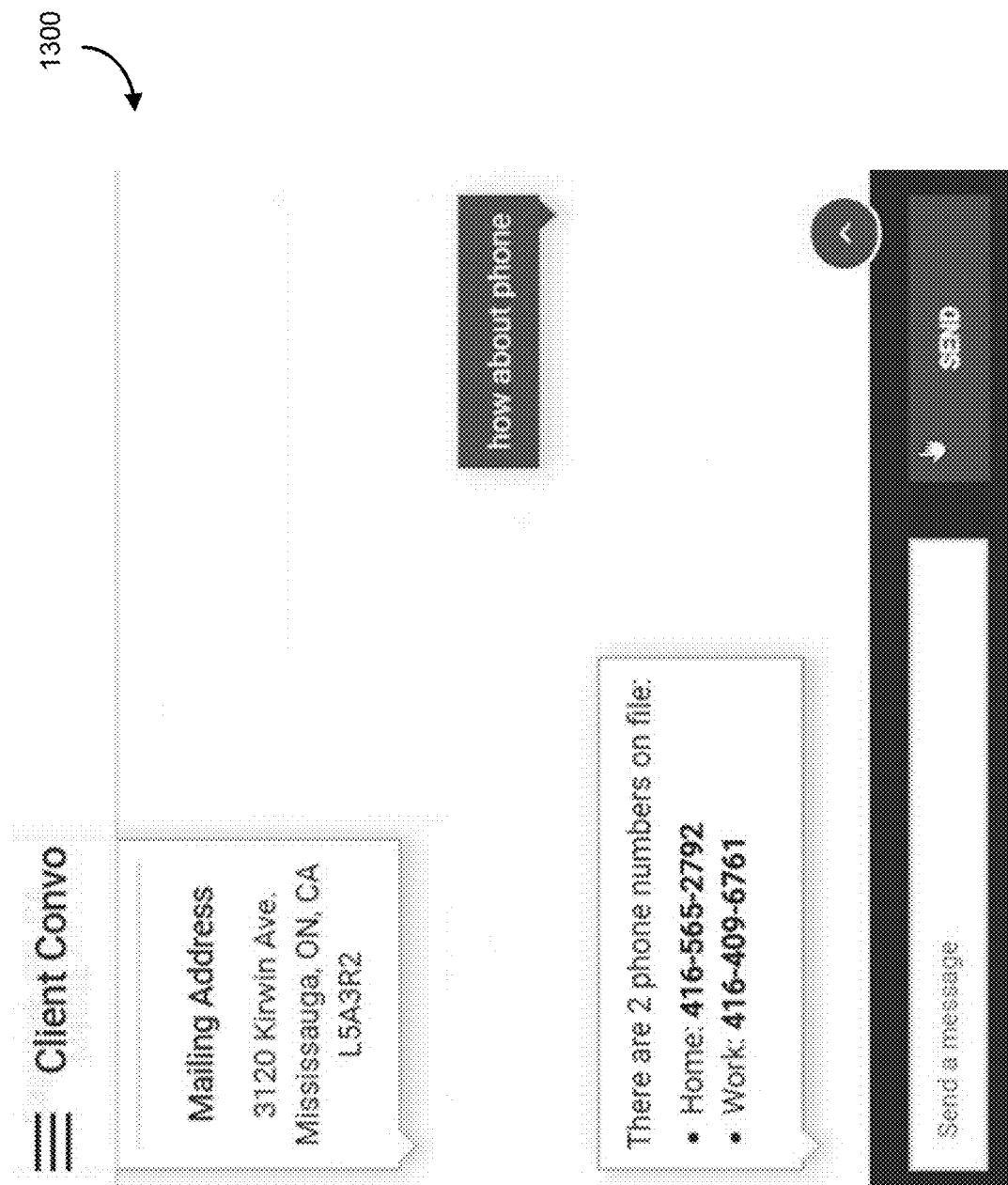

In FIG. 11, the user submits a query in respect of investment accounts, and these are shown in the generated response. In FIG. 12, the user submits a query in respect of addresses on file. In FIG. 13, the user submits a query in respect of phone numbers (ostensibly of those on file, which is picked up from the context of the last question asked in respect of addresses on file). The information reviewed in the above states were never passed to any $3^{rd}$-party provider (e.g., the NLP platform in this example is provided by Google DialogFlow™).

Figure 14:
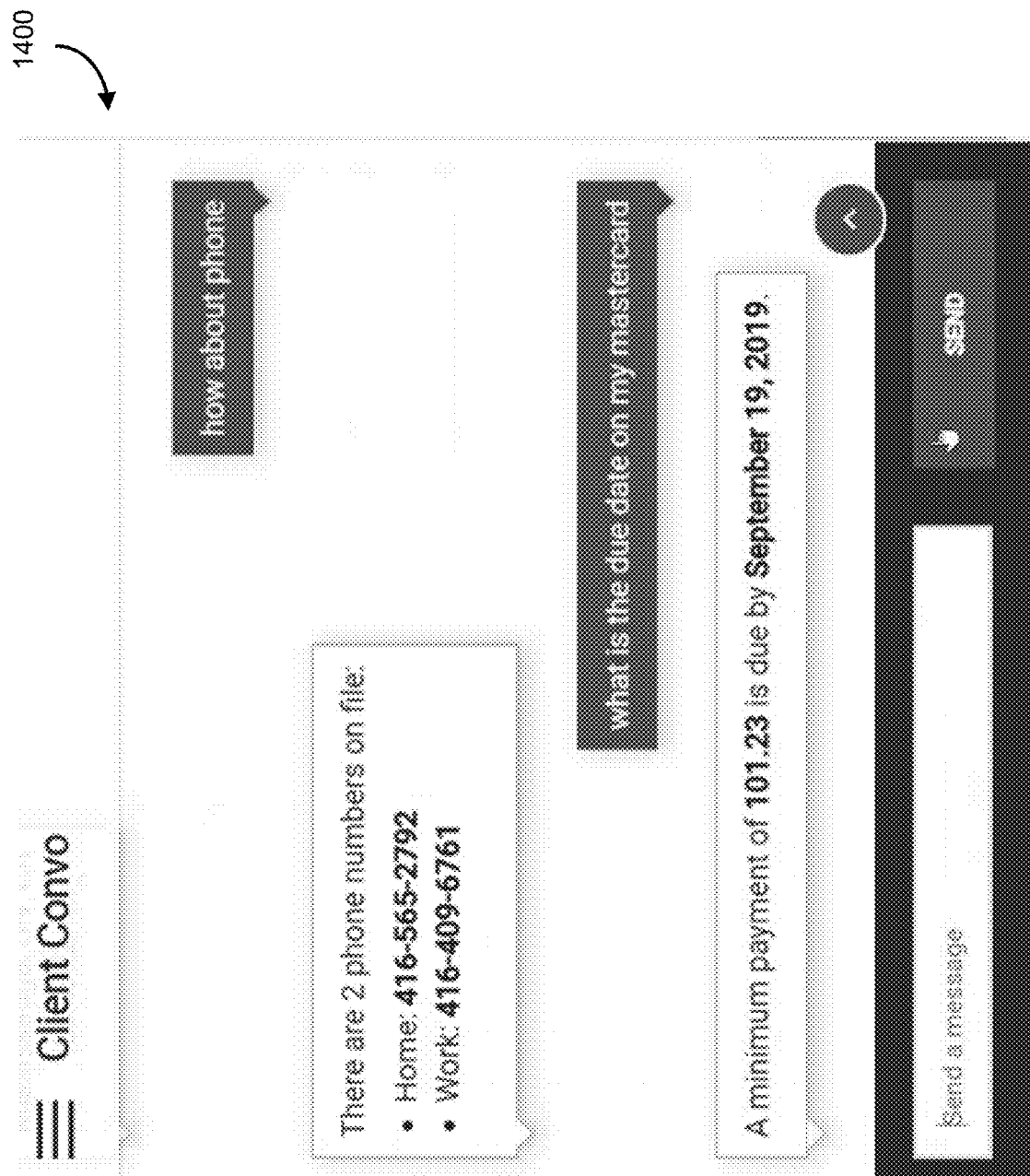
Figure 15:
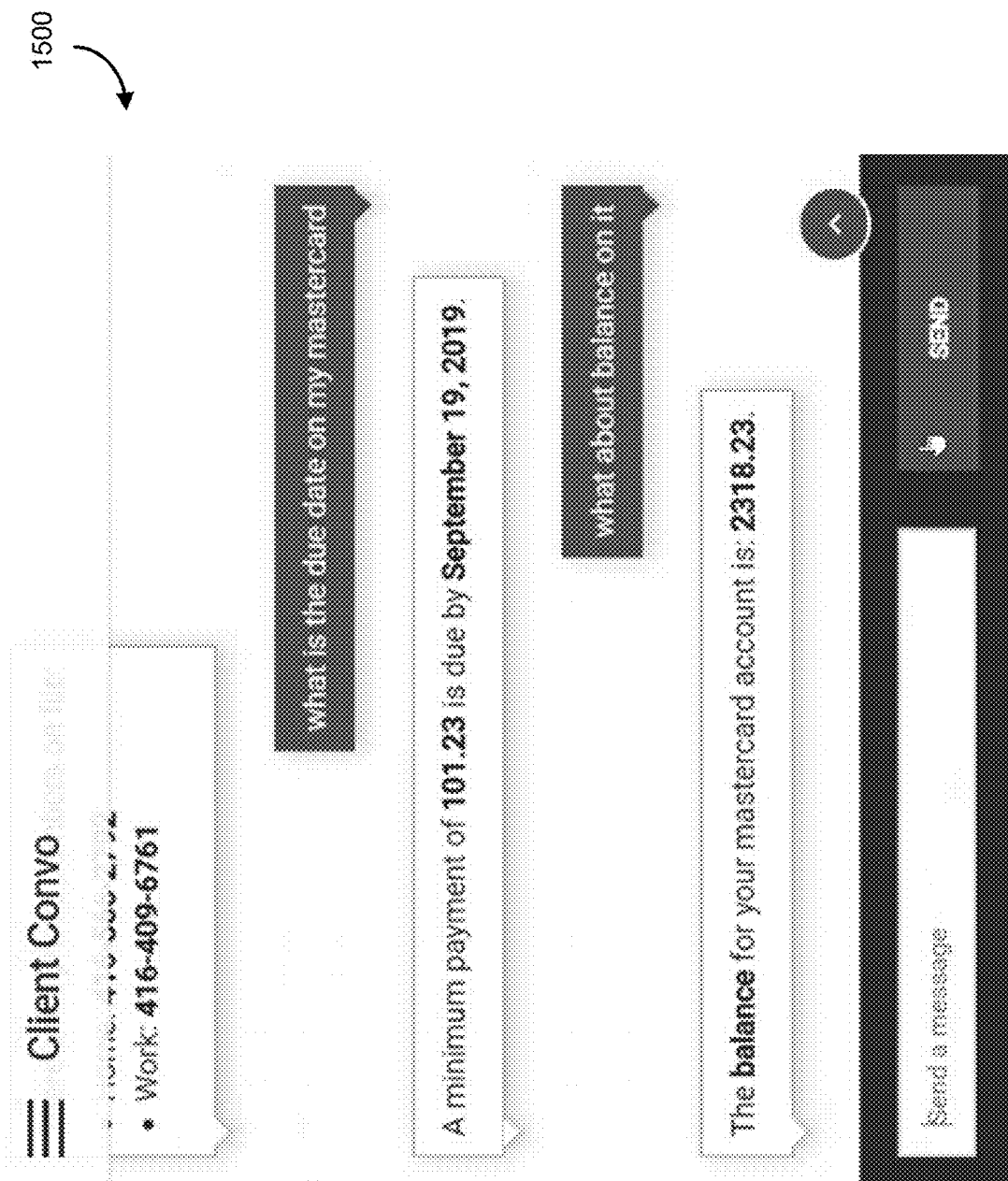

In FIG. 14, the user asks about a due date, but the system 100 recognizes the intent and appends information in respect of the minimum payment as well. In FIG. 15, the user asks about a balance, and the response information is shown. If the user continually requests about balance after asking about due dates on a particular credit card, a linkage may form over time such that when the user asks about due dates, the balance is also shown.

Figure 16:
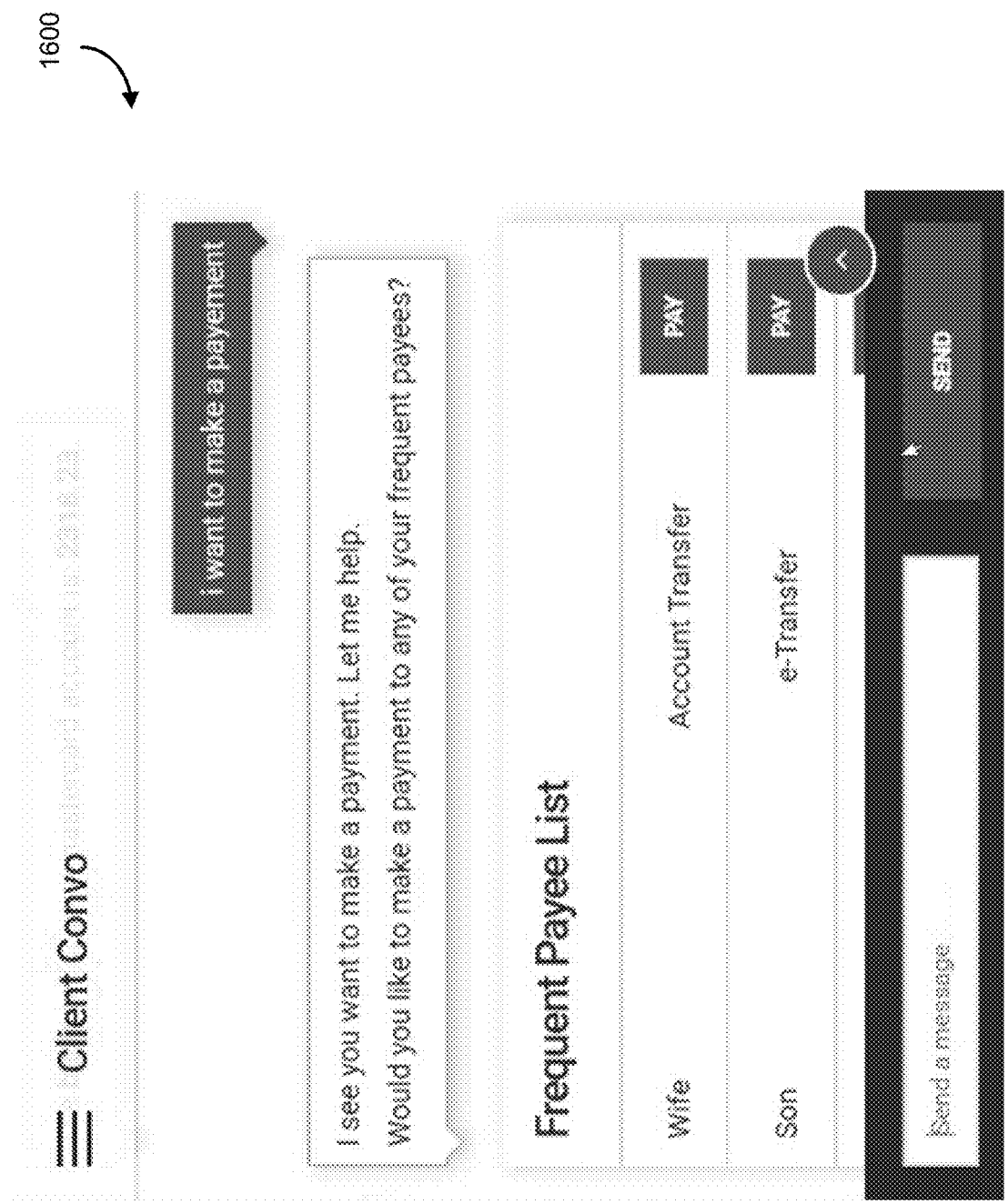
Figure 17:
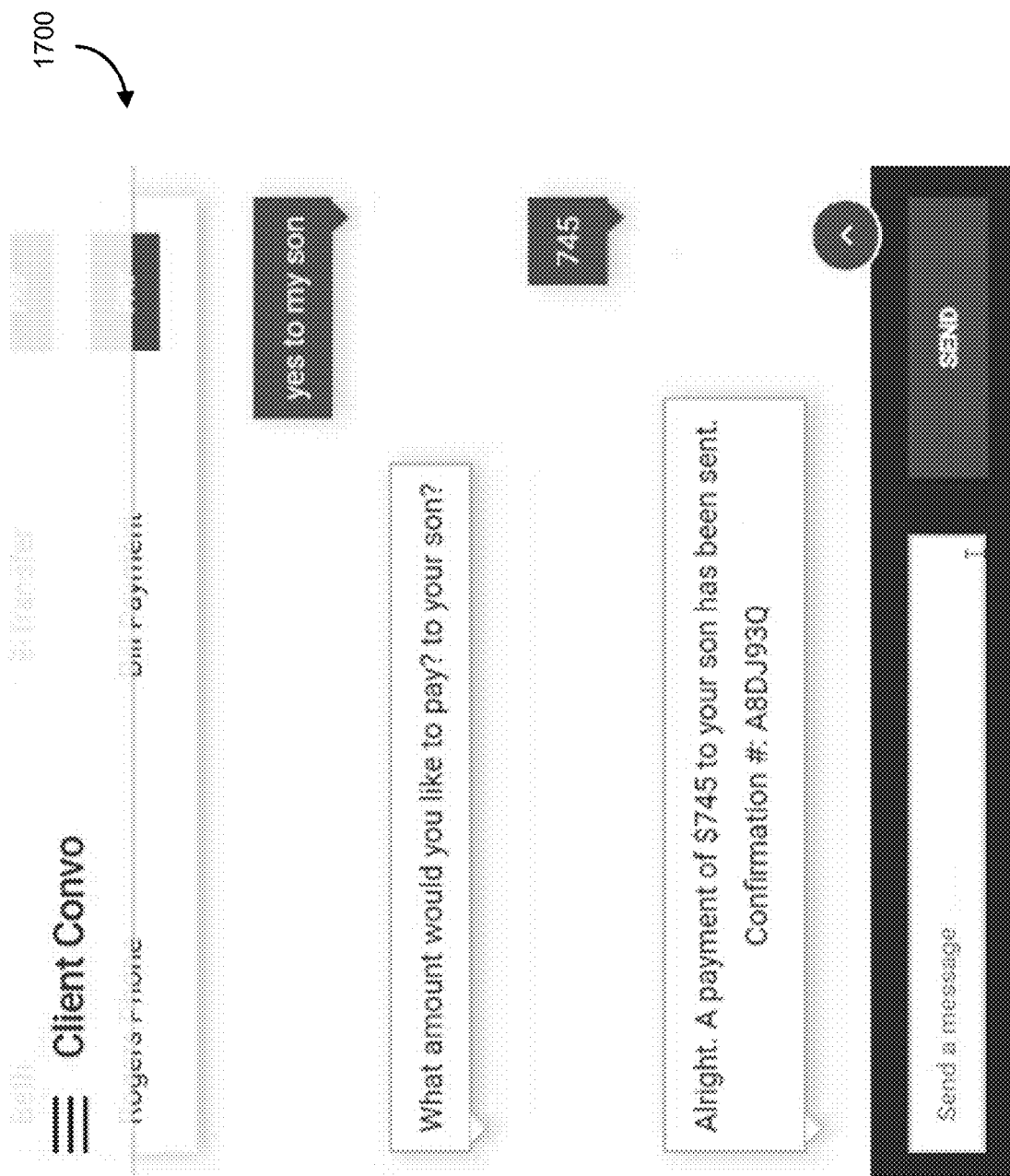

In FIG. 16, a request for more information is initiated because the user's query is not sufficiently specific, and the question is asked in respect of a payee. The payees may have nicknames to make it easier for the user to identify a specific person (e.g., wife, son). The system is attempting to filling in the information based on the particular user, therefore creating personalized flows of conversation. In FIG. 17, a payment is initiated to the son and a verification step is conducted to obtain the amount to be paid to the son.

The flow shown from FIGS. 8-17 show an improved automated conversation process that may, for example, be easier for elderly or less computer literate individuals to use, while maintaining security and privacy attributes as if they were to browse or otherwise traverse website options.

Figure 18:
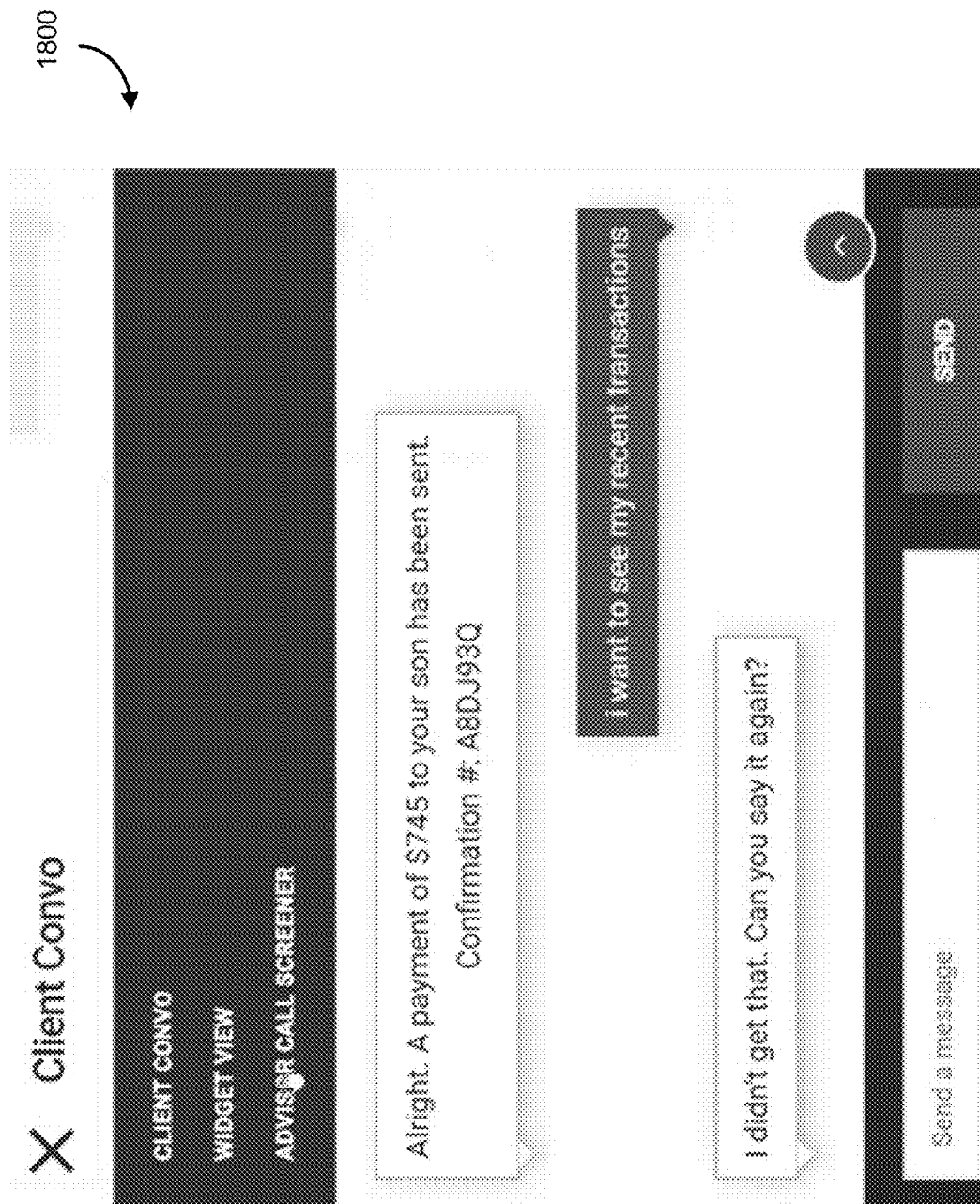

FIG. 18 is a screenshot of a situation where the system encountered a question it cannot confidently answer, and the system 100 may initiate a fallback process at this point.

Figure 19:
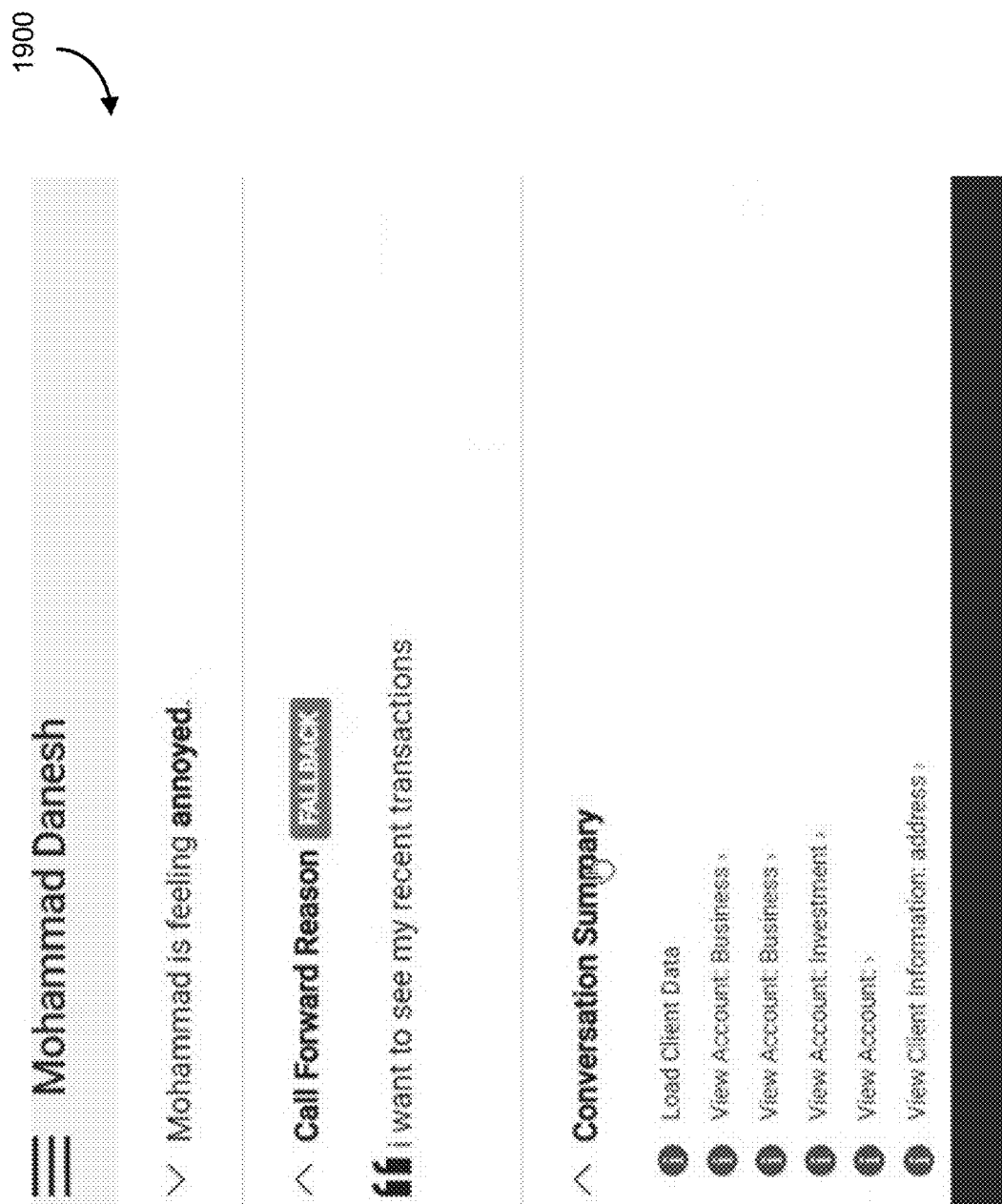
FIGS. 19 and 20 are screenshots of a situation where the system encountered a question it cannot confidently answer, and the system may initiate a fallback process at this point.

In some embodiments, there is provided an internal agent interface where the intent predictions from the natural language processing units are collated in the form of an interaction log, according to some embodiments. In this example, the intent associated with a particular emotion based on a predicted state of the user is shown as "annoyed", based, for example, on an aggregate of interactions with Mohammad. This is often achieved by sentiment analysis with the NLP platforms. This is shown, for example, in FIG. 19 and FIG. 20.

The interface may further include a visual interface screen where a visual interface element corresponding to a displayed interaction has been toggled, for example, by a mouse input, according to some embodiments. Additional information showing what was provided by the fulfillment handler is shown in this example (business account information). In this example, the advisor app is not re-written or redeployed but it is just given access to the same interface handler that rendered information to the user. This pattern of development enables re-use and distributed development with consistent experiences without any rebuild of the advisor experience. The distributed development is key to achieving faster time to market.

FIGS. 21-29 are directed to devices, systems, and methods for selecting optimal channels for automated conversational entities and dialog systems, where users can have conversational experiences with virtual assistants through a number of different communication channels. There is a need for mechanisms to allow virtual assistants to have conversations with users across multiple channels, to select channels for communications and set their preferences, and to route communications to appropriate endpoints, or at least improvements.

Embodiments described herein provide systems, methods, and computer products for selecting outbound channels for virtual assistant communications from requests received from inbound channels and routing the communications to appropriate endpoints (whether a socket based live connection or asynchronous APIs) for selected outbound channels.

In accordance with an aspect, there is provided a system for selecting channels for virtual assistant communications and routing of communications to appropriate endpoints.

In accordance with another aspect, there is provided system for selecting outbound channels for communications for an automated conversation with a user. The system has a computer processor operating in conjunction with computer memory. The computer processor is configured to provide a conversational middleware platform comprising an orchestration engine for selecting the outbound channel by processing contextual data, metadata, and fulfillment data for a request received from an incoming channel. The contextual data generated by domain specific contextual engines are utilized based on conversational flows. The computer processor is configured to provide one or more fulfillment handler engines that that are de-coupled from the one or more domain specific contextual engines to route the message to an endpoint for the selected outbound channel.

Embodiments described herein provide systems and methods for a conversation experience across multiple communication channels using a decision engine to select a channel for a communication. The selection of the channel can be based on the contents of the request. For example, the request might contain confidential or sensitive information. The selection of the channel can be based on historical data from previous communications, channel preferences, user preferences, location, information modality, service availability, and so on.

Embodiments described herein provide systems and methods for a recommendation engine and data management solution for different types of virtual assistants.

Embodiments described herein provide systems and methods for conversational experience response orchestration. Users can have conversational experiences with virtual assistants through a number of different channels. Example channels include email, text, smart speaker, in-browser agent, vehicle, appliance, and so on. Virtual assistants typically only maintain conversations across one channel. There is no dedicated mechanism to allow virtual assistants to have conversations across multiple channels.

Embodiments described herein provide systems for routing communications across different channels and using graph-based processes for selecting channels for virtual assistant communications. Embodiments described herein provide systems and methods for routing responses to the appropriate endpoints for selected channels.

Embodiments described herein provide systems and methods for switching channels while a conversation experience is happening. Embodiments described herein provide dedicated data managers across all of these channels. Systems and methods can consider context data for a conversation to select communication channels. Accordingly, embodiments described herein provide systems and methods for management of contextual data for conversations. The system performs this function so that any information provided by the user to a channel is simultaneously available for access to all channels.

Figure 21:
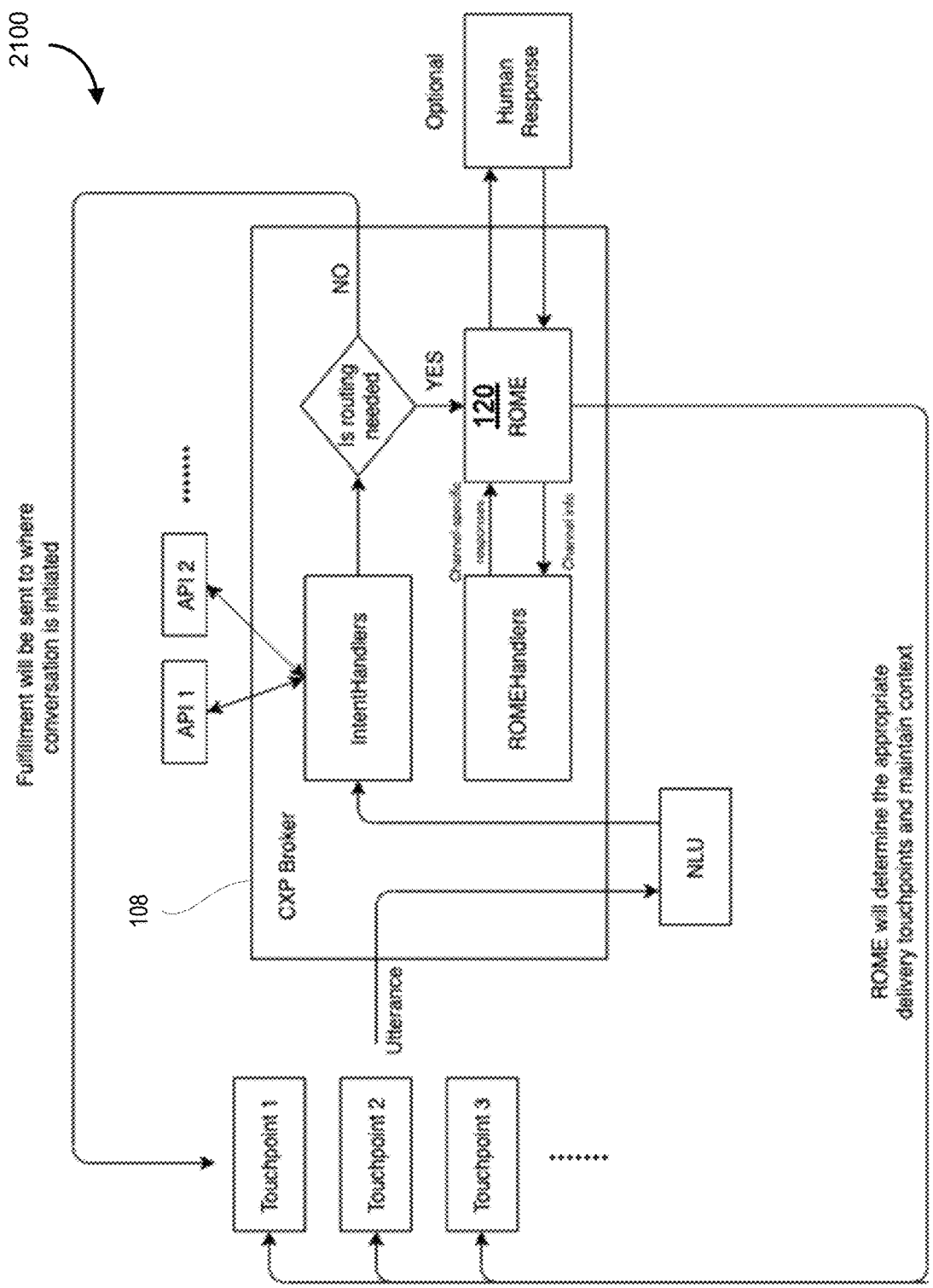
FIGS. 21-29 are directed to devices, systems, and methods for selecting optimal channels for automated conversational entities and dialog systems, where users can have conversational experiences with virtual assistants through a number of different communication channels. In some embodiments, optimal channels relate to parties of a conversation, and the system further controls routing to different parties of a multi-party conversation.

FIG. 21 is a diagram 2100 showing an example system 100 for virtual assistant communications adapted for selecting optimal channels for virtual assistant communications and routing of communications to appropriate endpoints.

The system 100 selects outbound channels for communications for an automated conversation with a user. The system 100 has a computer processor operating in conjunction with computer memory. The computer processor is configured to provide a conversational middleware comprising of an orchestration engine 120 for selecting the outbound channel by processing contextual data, metadata, and fulfillment data for a request received from an incoming channel. The contextual data can be generated by domain specific contextual engines based on conversational flows from virtual assistant communications.

The computer processor is configured to provide one or more fulfillment handler engines that that are de-coupled from the one or more domain specific contextual engines to route the message to appropriate endpoints for the selected outbound channels. The outbound channel for the orchestration engine may be routed to a separate human response interface to receive feedback data for a request or response to the request. In some examples, the orchestration engine 120 is connected to a human response interface to receive feedback data for a request or a response to the request.

The system 100 selects outbound channels for virtual assistant communications and routes communications to appropriate endpoints or to the human response interface. The system 100 receives a request from an inbound channel and selects an outbound channel for a response to the request. The system 100 can route the response to the selected channel to provide a seamless multi-channel or when needed multi-party conversation experiences.

The system 100 receives utterances from different touchpoints. The utterances can be requests from users. For example, the system 100 includes a computer processor operating in conjunction with computer memory. The computer processor is configured to receive, from user interfaces (e.g., an audio or a visual interface on a device or an automated teller machine (ATM)) at different touchpoints, utterances as input strings representing conversational requests from users having query tokens. The utterances or input strings can include general or specific queries, such as "what is my account balance?", or "send money to my child". The system 100, in some embodiments is adapted for receiving the conversational flows from a plurality of individuals at touchpoints, or to receive conversational flows in a plurality of languages. The system 100, in some embodiments, can be configured to track multiple potential intents and the selection of the one or more fulfillment handler engines for usage is based on a combination of multiple potential intents.

The system 100 includes conversational middleware 110 (referred to as CXP Broker as an example) which is a computing infrastructure to provide domain specific contextual engines based on conversational flows. The conversational middleware 110 includes intent handlers, an orchestration engine (referred to as ROME), and (automated) fulfillment handlers.

The system 100 has an orchestration engine 120 to determine what is the best channel for point of delivery of the response to the utterance for request depending on user preferences and personality. The system 100 has touchpoints that can refer to different channels for receiving utterances and requests, and other communications. The system 100 has APIs that can refer to different delivery touchpoints to different channels for transmitting the response to the request. The system 100 has a human response interface as a channel for requesting human input on the request, or other feedback on the request. The system 100 can receive a request from one channel and transmit a response to the request using another channel. The system 100 can select the channel for the response. The system 100 can route the response (communication) to the selected channel for transmission to the user, for example.

The orchestration engine 120 implements a response channel decision engine. When a response is prompted from virtual assistant, the orchestration engine 120 will determine the best channel (from a set of channels) through which to respond.

The system 100 provides a data management service. When a conversation with a virtual assistant involves multiple channels (e.g. asking a smart speaker to perform a function on your phone), the system 100 makes available to components all or portion of the data (depending on the sensitivity of the data and user preferences) around this conversation for all or selected channels involved.

The system 100 provides configurability. The system 100 allows the features considered in the model to be highly configurable for the use case. Features can also be integrated with external APIs. For example, there could be an API informing the model of regulatory changes and generate features based on these changes.

The system 100 provides scalability. The orchestration engine 120 is adaptable to n-number of channels and m-number of features in order to select an outbound channel. The system 100 uses the orchestration engine 120 to output a ranked list of optimal output channels based on a set of features. The features may represent: User preferences; Channel characteristics (e.g. how secure is this channel, how crowded is the channel, and so on); Data characteristics (e.g. is this financial data? It is Client data?) . . . N-number of features.

The system 100 includes conversational middleware 110 with a computing infrastructure that further includes, in some embodiments, a mechanism for sanitizing and de-sanitizing inputs to a backend natural language processing engine (e.g., replacing payor/payee names, account numbers, addresses). A plurality of leading Natural Language Processing (NLP) and Natural Language Understanding (NLU) engines can be used to provide, for example, an API service that allows utilization of natural conversations. Accordingly, the conversational middleware 110 can provide an API service for natural language communications.

The conversational middleware 110 includes intent handlers, the orchestration engine 120, and (automated) fulfillment handlers. The conversational middleware 110 is computing infrastructure for conversational handling that de-couples natural language processing (intent handlers) from fulfillment handlers such that the fulfilment handlers can be applied regardless of the natural language processing implementation. The fulfilment handlers call and execute the backend services, and in some embodiments, the fulfilment handlers can re-verify authorization and credentials for a given user at the desired control point in the conversational flow. The fulfillment handler engines route communications to a plurality of API endpoints for a plurality of outbound channels and in some embodiments, the conversational middleware platform 110 is configured to select between an API-based conversation and a socket-based conversation base at least on a period of time.

Authorization and validation can be conducted on a variable basis, for example, if the conversational flow is designated as suspicious or the transaction amount (e.g., moving $50,000) or the type of service being called has a priority level greater than a particular threshold (e.g., changing address for delivering cheques).

The system 100 is modularized such that contextual cues or other information provided at different steps of a conversational workflow can be carried on at different times, or across different conversational mediums (e.g., an omni-channel experience where NLP cues are shared across different mechanisms of carrying out the conversation).

The system 100 receives utterances from different touchpoints. The utterances can relate to a request uttered by a user into a conversational interface of the system 100. The NLP and NLU engines process the utterances to determine intent of the utterances. That is, the NLP and NLU engines process the request to determine the intent of the request. The determined intent can have an associated confidence score. The intent can be defined by intent data objects. The NLP and NLU engines generate intent data objects for provision to the intent handlers. The system 100 has intent handlers for handling intent data objects defining the intent of the utterance or request. The intent handlers receive intent data objects from NLP and NLU engines. The system 100 can use the intent of the request to generate a response to the request and to select a channel for the response.

The system 100 has different intent handlers to link responses or actions to different intents. The NLP and NLU engines process the utterances to determine intent of the utterances and generate intent data objects for provision to the intent handlers. In some embodiments, specific domain-trained NLP and NLU engines are utilized, and a selection process may be utilized to select a specific NLP and NLU engine that has a high or highest confidence score in relation to generated intent data objects. The intent handlers can link responses to different intents.

The NLP and NLU engines transmit the response intent data objects to intent handlers. The response intent data objects are used to generate a fulfillment string for provision to the fulfillment handlers. For example, the fulfillment string can be generated by replacing the placeholder query tokens with the sensitive query tokens, which is then provided to fulfillment handler engines to invoke downstream functionality, such as initiating a funds transfer, and updating address information, among others.

In some embodiments, a loopback (e.g., more information needed—which account of 3 possible accounts to transfer from) or fallback utterance (e.g., please talk to human) is identified to be required, and the system 100 connects to human response interfaces for feedback. The computer processor is further configured to process the feedback and send machine-generated inputs to the natural language processing for further instructions or intent data objects. This implementation creates a multi-agent conversation which is superior to machine-to-machine communications as it is easily understandable by humans and the dialog systems. The system 100 can support multi-party dialog in which computers systems (ranging from modern AI driven systems all the way to legacy applications) communicate in the same manner as the human entities. Coordination of these responses and touchpoint is done through the orchestration engine 120 and its decision engine.

There can be multiple human response interfaces linked to different employees or roles, for example. The system can select one of multiple human response interfaces for feedback data. This can enable asynchronous communications engaging different end users for feedback on a request.

The system 100 has a processor that is configured to select a language processing engine of the NLP and NLU engines for intent detection. The engine can be selected, for example, based on a mapping between channels and NLP and NLU engines, for example.

The NLP and NLU engines can select response intent data objects from an enterprise intent repository data storage. The selection, for example, may be conducted at design-time as opposed to run-time due to potential issues with performance overhead. The system 100 can record the response intent data object into a conversational history data object.

In some embodiments, the conversational data object is used to select a channel for communication and route the communication to the selected channel. The system 100 transitions the automated conversation across changes in channels to provide a relatively seamless omni-channel by handling routing between channels and interfaces. In some embodiments, the conversational data object is used to transition the automated conversation to a human agent, the conversational data object utilized to populate an agent interface for the human agent. In some embodiments, the conversational data object persists across multiple conversations, and the conversational data object is utilized by the natural language processing engines for intent detection along with the obfuscated query string.

The processor identifies, from the input strings, sensitive data that need to be redacted or sanitized (e.g., payee names, account numbers).

The NLU engine processes the response and returns intent of request. The system 100 has different intent handlers to link to responses/actions to different intents. The NLU engine also generates metadata about the request.

The orchestration engine 120 processes the intent data, metadata, and fulfillment data to determine whether feedback from a human response interface is needed. The orchestration engine 120 processes the intent data, metadata, and fulfillment data to determine what is the best channel for point of delivery of communication. The orchestration engine 120 uses a graph structure of nodes to determine what is the most suitable channel for delivery the response to the request. The orchestration engine 120 uses a graph structure of nodes to define what features of the request should be considered. The features and their preferences are represented by probability values. The orchestration engine 120 uses a graph structure of nodes arranged in a final decision making layer to select the outbound channel. Different features (Feature 1, Feature 2, etc.) are encodings for different characteristics to map the data to channels.

The response, for example, is linked to different features, and the orchestration engine populates a graph structure of nodes connected by edges, wherein the nodes are arranged in layers for the different features, wherein each node corresponds to an outbound channel of a plurality of available outbound channels and a feature of the different features, wherein the nodes are assigned values for channel preference distributions, wherein the edges are assigned values for transition probabilities between channels, and the graph structure can include a decision making layer of nodes assigned values for the plurality of available outbound channels.

The orchestration engine 120 can use many different features to model characteristics of the channel, response, and request. Example features can be: Is a human input needed? Is the channel available? Is the response urgent? Are there user preferences? Are there security requirements (channel X is end to end encryption). For example, the user can be requesting cash flow information and the user has a preference to receive this type of data over channel 2.

The orchestration engine 120 can scale the number of features and channels that can be considered. This enables a large number of features or channels to be considered. The channels can have different risk profiles, i.e., some may be considered public channels (very high risk profile) and some private channels (very low risk profile) with a spectrum in between.

The orchestration engine 120 can implement a channel handler to transition from an incoming channel to an outbound channel. The channel handler routes the communication to the selected outbound channel to transition the communication from the incoming channel to the outgoing channel. The handler can update context variables among the two channels when necessary while communicating with the NLP engine.

Figure 22:
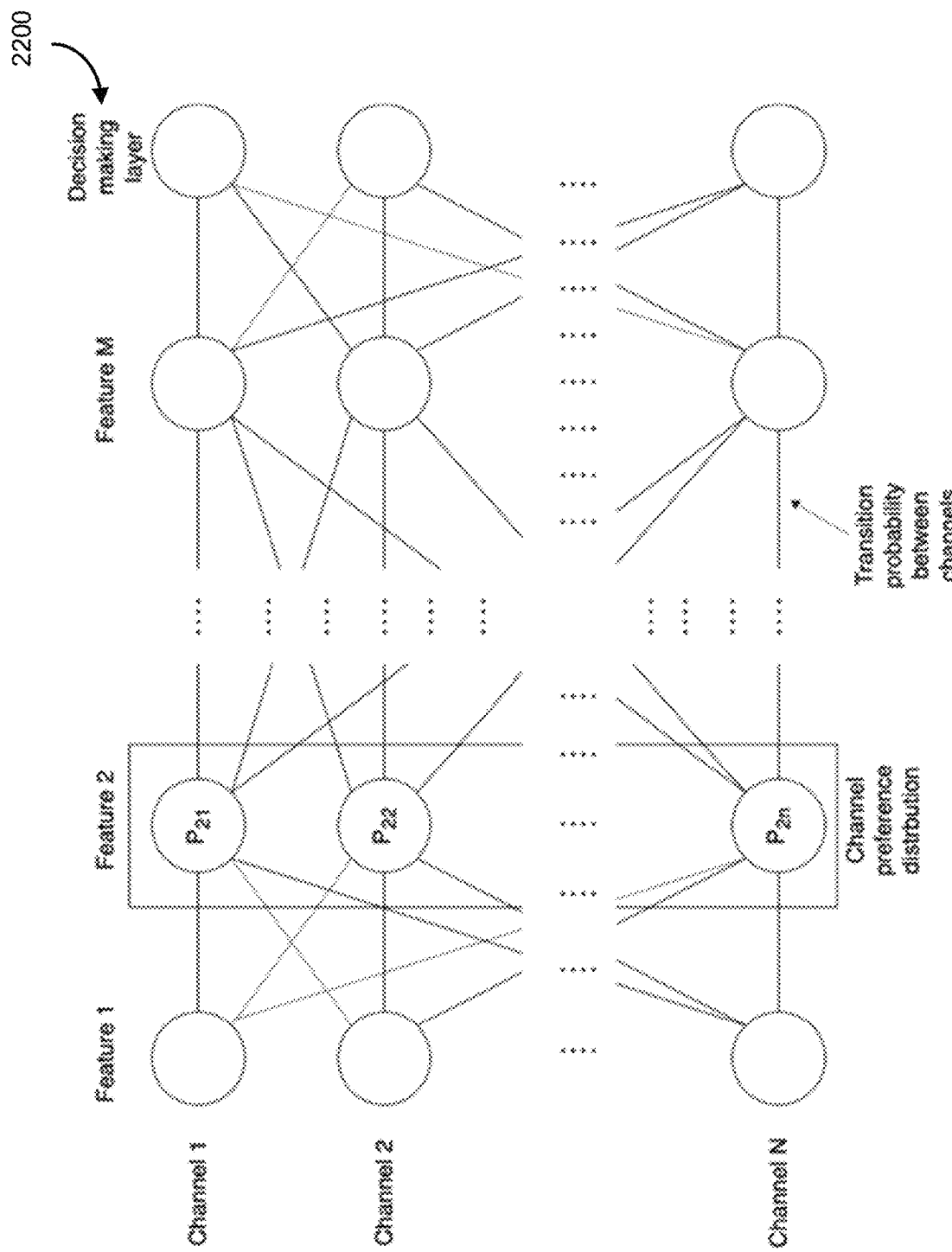

FIG. 22 shows an example graph structure for channel selection. The system 100 links the response to different features or characteristics. The features are represented in a graph data structure and in some examples, the orchestration engine 120 can run modified version of a Viterbi algorithm to populate a graph structure to find optimal channels. In this example, there is a graph with a n-number of nodes. Each layer of the graph represents a set of features. Each node within the layer contains a numerical representation of the feature attributable to a specific channel. Between each layer, there is a transition probability assigned between each node. The orchestration engine 120 moves through the graph, continuously deciding a preference value for each channel as more features are considered. Once all features are considered, the orchestration engine 120 will output a final value for each node in the decision layer that will represent a ranked list of optimal output channels.

The orchestration engine 120 populates a graph structure of nodes connected by edges for channel selection. The orchestration engine 120 populates the graph structure by computing and assigning values to nodes and edges. The nodes are arranged in layers for the different features. A node corresponds to an outbound channel of multiple available outbound channels and a feature of the different features. The nodes are assigned values for channel preference distributions. The edges are assigned values for transition probabilities between channels. The graph structure is populated with both node and edge probability values. The graph structure has a decision making layer of nodes assigned values for the available outbound channels.

The graph structure has nodes arranged in layers and edges connecting the nodes. The orchestration engine 120 selects a channel for responding to the request. The orchestration engine 120 can use a graph structure for selecting a channel from a set of available channels for the communication. The orchestration engine 120 receives metadata and intent data from the intent handlers to select a channel. The orchestration engine 120 receives fulfillment data from the fulfillment handlers to select a channel. The orchestration engine 120 computes values for nodes and edges using the metadata, intent data, and fulfillment data. The intent handlers and fulfillment handlers can be invoked after the decision is made. The set of handlers can be used to customize different behaviors when the channel switch happens.

The orchestration engine 120 defines different channels for selection. The orchestration engine 120 defines different features for the request using request data, intent data, metadata about the request, historical data, user data, and so on. As shown in FIG. 2, the features and channels can be represented by a graph structure as different nodes. Each feature can be linked to a set of nodes (a node for each of the channels) that are assigned channel preference distributions PFC. Each node can be assigned a value for a channel preference distribution PFC that can vary depending on a specific request. The edges can represent transition probability between the channels. Each edge can be assigned a value for the transition probability.

The orchestration engine 120 can use the graph structure of nodes to scale the number of features and channels that can be considered. This enables a large number of features to be used.

Figure 23:
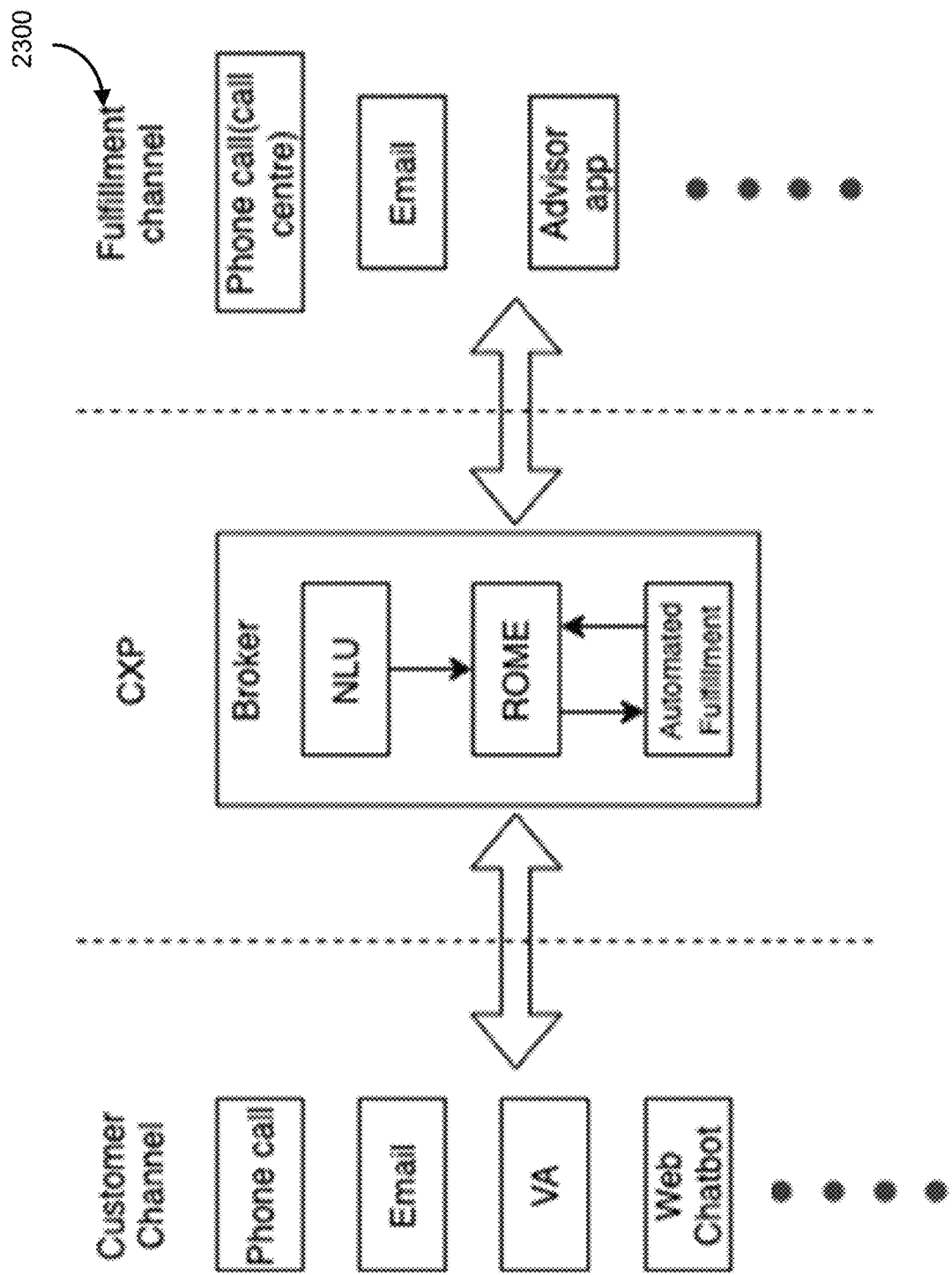

FIG. 23 shows an example process flow for virtual assistant communications. The process flow shows data exchange between customer channels, the system 100 and the fulfillment channels. The system 100 receives requests from the customer channels, selects a fulfillment channel, and routes communications to the fulfillment channel in response to the request. The routing can be via an API endpoint in some embodiments.

Figure 24:
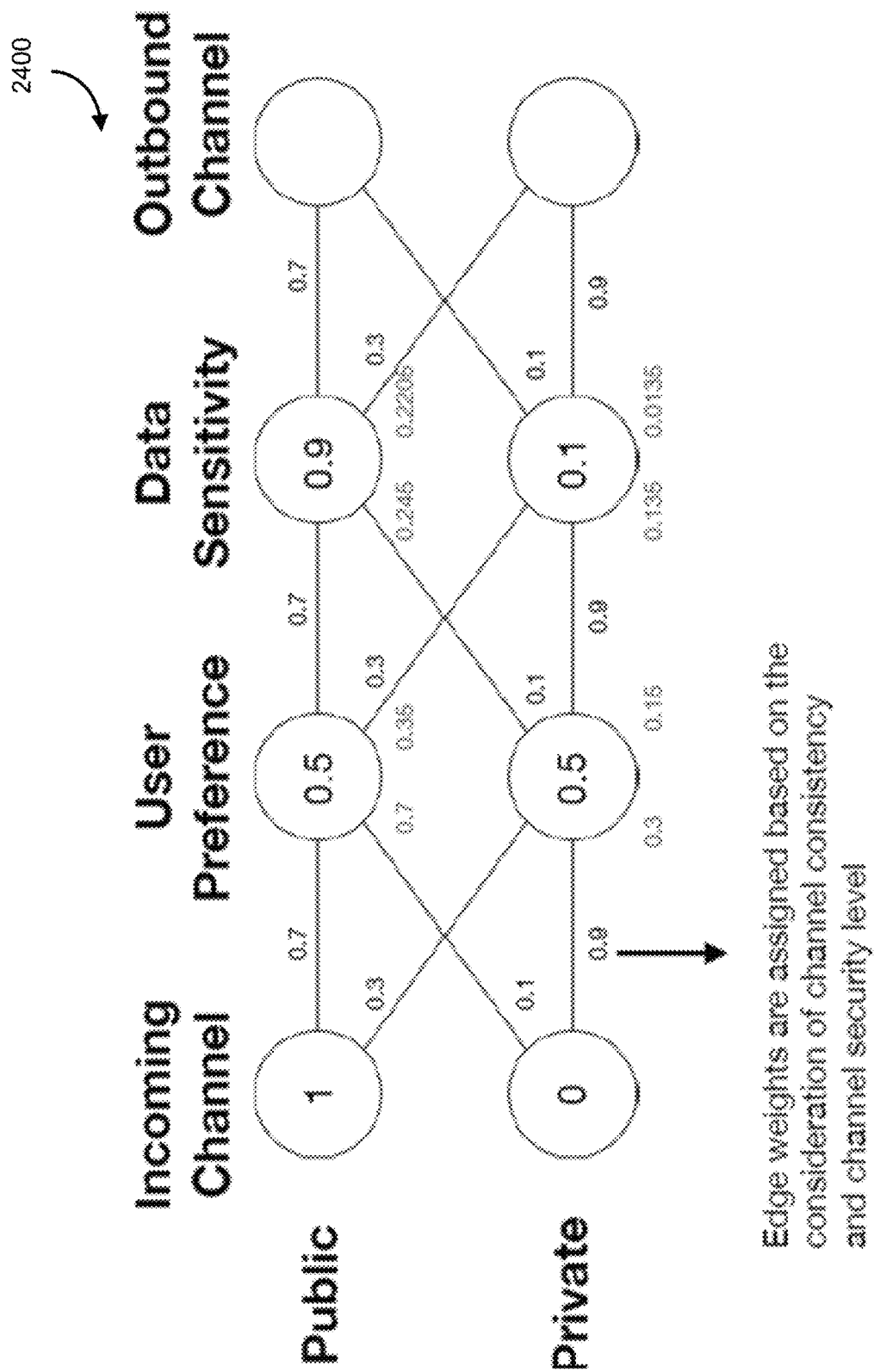

FIG. 24 shows an example graph structure. In this example, there is a public channel and a private channel. The example features are user preference and data sensitivity. The request can be processed to identify data sensitivity, for example. Financial account data might trigger sensitivity concerns and might trigger higher values for a private channel, for example. The orchestration engine 120 assigns edge weights based on the consideration of channel consistency and channel security level. The orchestration engine 120 can compute the values for nodes using channel preference distribution functions. The orchestration engine 120 can compute the values for edges using transition probability functions. The edges values can relate to switching between channels based in different features. For example, if the conversation is in in a public channel (1) then (0.7) that the conversation would want to stay in public channel. If the conversation is in a private channel (0) then it can be very likely the conversation want to stay in this channel.

Figure 25:
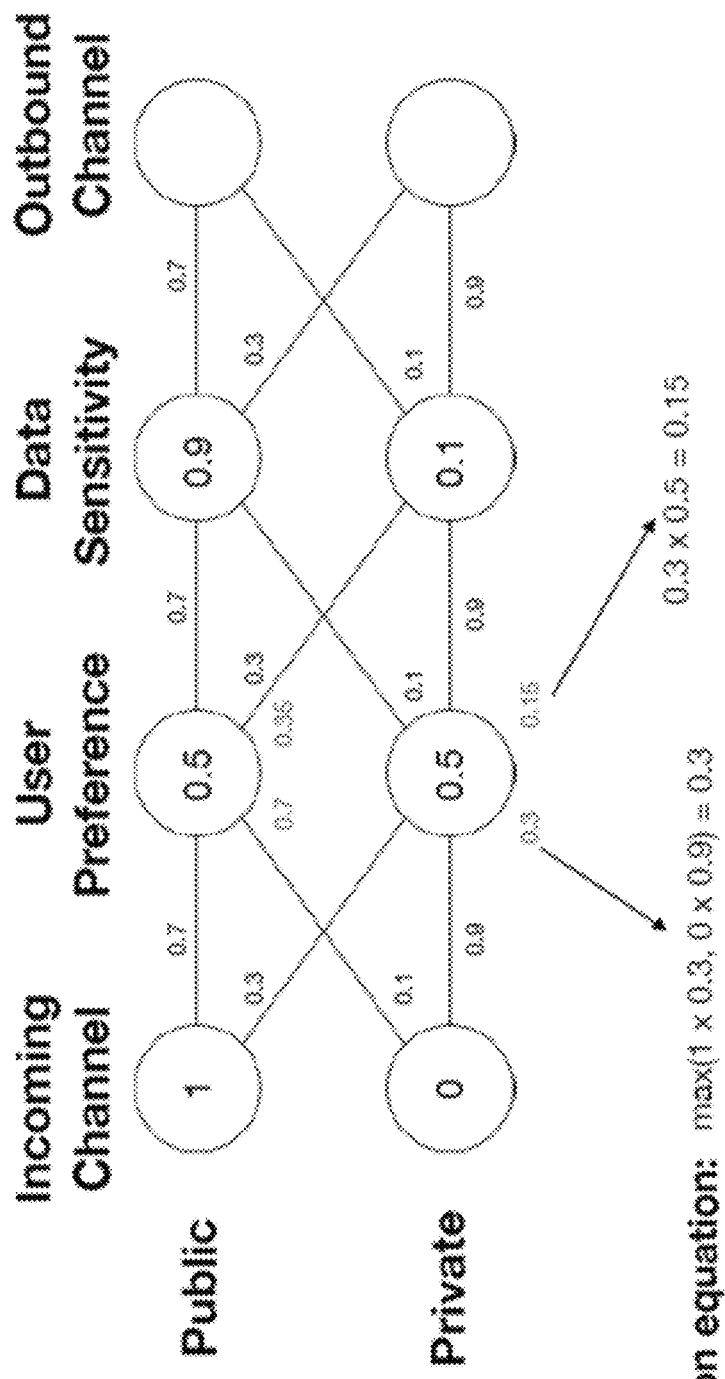

FIG. 25 shows an example propagation process to assign values for channel preference distribution PFC to the different nodes. The propagation process also assigns values to edges for transition probabilities between the channels. The orchestration engine 120 can use different propagation equations to populate values in the graph structure.

Figure 26:
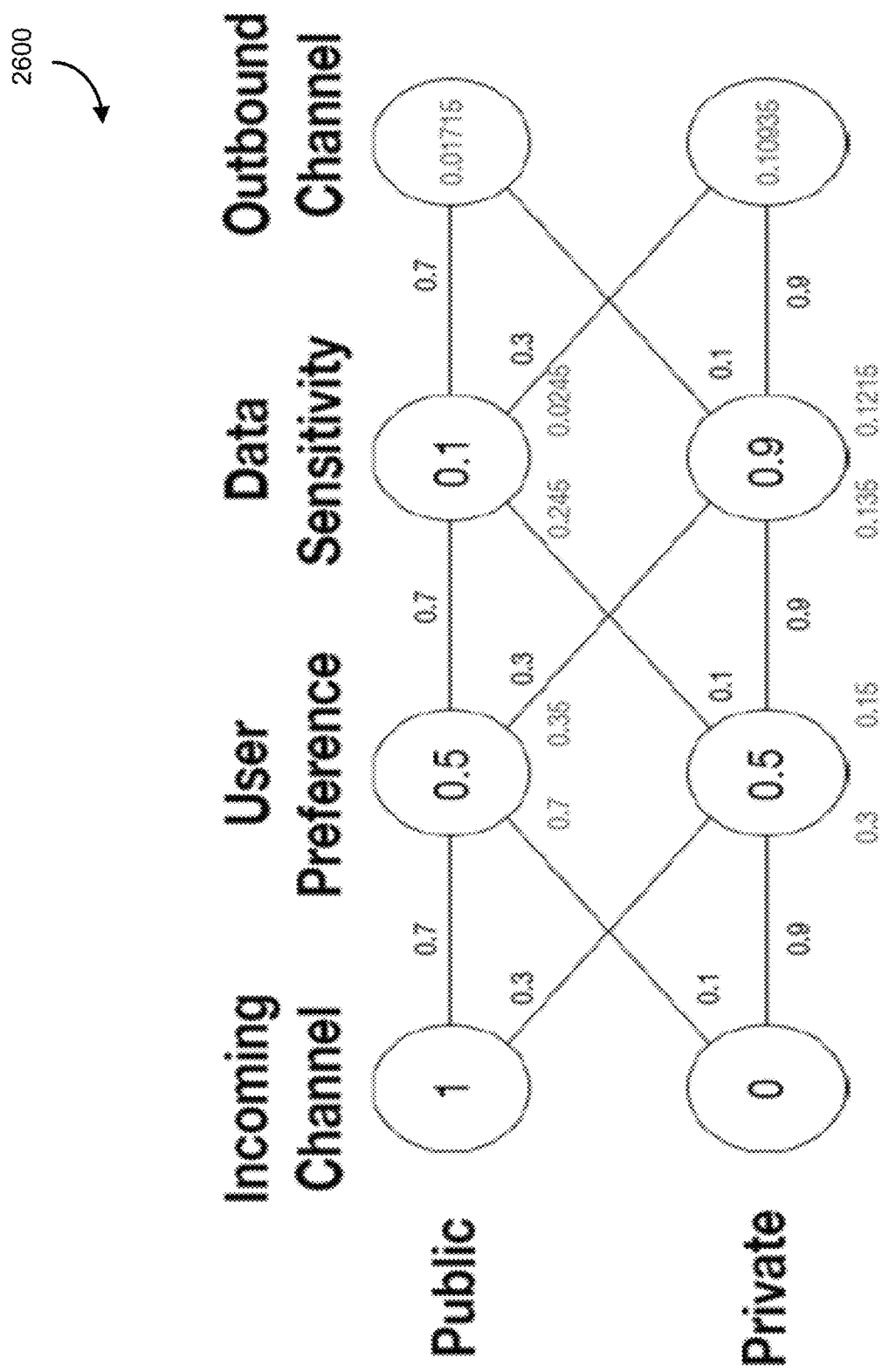

FIG. 26 shows an example graph structure of nodes with assigned values for channel preference distribution PFC and edges with assigned values for transition probabilities between the channels. The example graph structure has a decision making layer of nodes assigned values for outbound channel selection. In this example, the private channel is assigned a higher value for selection as the outbound channel or fulfillment channel. The orchestration engine 120 can compute the values for the decision making layer of nodes using the values assigned to the nodes for the features and channels. The graph structure has a set of nodes for the features and channels and a set of nodes for the decision making layer. The set of nodes for the decision making layer has a node for each of the available outbound channels. The orchestration engine 120 can use the values for the decision making layer of nodes to select the outbound channel. The orchestration engine 120 can compute the values for the decision making layer of nodes to trigger a communication to the human response interface.

Figure 27:
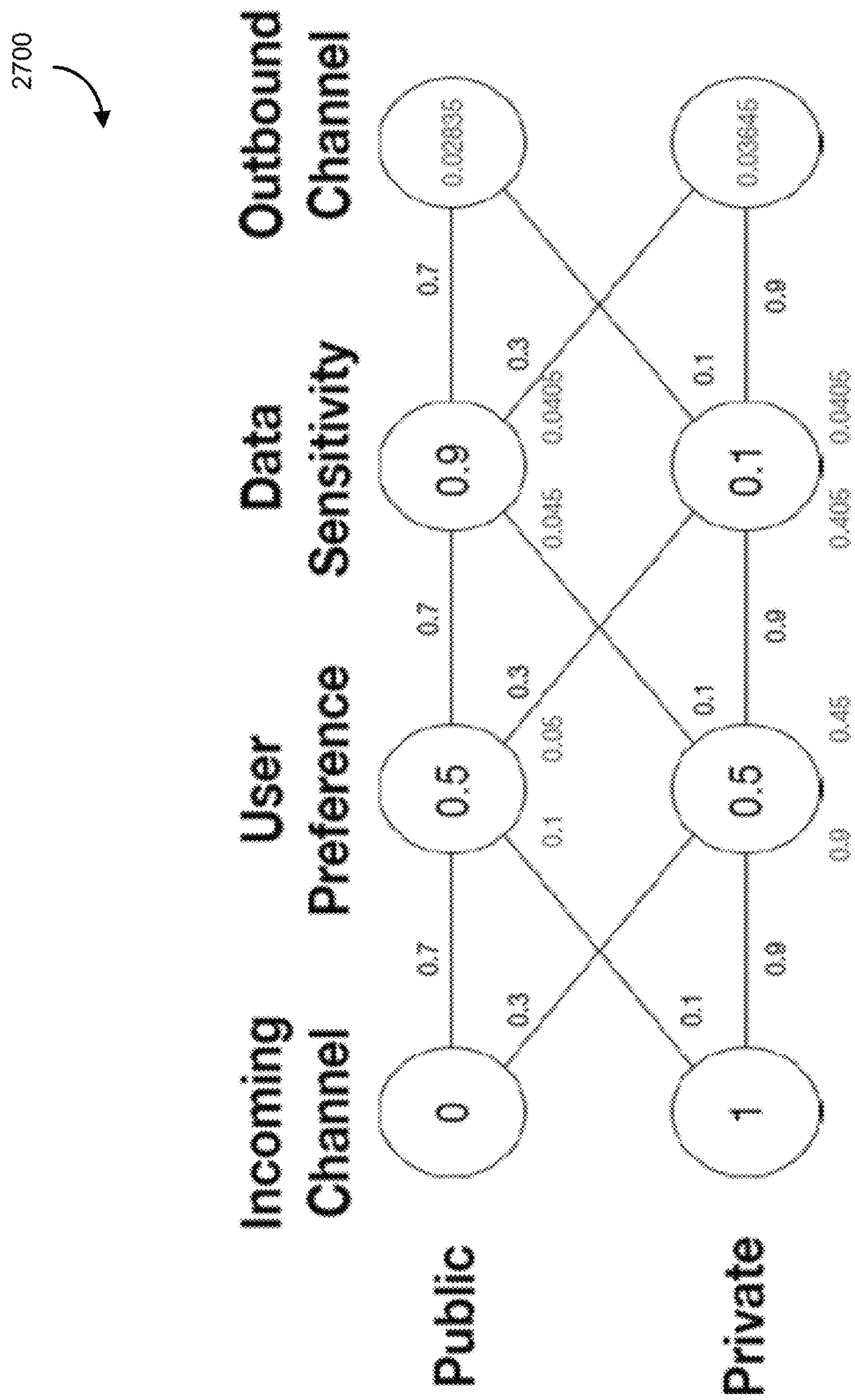

FIG. 27 shows an example graph structure. The orchestration engine 120 computes values for nodes and edges and populates the graph structure with the computed values to select outbound channels. Accordingly, the orchestration engine 120 updates the graph structure with new values as new request data is received.

Figure 28:
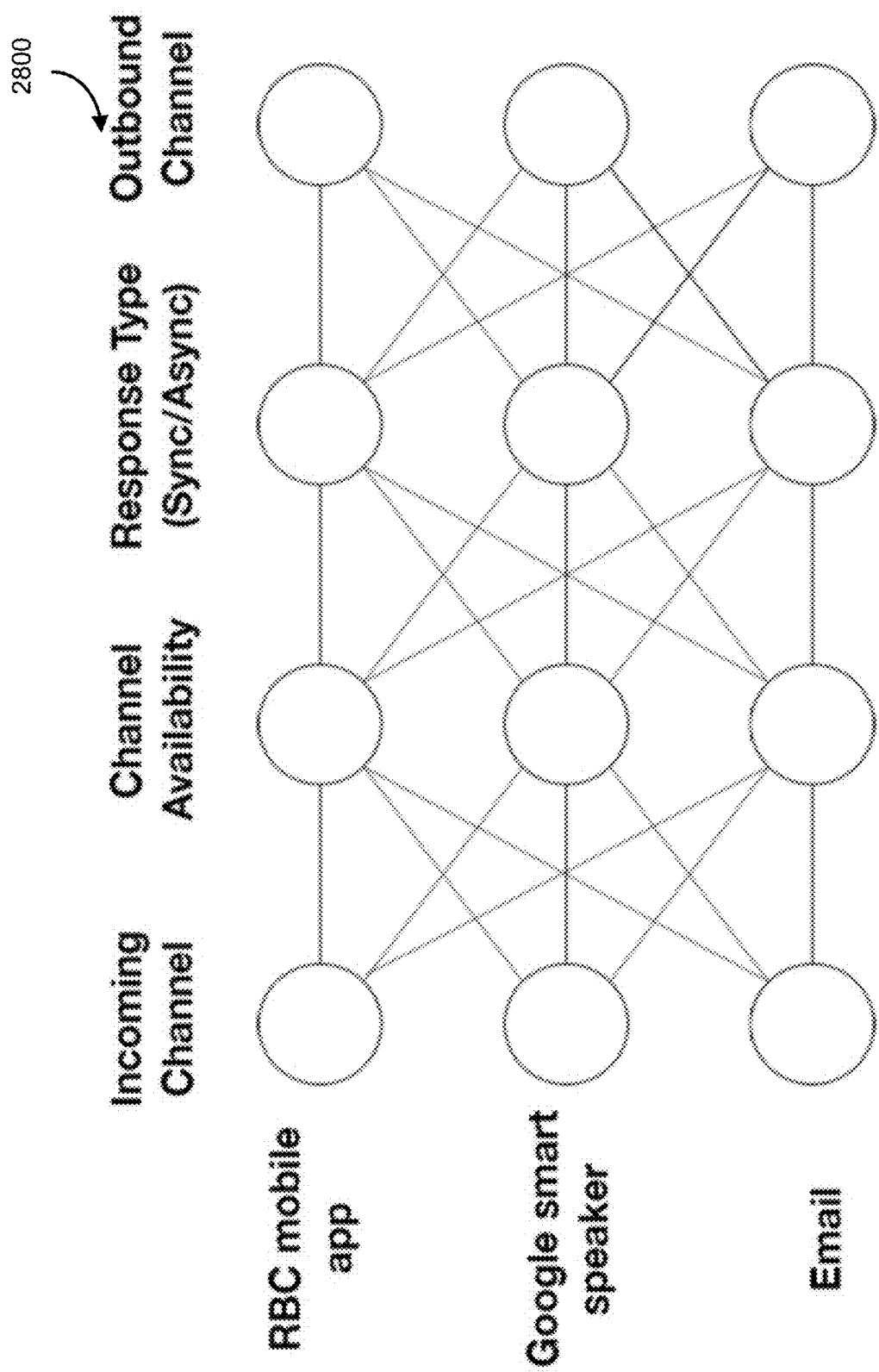

FIG. 28 shows an example graph structure that represents a different set of example channels and features. In this example, there are multiple outbound channels: mobile applications, smart speaker, and email. In this example, there are multiple features such as incoming channels, channel availability, response type, and outbound channel.

The system 100 of this example embodiment implements different decision models and has associated configuration panel to configure different features and channels. The system 100 has a guide for conversation designers/developers to use the orchestration engine 120 with a configuration panel to update the features and channels.

The system can collect interaction data for use by models of the orchestration engine 120, analyze user interaction behavior, and optimize interaction model to better reach and serve customer.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the description, the reference to system can include processors, memories, servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. A server can include one or more computers operating as a web server, database server, or other type of computer server in a manner to fulfill described roles, responsibilities, or functions.

The system 100 can be implemented by computing device components that may be connected in various ways including directly coupled, indirectly coupled via a network, and distributed over a wide geographic area and connected via a network (which may be referred to as "cloud computing").

Figure 29:
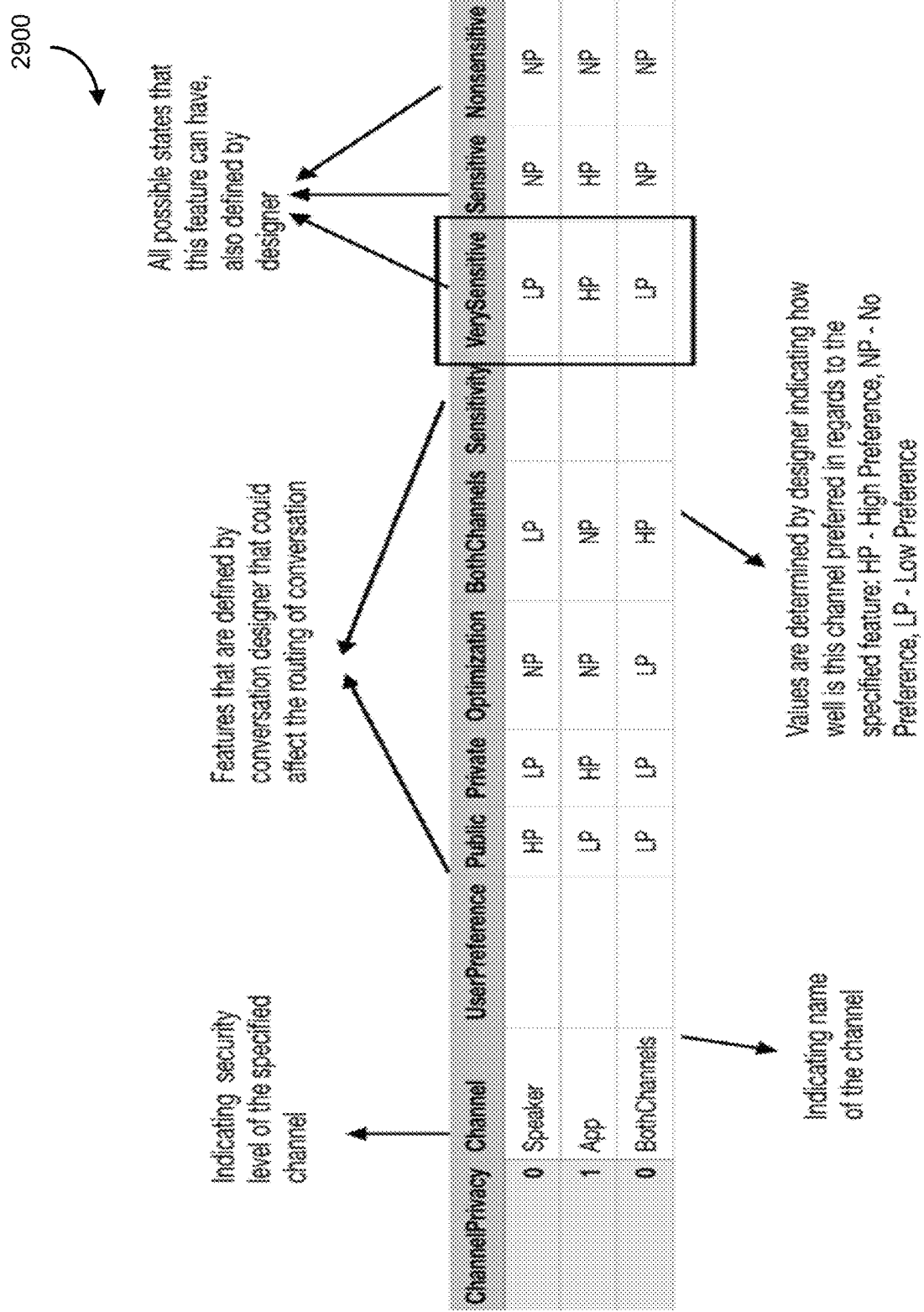

FIG. 29 shows an example configuration file 2900. The file can have channel privacy attributes indicating the security level of the specified channel. The file can indicate names of different channels. The file can have features that impact routing of the conversation. The values for the features can be determined indicating how well the channel is preferred in regards to the specified feature: HP—high preference; NP—no preference; LP—low preference.

FIG. 30 is a block schematic diagram of a computing device 3000 adapted for providing the automated conversational mechanism of system 100, according to some embodiments. The computing device 3000 can be a computer server or other physical computing hardware device, and may reside, for example, in a data center. The computing device 3000 includes one or more computer processors (e.g., microprocessors) 3002 which are adapted to execute machine interpretable instructions, and interoperates with computer memory 3004 (e.g., read only memory, random access memory, integrated memory). An input/output interface 3004 can be provided that receives data sets representing inputs from devices such as computer mice, keyboards, touch screens, among others, and provides outputs in the form of interface element control for rendering on computer displays, such as monitors. A network interface 3006 is provided that is adapted for electronic communications with other computing devices, such as downstream computing systems, data storage elements, data backup servers, among others. The network interface 3006 can include various types of interfaces, including wireless connection interfaces, wired connection interfaces, connections with messaging buses, among others.

A conversation summary is shown based on the recent requests shown in the conversation flows above as well.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. An automated conversation orchestration system for interconnecting a plurality of natural language processing agents each having a different domain specialization or operating characteristics to generate an output response data structure responding to a new utterance string from a user, the system comprising:

one or more processors operating in conjunction with computer memory and one or more non-transitory computer readable storage mediums, the one or more processors configured to:

receive and tokenize the new utterance string from the user;

route the tokenized new utterance string to the plurality of natural language processing agents to receive one or more response confidence score values each corresponding to a corresponding natural language processing agent;

query a profile data structure associated with the user to obtain one or more probability values, each associated with a corresponding domain specialization or operating characteristic of each of the plurality of natural language processing agents;

based at least on a combination of the one or more response confidence score values and the one or more probability values, assign a primary natural language processing agent; and generate the output response data structure using at least the assigned primary natural language processing agent;

wherein the profile data structure is a graph data structure having interconnected nodes representing bifurcated interaction decision nodes having associated weight values that have been adjusted over a set of prior recorded interactions by the user or one or more similar users; and wherein the graph data structure is traversed to obtain the one or more probability values;

wherein if two or more probability values are greater than a threshold value, an additional verification is conducted to present a bifurcated decision interaction between the two or more natural language processing agents corresponding to the two or more probability values greater than the threshold value to identify the primary natural language processing agent, and the graph data structure is updated based on the selection obtained from the additional verification such that the graph data structure is biased towards the selection in future traversals.

2. The automated conversation orchestration system of claim 1, wherein the interaction record is discarded after updating the graph data structure, and the graph data structure is utilized across a plurality of similar users.

3. The automated conversation orchestration system of claim 1, wherein the plurality of natural language processing agents include at least both conversational natural language processing agents and contextual natural language processing agents;
  wherein the conversational natural language processing agents are configured for generating the output response data structure to have a response to be transmitted to the user or a downstream conversational natural language processing agent; and
  wherein the contextual natural language processing agents are configured for triggering modifications of the new utterance string for re-processing through the automated conversation orchestration system.

4. The automated conversation orchestration system of claim 3, wherein the contextual natural language processing agents include at least one intent tracking natural language processing agent that is configured to detect potential incongruities between an estimated intent and a literal meaning conveyed in the tokenized new utterance string, and responsive to a detection of the potential incongruities between the estimated intent and the literal meaning conveyed in the tokenized new utterance string, generate the new utterance string by replacing any tokens not aligned with the estimated intent with tokens aligned with the estimated intent such that a literal meaning of the new utterance string matches the estimated intent.

5. The automated conversation orchestration system of claim 3, wherein the plurality of natural language processing agents further include user behavior tracking agents that are configured for tracking a set of pre-conditions, and upon determining that the pre-conditions are satisfied either in the new utterance string or in the profile data structure, insert biasing values to shift the one or more probability values.

6. The automated conversation system of claim 1, wherein the one or more processors are configured to first replace any identified sensitive word tokens from the tokenized new utterance string with placeholder words prior to routing the tokenized new utterance string to the plurality of natural language processing agents to receive the one or more response confidence score values.

7. The automated conversation system of claim 3, wherein the contextual natural language processing agents include at least one data sensitivity natural language processing agent that is configured for parsing individual word tokens of the tokenized new utterance string and to return a high probability if any of the individual word tokens include a word that is estimated to be sensitive such that the at least one data sensitivity natural language processing agent is selected as the primary natural language processing agent;
  wherein responsive to being selected as the primary natural language processing agent, the at least one data sensitivity natural language processing agent generates a modified new utterance string to be provided to the automated conversation system for a next iteration of primary natural language processing agent selection, wherein each word that was estimated to be sensitive is replaced with a corresponding in-domain placeholder; and
  wherein the output response data structure is generated replacing the corresponding in-domain placeholder with a corresponding sensitive word.

8. The automated conversation system of claim 1, wherein the plurality of natural language processing agents are configured to interface with a set of de-coupled fulfillment handlers; and
  wherein at least one natural language processing agent of the plurality of natural language processing agents, after being assigned as the primary natural language processing agent, upon estimating that the user's intent matches a capability of at least one de-coupled fulfillment handler of the set of de-coupled fulfillment handlers at a high level of confidence, invokes the corresponding de-coupled fulfillment handler to initiate a new data process representative of an automated task by passing in at least one parameter extracted from or based on individual word tokens of the tokenized utterance string.

9. The automated conversation system of claim 3, wherein the primary conversational natural language processing agent, upon detecting an intent in a new utterance string to change a domain specialization such that another conversational natural language processing agent will be assigned as the primary conversational natural language processing agent, generates an agent hand-off utterance string for routing by a next iteration of routing by the automated conversation system.

10. The automated conversation system of claim 3, wherein the primary conversational natural language processing agent, upon detecting an intent in a new utterance string to include another user generates one or more user hand-off utterance strings for routing by another instance of the automated conversation system;
  wherein the one or more user hand-off utterance strings includes one or more additional contextual data objects applicable to the another instance of the automated conversation system.

11. The automated conversation system of claim 1, wherein the output response data structure is linked to different features representative of user preference and data sensitivity;
  wherein the one or more processors populate a graph structure of nodes connected by edges;
  wherein the nodes are arranged in layers for the different features, wherein each node corresponds to an outbound channel of a plurality of available outbound channels and a feature of the different features, wherein the nodes are assigned values for channel preference distributions;
  wherein the edges are assigned values for transition probabilities between channels;
  wherein the graph structure has a decision making layer of nodes assigned values for the plurality of available outbound channels; and
  wherein the output response data structure is output through a selected channel of the plurality of outbound channels selected at least through a traversal of the graph structure.

12. The automated conversation orchestration system of claim 1, wherein the output response data structure is transformed into a message dialog presented to the user through an on-line chat conversation.

13. The automated conversation orchestration system of claim 1, wherein the new utterance string is received as a message provided an on-line chat session, or as a voice message that is transformed using a voice-to-text parsing engine into the new utterance string.

14. The automated conversation orchestration system of claim 12, wherein the on-line chat conversation is provided by a virtual assistant application adapted for using the primary natural language processing agent to assist the user in automatically initiating automated tasks based on tracked intents of the primary natural language processing agent extracted from the new utterance string.

15. The automated conversation orchestration system of claim 2, wherein the primary natural language processing agent is configured to extract one or more response intent data objects from the tokenized new utterance string for processing, and wherein the response intent data object is recorded into a conversational history data object stored into or used to update the profile data structure such that the user profile is updated for a future iteration of routing by the automated conversation orchestration system.

16. A method for interconnecting a plurality of natural language processing agents each having a different domain specialization or operating characteristics to generate an output response data structure responding to a new utterance string from a user, the method comprising:
receiving and tokenizing the new utterance string from the user;
routing the tokenized new utterance string to the plurality of natural language processing agents to receive one or more response confidence score values each corresponding to a corresponding natural language processing agent;
querying a profile data structure associated with the user to obtain one or more probability values, each associated with a corresponding domain specialization or operating characteristic of each of the plurality of natural language processing agents;
based at least on a combination of the one or more response confidence score values and the one or more probability values, assigning a primary natural language processing agent; and
generating the output response data structure using at least the assigned primary natural language processing agent;
wherein the profile data structure is a graph data structure having interconnected nodes representing bifurcated interaction decision nodes having associated weight values that have been adjusted over a set of prior recorded interactions by the user or one or more similar users; and wherein the graph data structure is traversed to obtain the one or more probability values;
wherein if two or more probability values are greater than a threshold value, an additional verification is conducted to present a bifurcated decision interaction between the two or more natural language processing agents corresponding to the two or more probability values greater than the threshold value to identify the primary natural language processing agent, and the graph data structure is updated based on the selection obtained from the additional verification such that the graph data structure is biased towards the selection in future traversals.

17. The method of claim 16, wherein the plurality of natural language processing agents include at least both conversational natural language processing agents and contextual natural language processing agents;
wherein the conversational natural language processing agents are configured for generating the output response data structure to have a response to be transmitted to the user or a downstream conversational natural language processing agent; and
wherein the contextual natural language processing agents are configured for triggering modifications of the new utterance string for re-processing through the automated conversation orchestration system.

18. The method of claim 17, wherein the contextual natural language processing agents include at least one intent tracking natural language processing agent that is configured to detect potential incongruities between an estimated intent and a literal meaning conveyed in the tokenized new utterance string, and responsive to a detection of the potential incongruities between the estimated intent and the literal meaning conveyed in the tokenized new utterance string, generate the new utterance string by replacing any tokens not aligned with the estimated intent with tokens aligned with the estimated intent such that a literal meaning of the new utterance string matches the estimated intent.

19. The method of claim 16, wherein the one or more processors are configured to first replace any identified sensitive word tokens from the tokenized new utterance string with placeholder words prior to routing the tokenized new utterance string to the plurality of natural language processing agents to receive the one or more response confidence score values, or wherein the contextual natural language processing agents include at least one data sensitivity natural language processing agent that is configured for parsing individual word tokens of the tokenized new utterance string and to return a high probability if any of the individual word tokens include a word that is estimated to be sensitive such that the at least one data sensitivity natural language processing agent is selected as the primary natural language processing agent;
wherein responsive to being selected as the primary natural language processing agent, the at least one data sensitivity natural language processing agent generates a modified new utterance string to be provided to the automated conversation system for a next iteration of primary natural language processing agent selection each word that was estimated to be sensitive is replaced with a corresponding in-domain placeholder; and
wherein the output response data structure is generated replacing the corresponding in-domain placeholder with a corresponding sensitive word.

20. A non-transitory computer readable medium storing machine interpretable instructions, which when executed by a processor, cause the processor to perform a method for interconnecting a plurality of natural language processing agents each having a different domain specialization or operating characteristics to generate an output response data structure responding to a new utterance string from a user, the method comprising:
receiving and tokenizing the new utterance string from the user;
routing the tokenized new utterance string to the plurality of natural language processing agents to receive one or more response confidence score values each corresponding to a corresponding natural language processing agent;
querying a profile data structure associated with the user to obtain one or more probability values, each associated with a corresponding domain specialization or operating characteristic of each of the plurality of natural language processing agents;

based at least on a combination of the one or more response confidence score values and the one or more probability values, assigning a primary natural language processing agent; and generating the output response data structure using at least the assigned primary natural language processing agent;

wherein the profile data structure is a graph data structure having interconnected nodes representing bifurcated interaction decision nodes having associated weight values that have been adjusted over a set of prior recorded interactions by the user or one or more similar users; and wherein the graph data structure is traversed to obtain the one or more probability values;

wherein if two or more probability values are greater than a threshold value, an additional verification is conducted to present a bifurcated decision interaction between the two or more natural language processing agents corresponding to the two or more probability values greater than the threshold value to identify the primary natural language processing agent, and the graph data structure is updated based on the selection obtained from the additional verification such that the graph data structure is biased towards the selection in future traversals.

* * * * *